(12) United States Patent
Reynolds

(10) Patent No.: US 7,769,626 B2
(45) Date of Patent: Aug. 3, 2010

(54) DETERMINING STRATEGIES FOR INCREASING LOYALTY OF A POPULATION TO AN ENTITY

(75) Inventor: Thomas J. Reynolds, Wilson, WY (US)

(73) Assignee: Tom Reynolds, Wilson, WY (US)

( * ) Notice: Subject to any disclaimer, the term of this patent is extended or adjusted under 35 U.S.C. 154(b) by 954 days.

(21) Appl. No.: 10/927,222

(22) Filed: Aug. 25, 2004

(65) Prior Publication Data

US 2005/0091077 A1 Apr. 28, 2005

Related U.S. Application Data

(60) Provisional application No. 60/497,882, filed on Aug. 25, 2003.

(51) Int. Cl.
*G06Q 90/00* (2006.01)
(52) U.S. Cl. ...................................................... 705/10
(58) Field of Classification Search .................... 705/10
See application file for complete search history.

(56) References Cited

U.S. PATENT DOCUMENTS

| | | | |
|---|---|---|---|
| 4,613,946 A | 9/1986 | Forman | |
| 4,853,854 A | 8/1989 | Behar et al. | |
| 4,895,518 A | 1/1990 | Arnold et al. | |
| 5,041,972 A * | 8/1991 | Frost | 705/10 |
| 5,122,952 A | 6/1992 | Minkus | |
| 5,124,911 A * | 6/1992 | Sack | 705/10 |
| 5,135,399 A | 8/1992 | Ryan | |
| 5,207,580 A | 5/1993 | Strecher | |
| 5,312,114 A | 5/1994 | Lipson | |
| 5,372,507 A | 12/1994 | Goleh | |
| 5,435,324 A | 7/1995 | Brill | |
| 5,436,830 A | 7/1995 | Zaltman | 364/419.2 |
| 5,503,561 A | 4/1996 | Cohen | |
| 5,551,880 A | 9/1996 | Bonnstetter et al. | |
| 5,572,421 A | 11/1996 | Altman et al. | |
| 5,594,994 A | 1/1997 | David | |
| 5,596,994 A | 1/1997 | Bro | |

(Continued)

FOREIGN PATENT DOCUMENTS

WO WO 99/45489 9/1999

(Continued)

OTHER PUBLICATIONS

"Choices® II User's Guide", Professional Resource Center, date unknown, pp. 1-56.

(Continued)

*Primary Examiner*—Beth V. Boswell
*Assistant Examiner*—Neil R Kardos
(74) *Attorney, Agent, or Firm*—Sheridan Ross P.C.; Dennis J. Dupray

(57) ABSTRACT

A method and system is disclosed that provides: (a) a theoretical framework for designing psychological research that uncovers individual decision-making networks, both in terms of sampling requirements and questioning methods, (b) an implementation interface to schedule and administer the appropriate question sequences between an interviewer and a given individual, in real-time, via a web-based system, and (c) a coding and analysis system to summarize and quantify the potential of alternative decision structures to be used to optimize the development of marketing and communication strategies.

21 Claims, 36 Drawing Sheets

Understanding Choice

U.S. PATENT DOCUMENTS

| | | | |
|---|---|---|---|
| 5,634,101 A * | 5/1997 | Blau | 705/10 |
| 5,676,551 A | 10/1997 | Knight et al. | |
| 5,692,501 A | 12/1997 | Minturn | |
| 5,722,418 A | 3/1998 | Bro | |
| 5,734,890 A * | 3/1998 | Case et al. | 707/5 |
| 5,743,743 A | 4/1998 | Ho et al. | |
| 5,784,539 A | 7/1998 | Lenz | |
| 5,835,087 A * | 11/1998 | Herz et al. | 715/810 |
| 5,879,163 A | 3/1999 | Brown et al. | |
| 5,890,131 A | 3/1999 | Ebert et al. | |
| 5,911,581 A | 6/1999 | Reynolds et al. | |
| 5,954,510 A | 9/1999 | Merrill, deceased et al. | |
| 5,961,332 A | 10/1999 | Joao | |
| 5,967,789 A | 10/1999 | Segel et al. | |
| 5,995,728 A | 11/1999 | Forman | |
| 5,999,908 A * | 12/1999 | Abelow | 705/1 |
| 6,099,319 A | 8/2000 | Zaltman et al. | 434/236 |
| 6,101,479 A | 8/2000 | Shaw | 705/8 |
| 6,105,046 A | 8/2000 | Greenfield et al. | |
| 6,108,665 A | 8/2000 | Bair et al. | |
| 6,125,358 A | 9/2000 | Hubbell et al. | |
| 6,148,297 A | 11/2000 | Swor et al. | |
| 6,151,565 A | 11/2000 | Lobley et al. | |
| 6,192,360 B1 | 2/2001 | Dumais et al. | |
| 6,210,272 B1 | 4/2001 | Brown | |
| 6,227,862 B1 | 5/2001 | Harkness | |
| 6,236,975 B1 | 5/2001 | Boe et al. | |
| 6,296,487 B1 | 10/2001 | Lotecka | |
| 6,315,569 B1 | 11/2001 | Zaltman | 434/236 |
| 6,330,426 B2 | 12/2001 | Brown et al. | |
| 6,338,039 B1 | 1/2002 | Lonski et al. | |
| 6,341,267 B1 | 1/2002 | Taub | |
| 6,347,943 B1 | 2/2002 | Fields et al. | |
| 6,361,326 B1 | 3/2002 | Fontana et al. | |
| 6,368,111 B2 | 4/2002 | Legarda | |
| 6,375,469 B1 | 4/2002 | Brown | |
| 6,425,764 B1 | 7/2002 | Lamson | |
| 6,454,705 B1 | 9/2002 | Cosentino et al. | |
| 6,471,521 B1 | 10/2002 | Dornbush et al. | |
| 6,477,504 B1 | 11/2002 | Hamlin et al. | 705/10 |
| 6,497,577 B2 | 12/2002 | Kanter | |
| 6,565,359 B2 | 5/2003 | Calhoun et al. | |
| 6,574,614 B1 | 6/2003 | Kesel | 706/52 |
| 6,618,746 B2 | 9/2003 | Desai et al. | |
| 6,648,649 B2 | 11/2003 | Rappaport | |
| 6,655,963 B1 | 12/2003 | Horvitz et al. | |
| 6,658,395 B1 | 12/2003 | Barnhill | |
| 6,728,695 B1 | 4/2004 | Pathria et al. | |
| 6,767,211 B2 | 7/2004 | Hall et al. | |
| 6,769,915 B2 | 8/2004 | Murgia et al. | |
| 6,773,266 B1 | 8/2004 | Dornbush et al. | |
| 6,850,891 B1 | 2/2005 | Forman | |
| 6,863,534 B1 | 3/2005 | Sadka | |
| 6,895,382 B1 | 5/2005 | Srinivasan et al. | |
| 6,898,737 B2 | 5/2005 | Goeller et al. | |
| 6,915,269 B1 | 7/2005 | Shapiro et al. | |
| 6,968,375 B1 | 11/2005 | Brown | |
| 6,971,881 B2 | 12/2005 | Reynolds | |
| 6,974,328 B2 | 12/2005 | Aspe et al. | |
| 6,988,088 B1 | 1/2006 | Miikkulainen et al. | |
| 6,996,560 B1 | 2/2006 | Choi et al. | |
| 7,054,758 B2 | 5/2006 | Gill-Garrison et al. | |
| 7,058,566 B2 | 6/2006 | Shaw | |
| 7,080,027 B2 * | 7/2006 | Luby et al. | 705/10 |
| 7,103,561 B1 * | 9/2006 | Sarkisian et al. | 705/10 |
| 7,379,964 B1 | 5/2008 | Buechler et al. | |
| 2001/0031451 A1 | 10/2001 | Sander et al. | |
| 2002/0045154 A1 | 4/2002 | Wood et al. | |
| 2002/0082888 A1 | 6/2002 | Graff et al. | 705/7 |
| 2002/0152110 A1 | 10/2002 | Stewart et al. | 705/10 |
| 2002/0161764 A1 | 10/2002 | Sharo | 707/7 |
| 2002/0169658 A1 | 11/2002 | Adler | 705/10 |
| 2002/0188460 A1 | 12/2002 | Resh | 705/1 |
| 2003/0017440 A1 | 1/2003 | Bergey et al. | |
| 2003/0018517 A1 | 1/2003 | Dull et al. | 705/10 |
| 2003/0023685 A1 * | 1/2003 | Cousins et al. | 709/205 |
| 2003/0046140 A1 | 3/2003 | Callahan et al. | 705/10 |
| 2003/0050928 A1 | 3/2003 | Hays | 707/6 |
| 2003/0061096 A1 | 3/2003 | Gallivan et al. | 705/14 |
| 2003/0074253 A1 | 4/2003 | Scheuring et al. | 705/10 |
| 2003/0167197 A1 * | 9/2003 | Shoemaker et al. | 705/10 |
| 2004/0024620 A1 | 2/2004 | Robertson et al. | |
| 2004/0093296 A1 | 5/2004 | Phelan et al. | 705/36 |
| 2004/0107131 A1 | 6/2004 | Wilkerson et al. | 705/10 |
| 2004/0117239 A1 | 6/2004 | Mittal et al. | 705/10 |
| 2006/0053046 A1 | 3/2006 | Bonnstetter et al. | |
| 2006/0115802 A1 | 6/2006 | Reynolds | |
| 2006/0224434 A1 | 10/2006 | Rumi et al. | |

FOREIGN PATENT DOCUMENTS

| | | |
|---|---|---|
| WO | WO 00/31666 | 6/2000 |
| WO | WO 00/34910 | 6/2000 |
| WO | WO 00/34911 | 6/2000 |
| WO | WO 01/42873 | 6/2001 |
| WO | WO 00/186611 | 11/2001 |
| WO | WO 01/86516 | 11/2001 |
| WO | WO 01/93077 | 12/2001 |
| WO | WO 02/29653 | 4/2002 |
| WO | WO 02/063435 | 8/2002 |
| WO | WO 03/009199 | 1/2003 |
| WO | WO 03/085488 | 10/2003 |

OTHER PUBLICATIONS

Reynolds et al., "Laddering Theory, Method, Analysis, and Interpretation", Journal Of Advertising Research Feb./Mar. 1988, vol. 28(1), 26 pages.

Reynolds, "Methodological and Strategy Development Implications of Decision Segmentation", Journal of Advertising Research, Dec. 1, 2006, 18 pages.

Evans "Measuring and managing customer value", Work Study, ISSN: 0043-8022, Year: 2002, vol. 51, Issue: 3, pp. 134-139.

Reynolds et al., "A Review and Comparative Analysis of Laddering Research Methods: Recommendations for Quality Metrics", date unknown, 56 pages.

LOW, "Are College Students Satisfied? A National Analysis of Changing Expectations", Noel-Levitz, Inc., available at http://www.noellevitz.com/NR/rdonlyres/DB91046E-59FE-4AB0-AB49-9CAF8EE84D73/0/Report.pdf, Feb. 2000, 34 pages.

Reynolds, "In Search of True Brand Equity Metrics: All Market Share Ain't Created Equal", Journal of Advertising Research, Jun. 2005, pp. 171-186.

".net Document Classifier Version 1.0", available at http://software.topcoder.com/catalog/c_cornponent.jsp?comp=15462331&over=1, date unknown, pp. 1-2.

"Data Mining Tools See5 and C5.0", available at http://www.rulequest.com/see5-info.html, last updated Nov. 2007, 1 page.

"JAVA Text Classification Version 1.0", available at http://software.topcoder.com/catalog/c_component.jsp?comp=1000837&over=1, date unknown, pp. 1-2.

"RuleQuest Research Data Mining Tools", available at http://www.rulequest.com, date unknown, 1 page.

"TopCoder uses the best developers from around the world to build your application", available at http://software.topcoder.com, site updated Aug. 10, 2007, pp. 1-2.

"Weka 3: Data Mining Software in Java", available at http://www.cs.waikato.ac.nz/ml/weka/index.html, date unknown, 1 page.

Graham-Cumming, "Naïve Bayesian Text Classification", Dr. Dobbs Journal, CMP Media, LLC, May 2005, pp. 1-9.

Joachims, "SVM light Support Vector Machine", available at http://svmlight.joachims.org, dated Feb. 9, 2004, pp. 1-12.

McCallum "Bow: A toolkit for statistical language modeling, text retrieval, classification and clustering", available at http://www.cs.cmu.edu/~mccallum/bow, last updated Sep. 12, 1998, 2 pages.

McCallum "Rainbow", available at http://www.cs.cmu.edu/~mccallum/bow/rainbow/, last updated Sep. 30, 1998, 12 pages.

Alwis et al.; "Information as a Tool for Management Decision Making: A Case Study of Singapore"; *Information Research;* Jan. 2002; vol. 7, No. 2; 23 pp.

Kellen; "CRM Measurement Frameworks"; *Adjunct Faculty, E-Commerce,* DePaul University, Chicago, IL, U.S.A.; Mar. 2002; 37pp.

McQuitty et al.; "Systematically Varying Consumer Satisfaction and Its Implications for Product Choice"; *Academy of Marketing Science;* 2000; 29 pp.

Roberts; "Building Roi-Based Decision Support Simulators"; *Burke White Paper Series;* 2002; vol. 3; 6 pp.

"WorldOpinion—Tools for eResearch"; (date unknown); 5 pp.

Carroll, J., Green, P.E. and Schaffer, C. (1986). Interpoint Distance Comparisons in Correspondence Analysis, Journal of Marketing Research, Aug. 23: 271-80.

Christensen, G.L. and Olson, J.C. (2002). Mapping Consumers' Mental Models with ZMET. Psychology and Marketing, vol. 19(6), 477-502.

Jolly, J.P., Reynolds, T.J., and Slocum, J.W. (1988). Application of the Means-End Theoretic for Understanding the Cognitive Bases of Performance Appraisal. Organization Behavior and Human Decision Process, vol. 41, 153-179.

Reynolds, T.J., Gengler, C. and Howard, D. (1995). A Means-End Analysis of Brand Persuasion through Advertising. International Journal of Research in Marketing, (12), 257-266.

Reynolds, T.J. and Rochon, J. (1991). Means-End Based Advertising Research: Copy Testing is not Strategy Assessment. Journal of Business Research, vol. 22, 131-142.

Reynolds, T.J. and Sutrick, K.H. (1986). "Assessing the correspondence of one or more vectors to a symmetric matrix using ordinal regression" Psychometrika, vol. 51(1), 101-112.

Reynolds et al. "Understanding Consumer Decision-Making: The Means-End Approach to Marketing and Advertising Strategy", Mahwah, NJ, Lawrence Erlbaum Associates, 2001, entire book.

Johansson, J. and Nonaka, I. "Relentless: The Japanese Way of Marketing", NY, NY: HarperCollins Publishers, Inc., 1996, entire book.

Blattberg, R., Getz, G. and Thomas, J. (2001). "Customer Equity: Building and managing relationships and valuable assets", Boston, MA.:Harvard Business School Press, entire book.

Aaker, D. (1991). "Managing Brand Equity", New York: Free Press, entire book.

Fishbein, M. (1967). "Readings in Attitude Theory and Measurement", New York: John Wiley and Sons, entire book.

Kahle et al. (1997). "Values, Lifestyles and Psychographics". Mahwah, NJ.: Lawrence Erlbaum Associates, entire book.

Cliff, N. (1987). "Analyzing Multivariate Data", New York: Harcourt, Brace and Jovanovich, entire book.

Peter, J. P. and Olson, J. (1993). "Consumer Behavior and Marketing Strategy", Homewood, IL.: Irwin, entire book.

U.S. Appl. No. 10/896,438, Lycas, filed Jul. 21, 2004.

Gan; "Multimedia Environmental Education Courseware for Promoting Cooperative Learning and Higher-Order Thinking Skills"; Paper presented at the National Curriculum Seminar, Port Dickson, Malaysia; Dec. 1995; pp. 1-9.

"Instructional Strategies"; (Date unknown); pp. 1-33.

"Taking Responsibility Grades K-6: Teaching Young Students to Take Responsibility for their Behavior"; Tom Snyder Productions; (Date Unknown); pp. 1-2.

Woods; The Giving Gift (All We Really Need); Education for a Sustainable Future; Jun. 26, 2000; pp. 1-18.

"Assessing Treatment Needs", available at http://www.chioshealing.com/HealingLevel2/AssessingTreatment/assessingtreatment.htm, 2000 (printed Aug. 6, 2001), pp. 1-5.

"Cure #5: Understanding and Healing the Human Energy Field", available at http://www.healpastlives.com/future/cure/crfield.htm, 2000 (printed Aug. 6, 2001), pp. 1-5.

"Healing Level I", available at http://www.chioshealing.com/HealingLevel1/healinglevel1.htm, 2000 (printed Aug. 6, 2001), pp. 1-3.

"Healing Level II", available at http://www.chioshealing.com/HealingLevel2/healinglevel2.htm, 2000 (printed Aug. 6, 2001), pp. 1-4.

"Healing Touch", available at http://www.virginiaacademy.com/rohun.htm, 2000 (printed Aug. 6, 2001), pp. 1-3.

"Reflexology", available at http://www.virginiaacademy.com/reflexology.htm, 2000 (printed Aug. 6, 2001), pp. 1-3.

"Reiki", available at http://reiki.7gen.com/, printed Aug. 6, 2001, pp. 1-5.

"The Human Energy Systems Laboratory", available at http://www.livingenergyunivers.com/lab/default.htm, printed Aug. 6, 2001, pp. 1-6.

"Welcome to CHIOS@ Energy Field Healing", available at http://www.chioshealing.com/index.htm, 2000 (printed Aug. 6, 2001), pp. 1-2.

"You Can Learn Integrated Energy Therapy (IET)!", available at http://www.integratedenergytherapy.net/, last modified Jul. 3, 2001, pp. 1-5.

Barrett, "Chios® Energy Field Healing Course Manual", 2000, pp. 1-16.

Brewer "Cam Handbook: Energy Healing", available at http://medicine.wustl.edu/~compmed/CAM_ENE.HTM, printed Aug. 6, 2001, pp. 1-5.

Kasabov "Foundations of Neural Networks, Fuzzy Systems, and Knowledge Engineering", Marcel Alencar, 1996 p. 491.

Managable, Definition of. Random House Unabridged Dictionary, Random House Inc. 2006 [Retrieved Sep. 8, 2008] Retrieved from Dictionary.com <http://dictionary.reference.com/browse/manageable>.

Birkman; "Dictionary for the Components" as early as 1966; 2 pgs.

Website Printout Entitled, "The Big Five Personality Test", http://www.outofservice.com/bigfive/results, dated Sep. 23, 2003, 3 pages.

Website Printout Entitled, "The Do-Re-Mi's of Personality - What your music tastes say about your personality: take . . .", dated Sep. 23, 2003, 5 pages.

Website Printout Entitled, "The Morality Test", dated Sep. 23, 2003, 13 pages.

\* cited by examiner

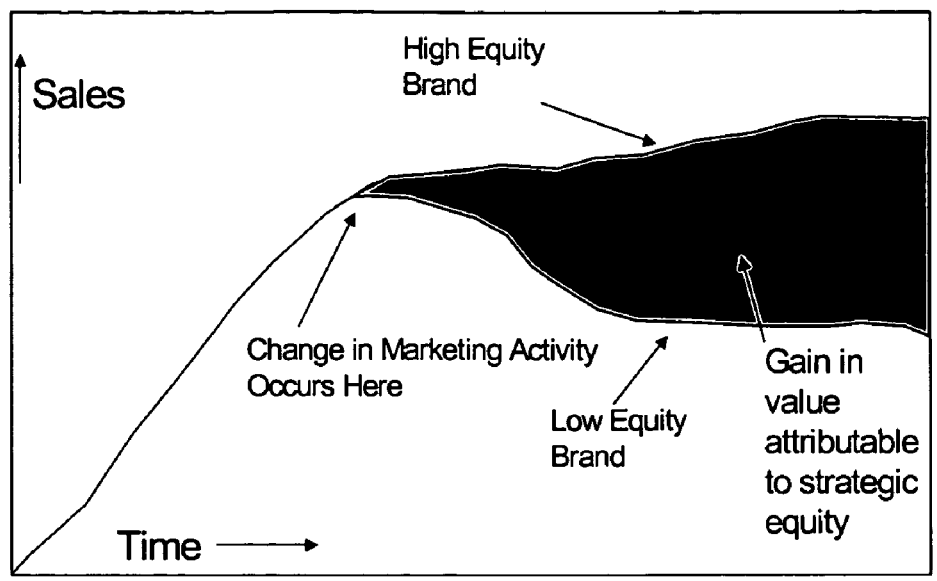
Fig. 1     Strategic Equity and Value Retention
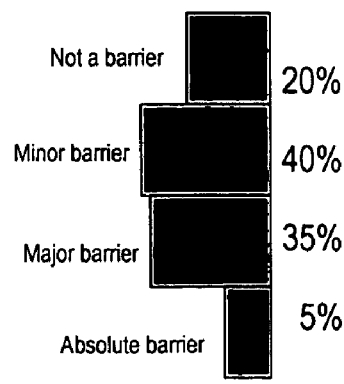
Fig. 2     A Distribution of Price Sensitivities

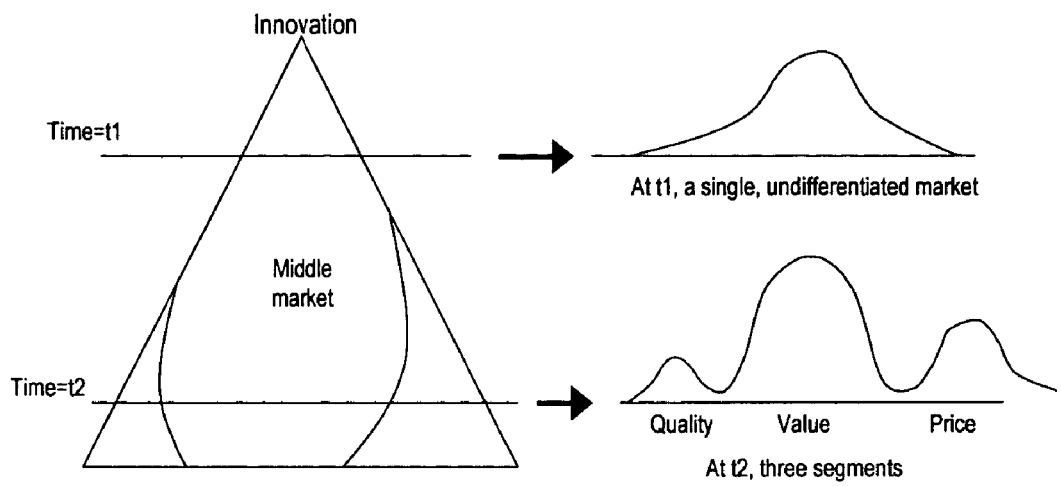
Fig. 3 The Time Distribution of Quality, Value, and Price Segments
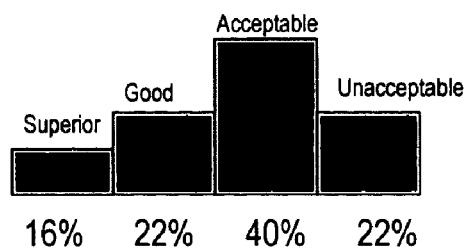
Fig. 4 A Distribution of Beliefs

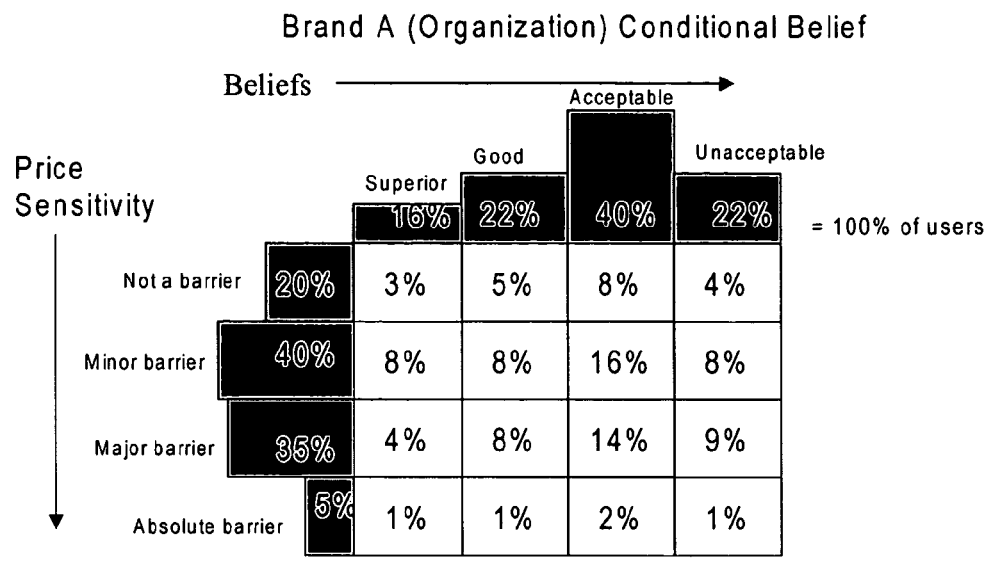
Fig. 5 The Joint Distribution of Users' Beliefs and Sensitivities
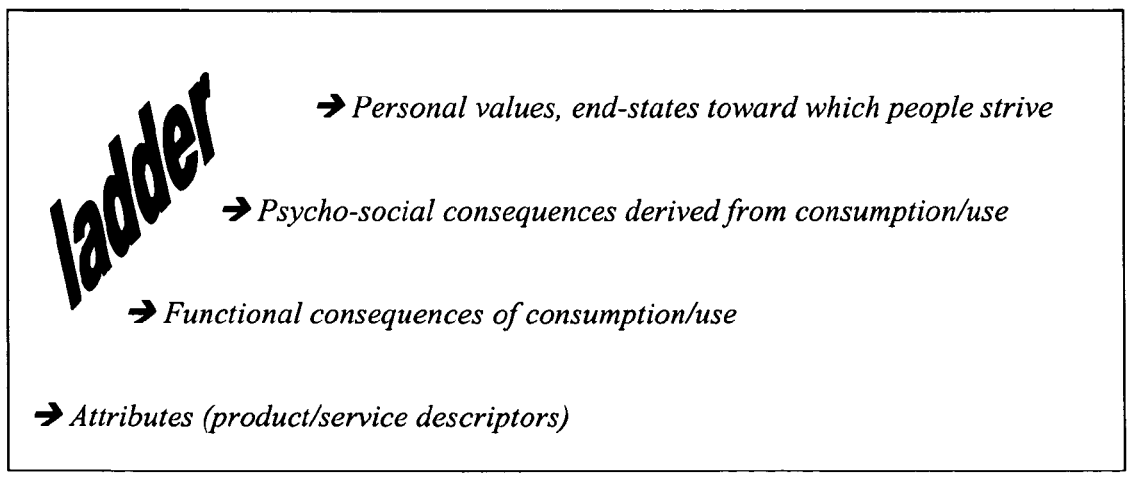
Fig. 6

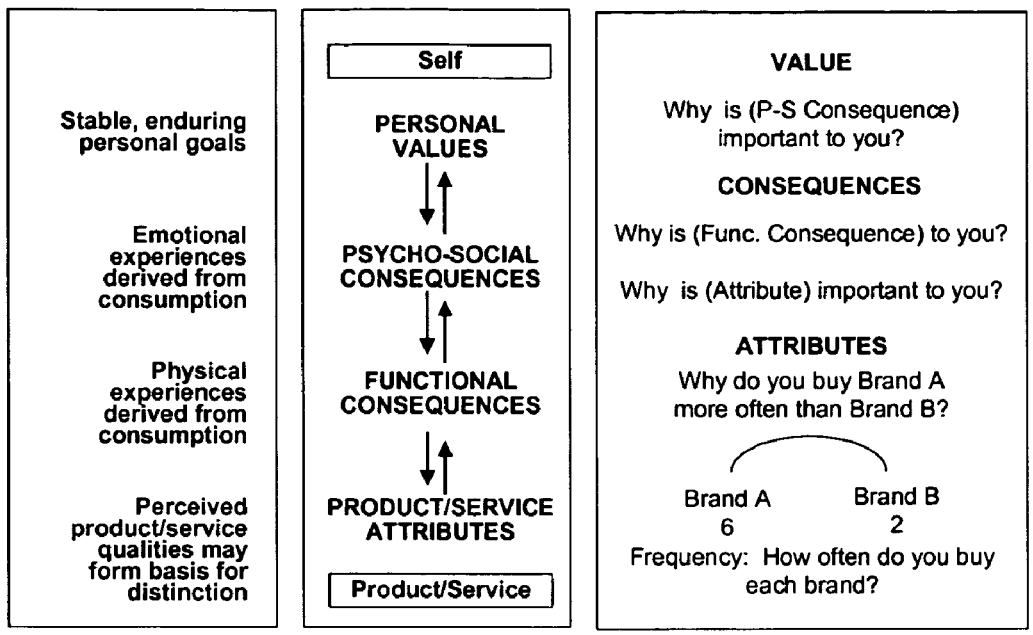
Fig. 7  Understanding Choice
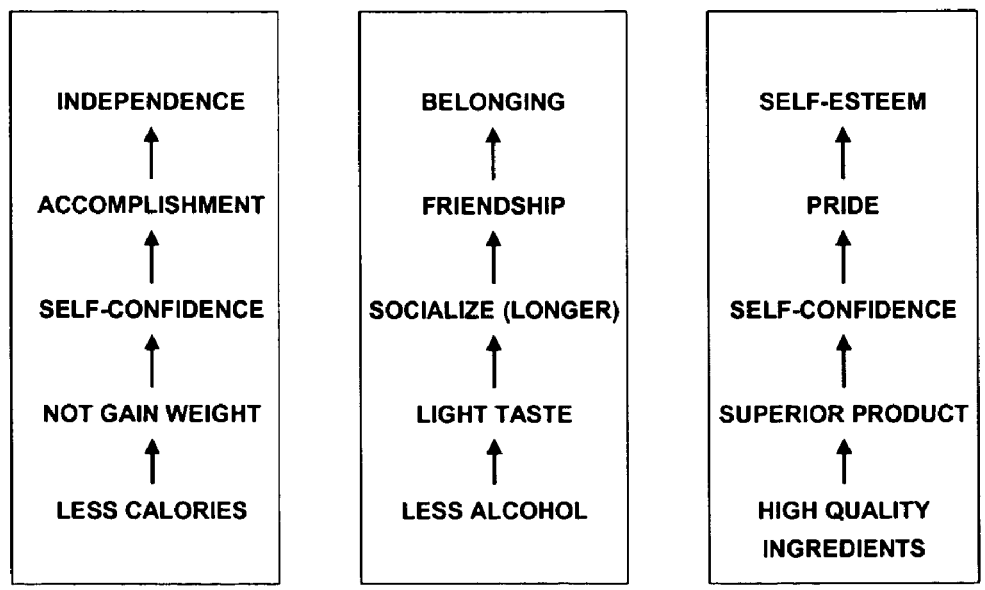
Fig. 8  Alternative Decision Orientations

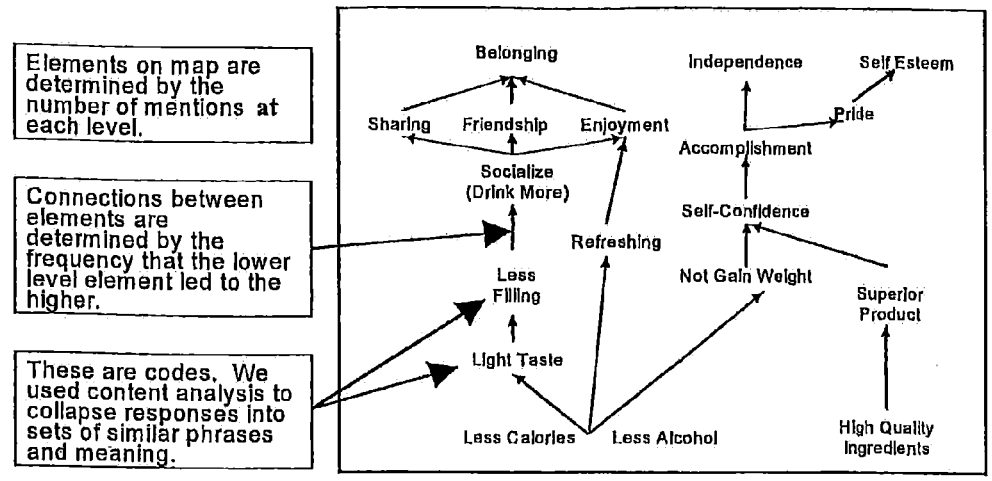
Fig. 9     Summarizing Decision Structure in a CDM
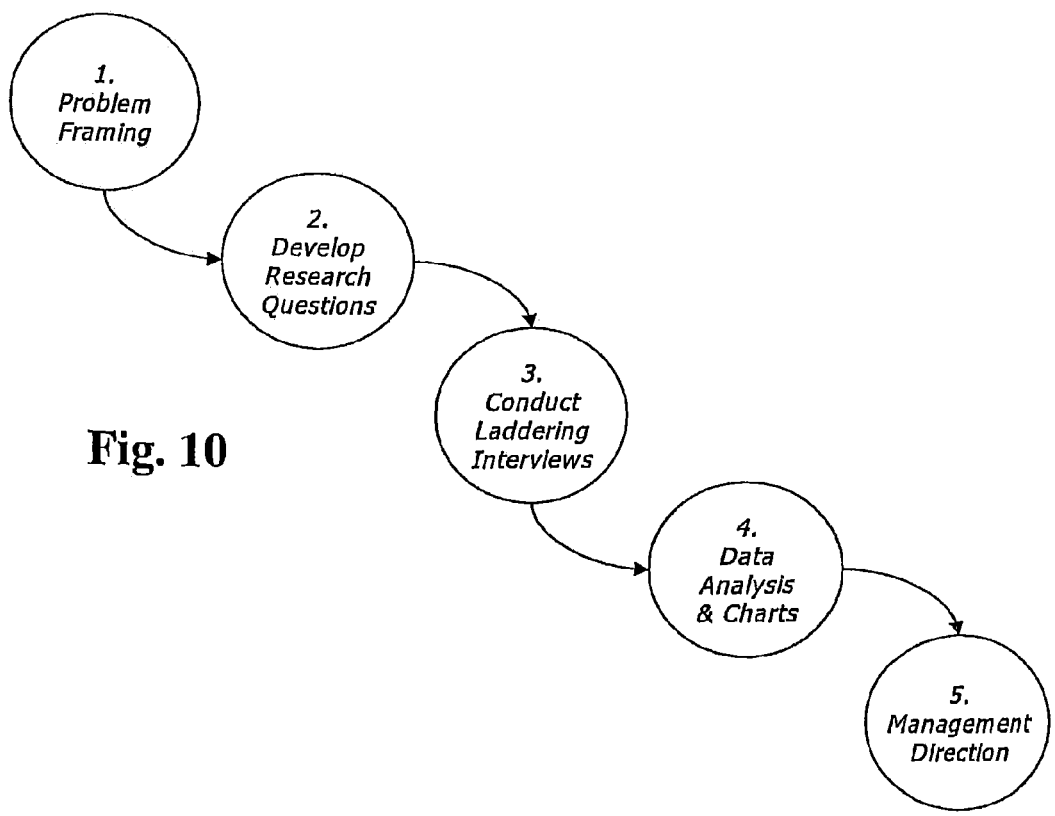
Fig. 10

Why did you join?

|  |  | USAGE (per week) | |
|---|---|---|---|
|  |  | (3+) | (1-3) |
| Member activities | 46% | 34% | 12% |
| Golf | 34 | 5 | 29 |
| Tennis | 9 | 6 | 3 |
| Location | 7 | 3 | 4 |
|  | 96% | 48% | 48% |

Fig. 12

Equity Summary Percentages by Content Code.

|  | EQUITY QUESTION RESPONSES | | WEEKLY USAGE | | | |
|---|---|---|---|---|---|---|
|  | | | (3+) | | (1-3) | |
|  | +EQUITY | -EQUITY | +EQUITY | -EQUITY | +EQUITY | -EQUITY |
| GOLF | 35 | 43 | | | | |
| Course condition | 21 | 12 | 6 | 6 | 15 | 6 |
| Pace of play | 0 | 26 | 0 | 4 | 0 | 22 |
| Staff/service | 14 | 5 | 9 | 3 | 5 | 2 |
| ENVIRONMENT | 48 | 22 | | | | |
| Staff/service | 31 | 10 | 21 | 8 | 10 | 2 |
| Facilities | 17 | 12 | 10 | 5 | 7 | 7 |
| DINING | 10 | 16 | | | | |
| Food (value) | 7 | 7 | 0 | 5 | 7 | 2 |
| Service | 3 | 9 | 1 | 5 | 2 | 4 |
| TENNIS | 7 | 9 | | | | |
| Permanent indoor court | 0 | 6 | 0 | 2 | 0 | 4 |
| Clinics | 4 | 0 | 2 | 0 | 2 | 0 |
| Staff/service | 3 | 3 | 0 | 3 | 3 | 0 |
| OTHER | 0 | 10 | | | | |
| Workout facilities | 0 | 10 | 0 | 8 | 0 | 2 |
| TOTAL | 100 | 100 | | | | |

Fig. 13. +EQUITY and –EQUITY Resort Comments

Equity Assessment and Leverage Analysis (ELA).

|  | I (%) | x B (0-10) | = EA (%) | (L)everage Index ΔL=I • (10-B)/2 |
|---|---|---|---|---|
| GOLF | 39 |  | 33 |  |
| Course condition | 17 | 6 | 20 | 34 (2) |
| Pace of play | 13 | 0 | 0 | 65 (1) |
| Staff/service | 10 | 7 | 13 | 15 |
| ENVIRONMENT | 35 |  | 49 |  |
| Staff/service | 21 | 8 | 32 | 21 (5) |
| Facilities | 15 | 6 | 17 | 30 (3) |
| DINING | 13 |  | 10 |  |
| Food (value) | 7 | 5 | 7 | 18 |
| Service | 6 | 3 | 3 | 11 |
| TENNIS | 8 |  | 7 |  |
| Permanent indoor court | 3 | 0 | 0 | 15 |
| Clinics | 2 | 10 | 4 | 0 |
| Staff/service | 3 | 5 | 3 | 8 |
| OTHER | 5 |  | 0 |  |
| Workout facilities | 5 | 0 | 0 | 25 (4) |
| TOTAL % | 100 |  | 99 |  |

Fig. 14. Leverage Analysis

Why did you join the Circle of Friends?

|  | (%) | USAGE (Events last year) | |
|---|---|---|---|
|  | OVERALL | (≥ 2) | (0-1) |
| Programs and education | 36 | 28 | 8 |
| Support arts in general | 31 | 6 | 25 |
| Specific "collection" of art | 18 | 16 | 2 |
| Local philanthropic support | 14 | 6 | 8 |
|  | 99 | 56 | 43 |

Fig. 15. Initial Reasons for Museum Membership

Past and Future Trend Anchor Contrast.

|  |  | PAST (Δ One year) | | | | | |
|---|---|---|---|---|---|---|---|
|  |  | + + | + | = | - | - - | Σ |
|  | + + | 0 | 2 | 4 | 0 | 0 | 6 |
|  | + | 2 | 3 | 14 | 3 | 2 | 24 |
| FUTURE (Δ One year) | = | 0 | 6 | 15 | 10 | 0 | 31 |
|  | - | 0 | 0 | 18 | 11 | 2 | 31 |
|  | - - | 0 | 0 | 4 | 3 | 1 | 8 |
|  | Σ | 2 | 11 | 55 | 27 | 5 | 100 |

Fig. 16. Self-reported museum participation trends

Equity Assessment and Leverage Analysis (ELA).

|  | I (%) | x B (1-10) | = EA (%) | (L)everage Index $\Delta L = I \cdot (10-B)/2$ |
|---|---|---|---|---|
| EXHIBIT QUALITY | 42 |  | 61 |  |
| Collection | 26 | 6 | 34 | 52 (2) |
| Artists | 16 | 8 | 27 | 16 |
| STIMULATING | 32 |  | 28 |  |
| Tutorials | 24 | 3 | 16 | 84 (1) |
| Variety | 8 | 7 | 12 | 12 |
| ENVIRONMENT | 18 |  | 10 |  |
| Presentation | 10 | 3 | 7 | 35 |
| Facilities | 8 | 2 | 3 | 32 |
| OTHER | 8 |  | -- |  |
| TOTAL % | 100 |  | 99 |  |

Fig. 17. Museum ELA derived from TREND questions

What is your primary source of museum activity information?

|  | % | Cost (%) |
|---|---|---|
| Postcards / calendar | 57 | 19 |
| Newsletter | 24 | 28 |
| Paid media (newspaper) | 12 | 53 |
| Friends | 7 | -- |
|  | 100 | 100 |

Fig. 18. Communications source summary

Content EQUITY Codes by Satisfaction Scale Classifications.

|  | % (I) | OVERALL + | OVERALL - | [-] (1-4) + | [-] (1-4) - | [0] (5-6) + | [0] (5-6) - | [+] (7-9) + | [+] (7-9) - |
|---|---|---|---|---|---|---|---|---|---|
| Nurses (attending) | 39 | 49 | 29 | 14 | 9 | 15 | 12 | 20 | 8 |
| Staff (department) | 27 | 34 | 20 | 11 | 4 | 11 | 8 | 12 | 8 |
| Personal (pain, stress) | 18 | 12 | 24 | 7 | 18 | 3 | 4 | 2 | 2 |
| MD's | 10 | 5 | 15 | 1 | 3 | 4 | 4 | 0 | 8 |
| Facilities (environment) | 6 | 0 | 12 | 0 | 0 | 0 | 4 | 0 | 8 |
|  | 100% |  |  |  |  |  |  |  |  |

(SATISFACTION SCALE header spans [-], [0], [+] columns)

Fig. 19. Percentage of Code Equities by Recoded Satisfaction Level [ - , 0 AND +]

Equity Indices: Nurses (I=39).

$[T_s = +.38]$

%

44   Information.   ($I_c$ =17: B=5)

(+) "told me what to expect"   (-) "Our policy is this"

38   Manners.   ($I_c$ =15: B=7)

(+) "cheerfulness made me relax"   (-) "abrupt with me"

18   Empathy.   ($I_c$ =18: B=8)

(+) "understood my problems"   (-) "not responsive to my needs"

Fig. 20. Example of satisfaction comments by sub-code.

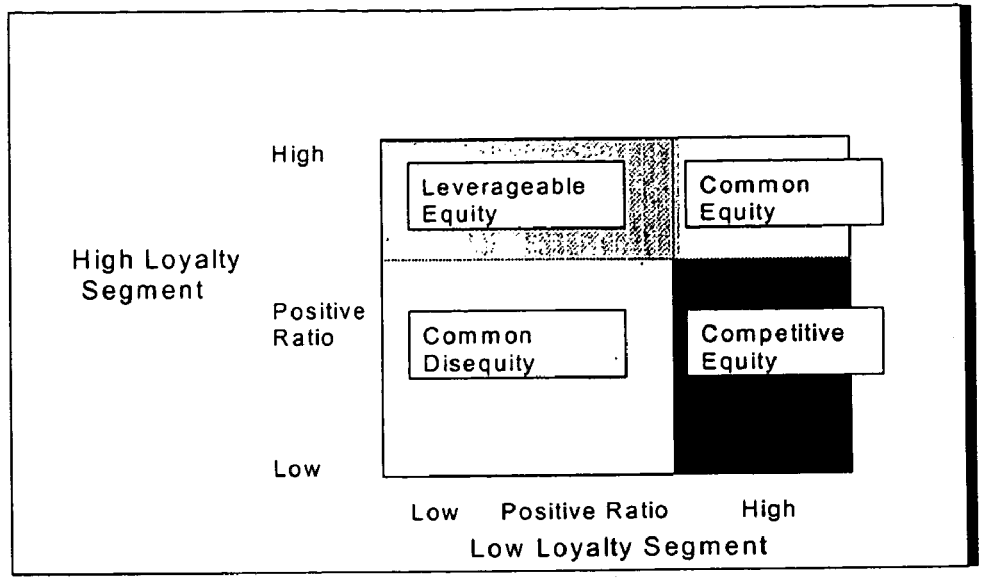
Fig. 21  An Equity/Disequity Grid
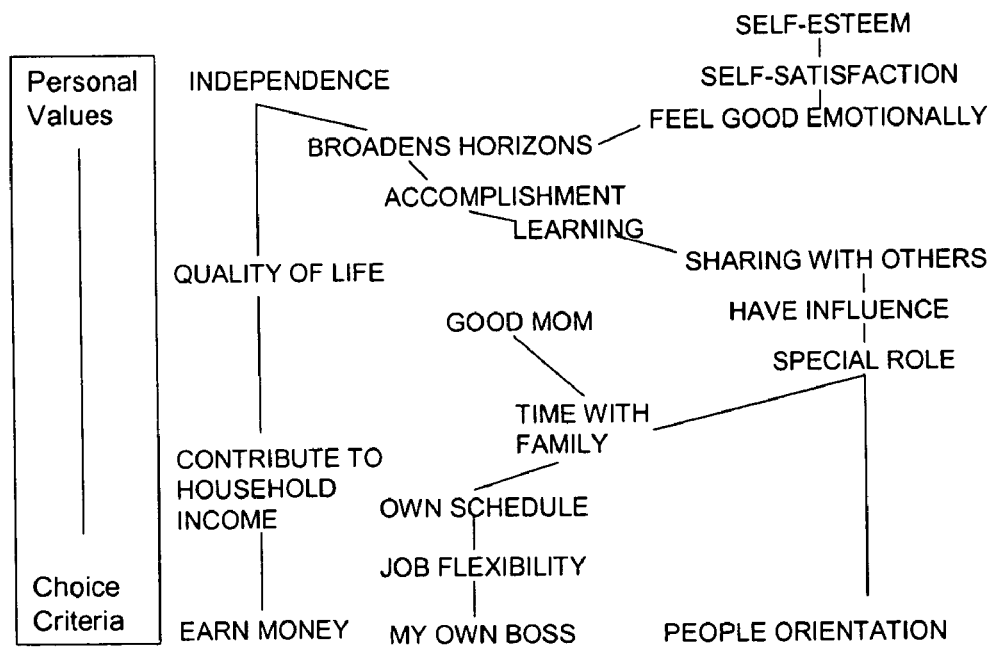
Fig. 22  Customer Decision Map: Direct Selling

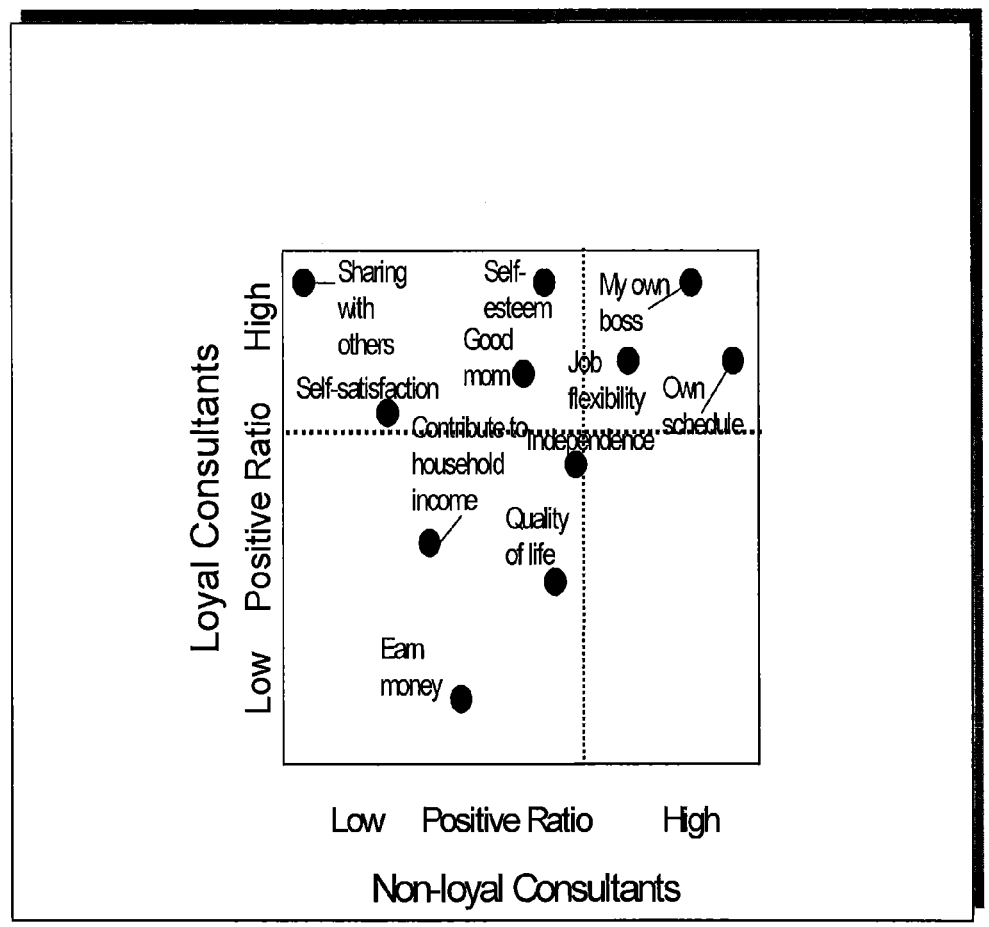
Fig. 23    Equity/Disequity Grid

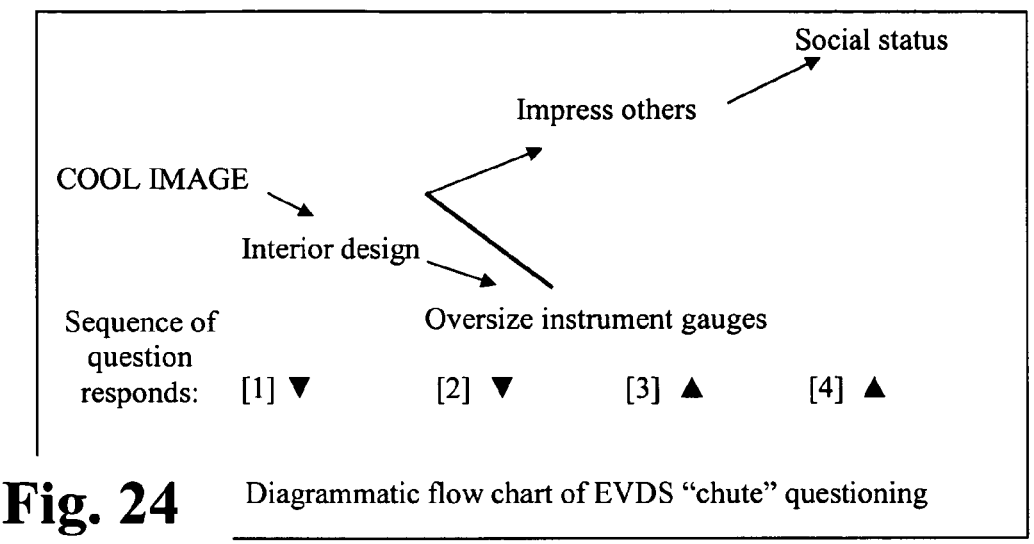
Fig. 24  Diagrammatic flow chart of EVDS "chute" questioning

EXAMPLE EGOSODIC VALENCED DECISION STRUCTURE CODES AND LADDERS
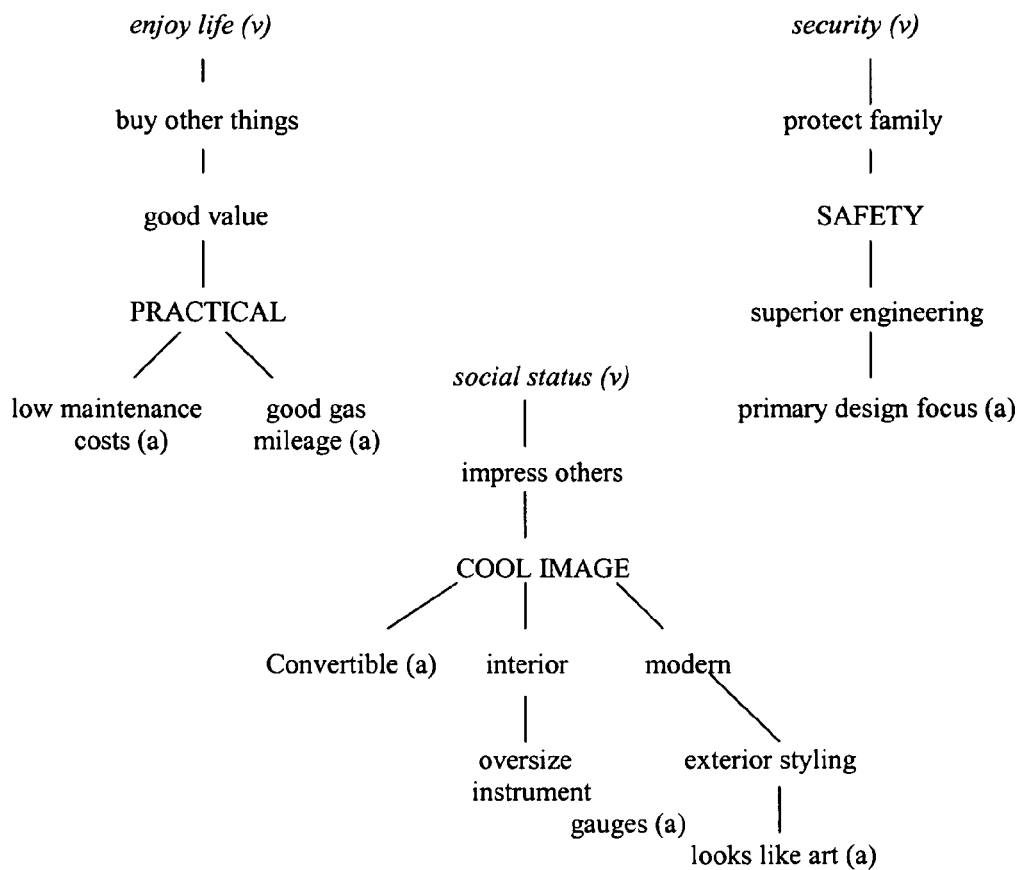
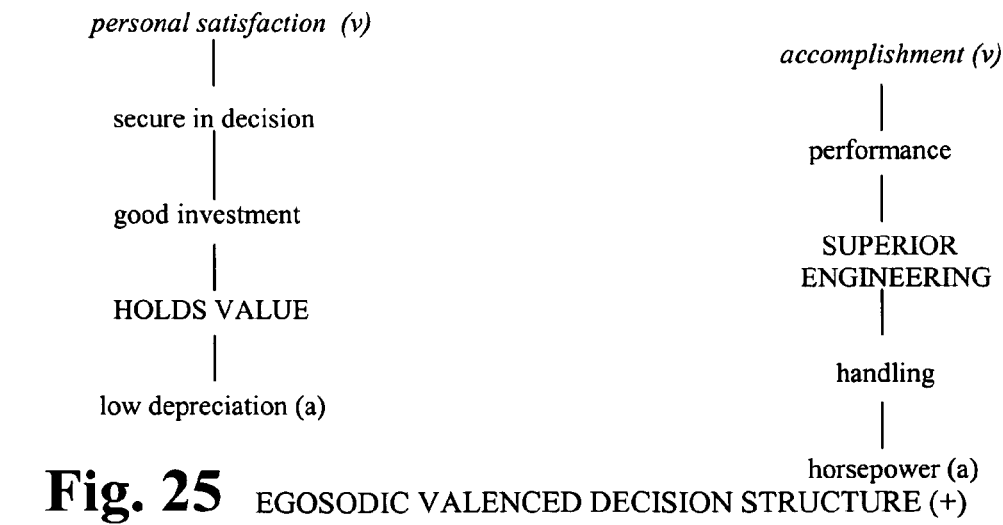
Fig. 25 EGOSODIC VALENCED DECISION STRUCTURE (+) MENTIONS with "Chutes" and Ladders (a↔v)

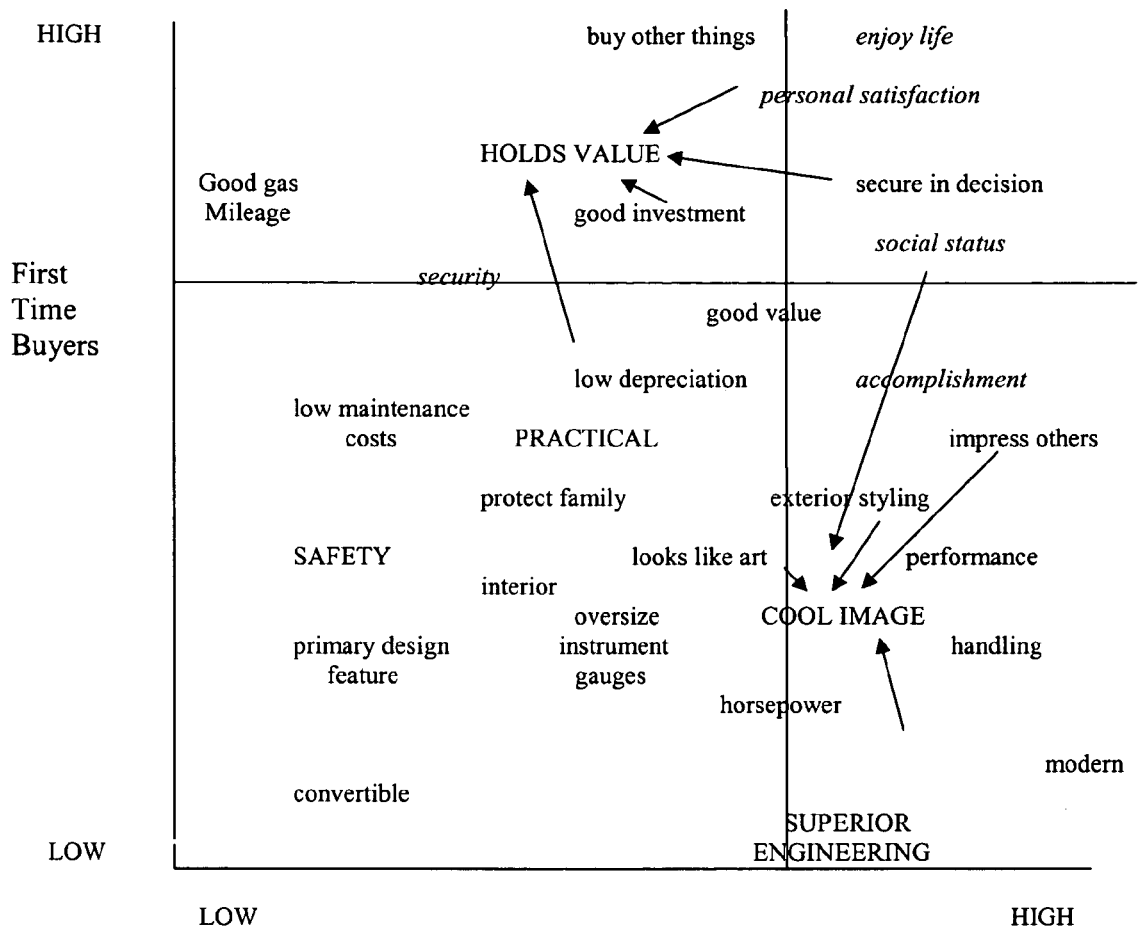
Fig. 26. StrEAM Equity Grid™ application to automobiles

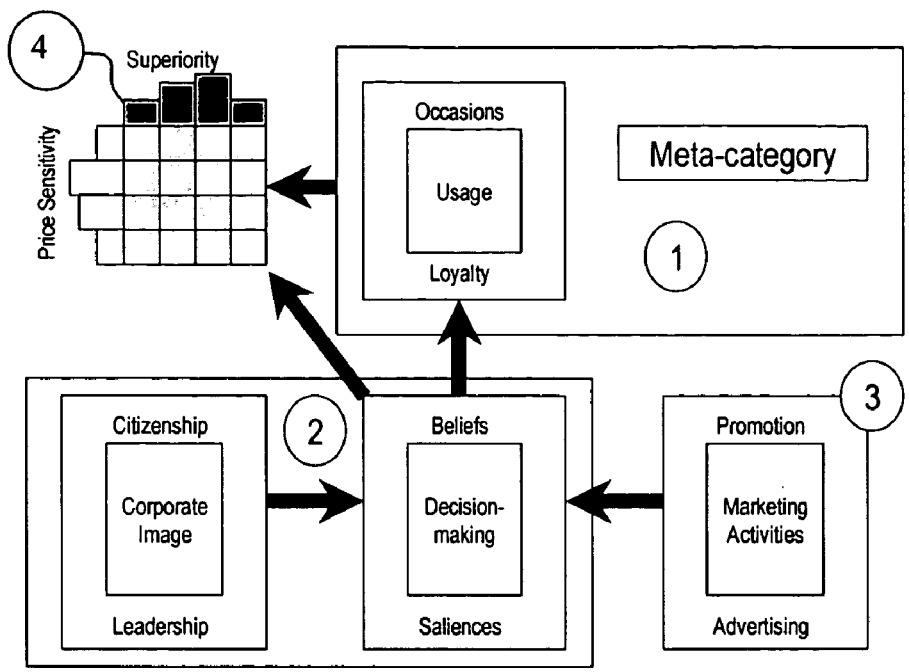
Fig. 27  Tracking Migration to the Northwest Corner
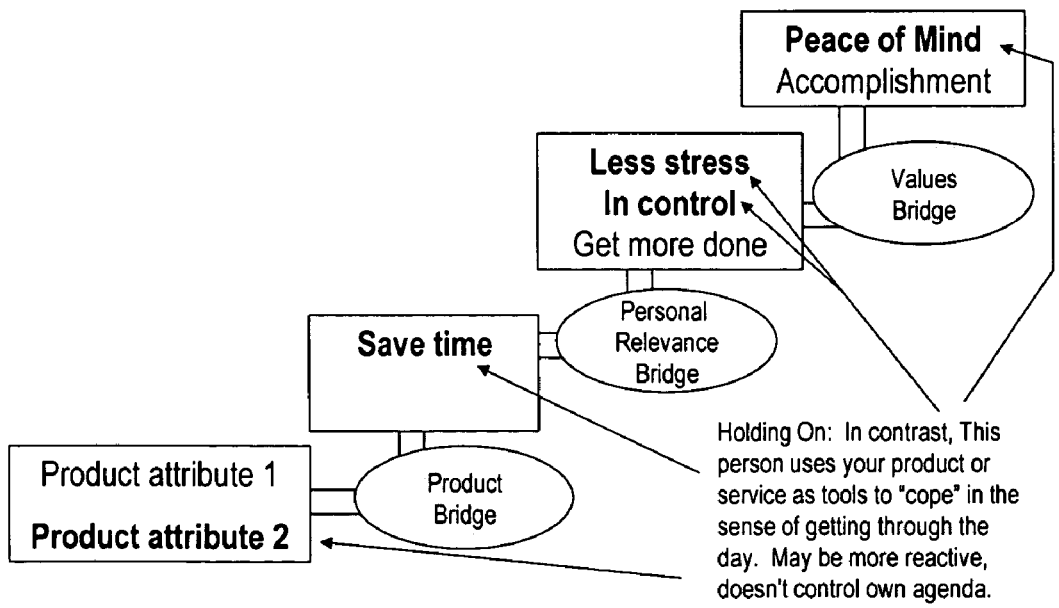
Fig. 28  Accomplish-driven Coping Orientation

| Question Type | Description |
|---|---|
| EXPECTATION | This type of question will be commonly asked to get an unstructured response about the Respondent's expectations about a subject. The verbatim response will be captured and used later by picking out key words and phrases. For the interviewer application it is a simple question and answer process. Ideally, the interviewer will play back, perhaps an edited version of the expectation response (in the Notes window) for approval before recording it. |
| PURCHASE | This is some sort of question regarding a previous purchase. It can start as a simple unstructured response (like expectation). The question might be about brands/models purchased, date purchased, frequency, etc The question may break down into a number of subcategories, thereby requiring a number of respondent inputs. |
| USAGE | Usage questions are similar to purchase questions insofar as they can first be implemented as simple unstructured query/response. However, Usage questions do lend themselves to being structured as well. There might be all sorts of different types of Usage questions, each with a structured (form) for query/response. |
| TOP-OF-MIND | A top-of-mind question is generally an unstructured question/answer. If anything, the structure might be to limit the response to be brief (as befitting the concept). If the Respondent's answer is not limited, the interviewer will want to play back a brief version of it (for approval) since it may be used in the composition of a follow-up question. |
| GENERAL | This is just a placeholder for questions that don't fit into one of the other categories. |
| OCCASION-SET | This is a "set" question, where the Respondent is going to be given a list of answers. In this case, that list will be composed of "occasions". |
| CONSIDERATION-SET | Another "set" question, where, in this case, the Respondent gives a list of items (brands, models, etc.) that he/she considered. |
| PLUS-EQUITY | An Equity question is one of the main techniques for developing a ladder. It is a pointed "Why?" kind of question that will engage the interviewer and respondent in a dialog that results in the development of a ladder. The Plus-Equity question is the one that is asking why something is as positive as it is. To be clear, the answer to any Equity question is a ladder. See the discussion below about the ladder. In at least some embodiments, an Equity question may be best asked with the display of a prior slide (like a rating scale question). |
| MINUS-EQUITY | A Minus-Equity question is the same as described above for Plus-Equity except that it is asking why something is not more positive than it is. |
| LADDER | In general a Ladder question is one that allows the interviewer to build (at least part of) a Ladder as an answer. A Ladder is built as an "answer" to an Equity question. |
| CHUTE | A Chute is virtually the same as a Ladder, except that the interviewer is typically starting in the middle of the ladder rather than at the bottom (i.e., at the "attribute" rung). This does not necessarily have any impact on how the overall question is asked, structured, or ultimately answered. It may, however, |

Fig. 35A

| Question Type | Description |
|---|---|
| | affect any assistance given by the interviewer along the way. |
| RATING-SCALE | A Rating scale presents a range (e.g., 1-9) for the Respondent to choose a rating. This can be done interactively by choosing a rating with the mouse. An example of a rating scale question is:<br><br>*Macromedia Flash Player 6*<br>File View Control Help<br>Overall, how satisfied are you with the Teton Pines Country Club?<br>1   2   3   4   5   6   7   8   9<br>▲     ▲     ▲     ▲     ▲<br>Very   Average   Good   Very   Perfect<br>Disatisfied                Good |
| TREND-SCALE | A Trend Scale is another interactive question very much like the Rating Scale. In this case, the question will be about a trend, where the answer will range from "a lot less" to a "lot more". This is done with, e.g., a five point scale.<br>Again, the selection can be done interactively:<br><br>*Macromedia Flash Player 6*<br>File View Control Help<br>Over the past year, to what degree has your participation level in the activities at the museum changed?<br>A LOT   A LITTLE   ABOUT   A LITTLE   A LOT<br>LESS     LESS     THE SAME     MORE     MORE<br>--        -        =        +        ++ |
| VALENCE | A question of this type asks for a simple positive or negative typically on a question composed from one or more previous Respondent responses. This also has a simple interactivity wherein the Respondent can select Positive or Negative.<br><br>*Macromedia Flash Player 6*<br>File View Control Help<br>You said smoky exhaust comes to mind for SAAB. Is that a positive or negative for you?<br>Negative     *Positive*<br>−                 + |
| CHIP-ALLOCATION | This form of question prompts the user to allocate a predefined number of "chips" or tokens to some number of options. This type of question is used as a means of expressing relative importance (in the view of the respondent) of a number of related (or competing) items. |
| RADIO-QUESTION | This is a simple multiple-choice question where the user is required to select |

| | | Ladder Code Sequence | | | | | | Occurances of Sequence in Current Dataset | Occurances of Sequence in Total Study |
|---|---|---|---|---|---|---|---|---|---|
| Interview ID | Question ID | 1 | 2 | 3 | 4 | 5 | 6 | | |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |
| MX719AB | bush-image | 00103 | 00204 | 00303 | 00401 | 00402 | 00403 | 16 (of 40) 40% | 18 (of 90) 20% |
| MX719AB | kerry-image | 00103 | 00204 | 00303 | 00401 | 00402 | 00403 | 16 (of 40) 40% | 18 (of 90) 20% |

Fig. 43

DETERMINING STRATEGIES FOR INCREASING LOYALTY OF A POPULATION TO AN ENTITY

CROSS-REFERENCE TO RELATED APPLICATIONS

The present application claims priority from U.S. Provisional Patent Application No. 60/497,882 filed Aug. 25, 2003, which is incorporated herein by reference in its entirety.

COMPUTER PROGRAM LISTING APPENDIX
A computer program listing appendix containing the source code of a computer program that may be used with the present invention is incorporated by reference in its entirety and appended to this application as one (1) original compact disc, and one (1) identical copy thereof, containing a total of three (3) files as follows:

| Filename | Size (bytes) | Date of Creation |
|---|---|---|
| Interview_ Definition_XML_ (IDefML)_ Schema.txt | 6,949 | Apr. 20, 2010, 1:27:12 PM |
| Interview_ Results_ XML_ (IResML)_ Schema.txt | 15,993 | Apr. 20, 2010, 1:28:08 PM |
| Coding_ Model_ XML_ (StrCodML)_ Schema.txt | 8,912 | Apr. 20, 2010, 1:28:58 PM |

FIELD OF THE INVENTION

The present invention relates to a method and system for performing market research via interviewing and analysis of the resulting interview data, and in particular, for determining customer decision-making factors that can be used to increase market share and/or customer loyalty.

BACKGROUND

There are at least two important categories of object loyalty definitions (wherein "object" may be a brand, company, organization, product or service). The first category is "operational" object loyalty definitions, wherein such loyalty is defined and measured by analysis of, e.g., customer purchasing behaviors. That is, since one cannot look into a customer's mind, one looks instead into the customer's shopping cart, a parts bin, or an order history. Thus, customer loyalty behavior toward an object is analyzed, according to at least one of the following operational definitions of loyalty: (a) "choosing the object on k of n opportunities or purchase occasions," (b) "choosing the object k times in a row," or (c) "choosing the object more often than any other."

A second category of object loyalty definitions include definitions that provide a description of a "psychological" state of: (a) a predisposition to buy, or (b) a conditional preference, e.g., an attitude, which may be favorable or unfavorable to the object. That is, the definitions of this second category provide descriptions of the mental state(s) of a customer(s) so that one can hypothesize a framework for assessing object loyalty. A customer's attitudes, however, are based in their beliefs, wherein beliefs are descriptive thoughts about things that drive customer choice behavior. Said another way, belief connotes conviction, whereas attitude connotes action.

However, neither of the above definitions of object loyalty are satisfactory for customer loyalty, and at least as importantly, for determining how customer loyalty can be cost effectively increased. For example, for an "operationally" identified loyal customer who buys over and over again, there is no certainty that this customer is actually loyal. Not unless one knows that the purchasing choice was: (a) at least relatively unconstrained, for example, that the customer did not face costs to switch to a competing product, and (b) that the choice is made in congruence with the customer's preferences. In fact, it may be that the customer is uniformed regarding the market, and/or indifferent to competitive offerings. Moreover, for a "psychological" identified loyal customer who has a predisposition to perform a transaction with or for an object (as defined hereinabove), there is also no certainty that this customer is actually loyal. In particular, it does not mean that the customer will be more likely to perform such a transaction. To illustrate, an individual may admire a Mercedes, and say it is the best of cars, but cannot afford one. Is he/she loyal? At least from a marketing perspective probably not.

With belief and behavior comes experience. Experience, over time, creates in customers' minds a set of ideas (i.e., perceptions) about an object. Thus, the term loyalty as used herein may be described as including: (1) favorable customer perceptions built up over time, as evidenced by both belief and behavior, that induce customers to perform transactions (e.g., purchases) of, from or with the object, and (2) such favorable customer perceptions are a barrier for the customers to switch to a competing object (e.g., a competing brand, company, organization, product or service). Evaluation of such object loyalty is desirable for making informed marketing decisions regarding the object, particularly, if such evaluations can be performed cost effectively.

The equity of an object (e.g., a brand, company, organization, product or service), may be described as the aggregate loyalty of the object's customers to continue acquiring or using (service(s) and/or product(s) from) the object. Equity, then, may be considered a function of ($f_1$) the "likelihood of repeat purchase," which is a function of ($f_2$) loyalty, which in turn is a function of ($f_3$) customer satisfaction, which following from the standard satisfaction attitude research framework, is a function of ($f_4$) the belief and importances of attribute descriptors. Said another way, $$Equity = f_1(likelihood\ of\ repeat\ purchase) = f_2(loyalty)$$
$$= f_3(satisfaction) = f_4(beliefs,\ importances)$$

A company that has built substantial customer equity can do things that other companies cannot. In particular, the greater number of loyal customers, the greater degree of protection from competitive moves and from the vagaries of the marketplace. FIG. 1 illustrates this point. That is, customer loyalty may insulate a brand or product from competitive marketing activities and from external shocks, thus reducing risk (technically, the variance), increasing brand value and, ultimately, company value. In other words, high customer equity for an object reduces the ability of a competitor or event to shift the two components of loyalty, beliefs and behavior. For example, brand loyal customers may ignore or, even better, actively counter-argue competitive claims and resist their marketing actions. Brand loyal customers also resist, to some degree, competitive price promotions since the risk reduction attributable to the incumbent brand is greater than the value of the price reduction offered by the competitor.

Thus, evaluation of such object equity is desirable so that informed marketing and business decisions regarding the object can be made, particularly, if such evaluations can be performed cost effectively.

The primary focus of a marketing manager, when framing a marketing strategy for an object, in order of importance, is: (a) maintaining the object's loyal customer base, and (b)

increasing the number of "new loyals." Increasing sales can be seen as a direct result of these two strategic marketing focuses. For the first "maintenance of loyals" group, two questions arise: (1) why do such loyal customers decide to, e.g., purchase our product instead of the competition's product, and (2) what barriers exist for loyal light users to becoming heavier users. The answer to the first question defines the equity of the business. The answer to the second question gives management insight into how directly to increase sales—by minimizing the barriers for increasing customer loyalty. In particular, the techniques and/or features for attracting non-loyal customers, heavy users and light users, respectively, to become more loyal to an object is the input that a marketing manager needs for developing a strategy that increases sales. Also, attracting loyal customers of a competitive object represents yet another separate strategic issue. These key inputs, which are grounded in the ability to understand (summarize, quantify and contrast) the customer decision processes of target customer populations, provides the marketer with the insight required to optimally develop effective marketing strategy. Thus, a method and system for cost effectively answering the above two questions (1) and (2) is desirable so that informed marketing and business decisions regarding the object can be made.

Many marketers have made the realization that loyalty is key to a successful business strategy, and they have operationalized the research of loyalty in terms of customer satisfaction. In fact, customer satisfaction research is one of the largest and fastest growing areas of market research. There exist numerous specialty customer satisfaction assessment research orientations by market, e.g., for universities (Noel-Levitz incorporated herein by reference), for healthcare (Press-Ganey incorporated herein by reference), for government services (Opinion Research Corporation incorporated herein by reference) and for brand satisfaction (Burke, Inc. herein by reference). These marketing research organizations use methodologies (referred to herein as "attitudinal methodologies") based upon a traditional attitudinal research framework directed to assessing customer attitudes. That is, they ask questions of customers regarding their beliefs as to what degree a company's product, and competitive products, possess a given set of brand and/or service descriptors (e.g., attributes) and the relative importance of these descriptors to the company's customers (and/or the competitor's customers). The analysis output by such market research, as one skilled in the art will understand, is a set of mean belief ratings for the descriptor attributes, as well as mean importance ratings which can be broken down, if desired, for the various customer segments. Moreover, the analysis output provided by these marketing research organizations provides ongoing customer tracking to assess customer attitude changes over time, so that interpretation of the mean statement customer response scores serves as a basis for strategic decision-making by the object being evaluated. As will be detailed hereinbelow, the approaches and methodologies used by these market research organizations are believed to be sub-optimal for a variety of reasons. However, before describing perceived problems with these prior art market research approaches and methodologies, examples of various marketing challenges are first provided as follows.

Consumer goods. Consider the soft drink marketplace. There are loyal customers that, regardless of small price differences, purchase and consume virtually 100% of one brand. They are satisfied with the performance of the product and what it stands for (imagery). Marketing pressures, specifically alternating weekly price promotions by the two market leaders in supermarkets, have decreased the number of loyal customers for the brand as compared to a generation ago. This reduction in loyalty translates into additional marketing and sales costs to drive revenue, which corresponds to decreased profitability.

Durable goods. Consider the automobile marketplace as recently as a generation ago. Customers were happy to wear the label reflective of their loyalty, such as "Ford" or "Buick" or "Cadillac." This label simply meant they owned and would continue to buy their brand of car. That is, they were satisfied with the performance of the product and what it stood for (imagery). As is obvious, due to competitive (and sometimes internally counterproductive) marketing efforts, this loyalty has been greatly diminished. The result is the equity of their business, and correspondingly its profitability, has decreased.

Direct sales. Consider the recruiting and retention issues for a direct sales force (Mary Kay Cosmetics, 1989). Sales revenues are a direct function (a 0.99 correlation) of the number of active sales representatives in the marketplace. The sales force has significant turnover (non-loyalty), which is a result of dissatisfaction with the job. If the sales force can be recruited at a higher rate and will remain active longer, thereby reducing the turnover rate, the size of the sales force may increase exponentially, which translates directly into significant increases in sales revenues. The equity of the direct sales company is a function of a satisfied, loyal sales force.

Healthcare. Consider the choice of hospitals in a given geographic area. If customer-patients are satisfied, they will return for future treatments and recommend the facilities to their friends. Patient loyalty translates into continued business for the hospital. Their dissatisfaction, however, means moving their business to the competition, thereby reducing the revenue of the hospital. The equity of the hospital is a function of its satisfied, loyal customers who will continue to use its services.

Nonprofit. Consider a museum, which is financially supported to a significant degree by annual donations of its membership. Their financial contributions represent a market share across a variety of competitive nonprofit options. If the members are satisfied with the offerings and operation of the museum, they will remain loyal and continue to give. If they are not satisfied, they will decrease or cease their funding activity. In this latter case, the equity of the museum, not to mention its direct operational funds, decreases. The equity of the museum is in its loyal donor base.

Resort. Consider a country club business in a given geographic area. Satisfied customers will remain members. Dissatisfied members will seek out other options, and this translates into a lower membership, meaning lower revenues received, which in turn translates into a lesser ability to fund club operations. The result is a reduction in the equity of the country club, which is a direct function of the loyalty of its membership.

The examples of marketing situations outlined above serve to illustrate the fact that the primary function of a market-driven strategy is to maximize the equity of an object, which translates to maximizing customer loyalty, which requires gaining an understanding of what customer (and employee) perceptions are that drive satisfaction. As the above examples of marketing challenges illustrate, maximizing or increasing the equity of an object is desirable for virtually all business enterprises. Thus, it would be desirable to have a method and system for performing market research that determines the relative weights of components or aspects of an object that will maintain and increase customer satisfaction (with respect to, e.g., predetermined target customer groups). These components or aspects, when communicated and delivered by the object, will likely increase the satisfaction level, thereby increasing loyalty, likelihood of repeat purchase, and result in increasing equity (as this term is used herein).

Attitudinal Research Framework Descriptions

Attitude models (Allport, 1935, Ref. 2. of the "References" section incorporated herein by reference) represent the prototypical, most frequently used research framework utilized in the domain of marketing research. The tripartite social psychological orientations of cognitive (awareness, comprehension, knowledge), affective (evaluation, liking) and conative (action tendency) serve as the research basis of gaining insight into the marketplace by understanding the attitudes of its customers.

Questions regarding any component, or combinations thereof, of the attitude model are regarded as attitude research. Conative, for example, refers to behavioral intention, such as a likelihood to purchase, which is prototypically asked in the following scale format for a specific product/service format (Zigmund, 1982, p. 325, Ref. 11 of the "References" section incorporated herein by reference).

> ☐ I definitely will buy
> ☐ I probably will buy
> ☐ I might buy
> ☐ I probably will not buy
> ☐ I definitely will not buy Therefore, if the past purchase or consumption behavior for each individual in the sample of respondents were known from another question in the survey (or consumer diary), the behavioral intention question would be used to compute the likelihood of repeat purchase.

Satisfaction (affect for the consumption and/or use experience) is typically measured using a scale such as the following for a specific product or service (Zigmund, 1982, p. 314-315, Ref. 11 of the "References" section incorporated herein by reference).

> ☐ Very satisfied
> ☐ Quite satisfied
> ☐ Somewhat satisfied
> ☐ Neither satisfied or dissatisfied
> ☐ Quite dissatisfied
> ☐ Very dissatisfied Attitude research is based on a theoretical model (Fishbein, 1967, Ref. 8 of the "References" section incorporated herein by reference) containing two components: one, beliefs about the product attributes of the object, and two, an evaluation of the importances of beliefs (descriptors). This theoretical relationship may be represented as:

$$A_0 = \sum_{i=1}^{n} b_i e_i \quad \text{where,} \quad = \text{attitude toward the object}$$

$b_i$ = strength of the belief that object has attribute $i$ $e_i$ = evaluation of attribute $i$ $n$ = number of belief descriptors Attitude toward the object ($A_o$), then, is a theoretical function of a summative score of beliefs (i.e., "$b_i$"—descriptors or characteristics) multiplied by their respective importances ("$e_i$"). Assuming this theory to hold, market researchers construct statements to obtain beliefs specific to product and/or services, such as (Peter and Olson, 1993, p. 189, Ref. 16 of the "References" section incorporated herein by reference):

> How likely is it that 7UP has no caffeine?
> Extremely Unlikely 1 2 3 4 5 6 7 8 9 10 Extremely Likely
> How likely is it that 7UP is made from all natural ingredients?
> Extremely Unlikely 1 2 3 4 5 6 7 8 9 10 Extremely Unlikely Additionally, market researchers obtain importances using scales that generally appear in the following format (Peter and Olson, 1993, p. 191, Ref. 16 of the "References" section incorporated herein by reference):

> 7UP has no caffeine.
> Very Bad −3 −2 −1 0 +1 +2 +3 Very Good
> 7UP has all natural ingredients.
> Very Bad −3 −2 −1 0 +1 +2 +3 Very Good For the three standard types of attitude scales noted above, the researcher assigns numbers (integers) to the response categories. In the cases of the behavioral intention scales and satisfaction (affect), successive integers are used such as (+2 to −2, and +3 to −3, respectively). Analysis of the data then involves computing summary statistics for each item, for the customer groups of interest.

In sum, from the perspective of marketing research, customer understanding is derived from studying the tables of summary statistics indicative of customer responses related to a combination of product and/or service customer beliefs (cognitive), corresponding customer importances (affective) with regard to key attribute descriptors, and the likelihood of acting (conative).

Difficulties with the above attitude research methodology for measurement of attitudes include individual differences in interpretation of questions, which result in a compounding of error of measurement. Detailed below are the assumptions that underlie the use of attitude models, along with examples of how error is introduced into the resulting measures.

1. Core Meanings or Terms are Commonly Understood.

For example, when "good value" is used as a descriptor phrase to be evaluated, there could be many different interpretations, depending on each customer's definition or operationalization of the concept of value (reciprocal trade-off between price and quality).

Therefore, if the meanings of attributes, which will be used to measure beliefs and importances, differ by respondent, there is no uniformity in the responses.

2. Social Demand Characteristics will not Introduce Bias.

For example, when a socially acceptable norm (positive or negative) is used, such as in the case with automobiles with the terms "prestige" or "status," respondents consistently and significantly under report the importance of these attitude descriptors as contrasted to open-ended discussions describing their own choice behavior (Reynolds and Jamieson, 1984, Ref. 25 of the "References" section incorporated herein by reference).

3. The Descriptor Labels on the Judgment Scales are Commonly Understood.
   For example, when using word descriptors, such as "definitely" or "probably" in scale labeling, their definitions cannot be assumed to have the same meanings to each respondent.
   For example, when numbers are used, especially percentages, to define the scale points, the likelihood that a common definition or meaning of the terms are held by all respondents is very unlikely.
4. The Scales are One-dimensional.
   For example, when only end-markers of scales are used, such as "good" and "bad," this assumes these are exact opposites. It has been shown (Reynolds, 1979, Ref. 17 of the "References" section incorporated herein by reference) that a significant percentage of respondents actually use two dimensions here, namely, "good" ◄►"not good" and "bad" ◄►"not bad." Similarly, "hot" and "cold" are not opposites. Rather, "hot" ◄►"not hot" and "cold" ◄►"not cold" represent the basis for their cognitive classifications.
   If the scales are not one-dimensional, the measurements are confounded, further injecting additional error into the research data.
5. The Intervals Between the Points on the Scale will be Equal.
   For example, when considering the appropriate response that represents one's position on a numerical scale, the individual must mentally impose a metric—based upon the fact that the exact difference between all scale points is equal.
   If the respondents do not have a precise interval metric interpretation of all scales, in particular with respect to beliefs and importances, all that exists is an ordinal ranking of scores, which would not make simple means an appropriate summary measure of central tendency.

The above problematic assumptions have been individually discussed in virtually all psychology and marketing research textbooks. However, in reality, these issues have never been adequately addressed, especially in light of the compounding effect caused by multiple violations of the assumptions. Understanding the potential confounding effect of these assumption violations can be even more problematic to obtaining valid measures when the following not-previously-identified assumption is considered:

6. Importances are Assumed to be Independent of Beliefs. (That is, importances are distributed equally across belief scales. Denoted herein as the "uniform importances assumption".)
   For example, if a person has a given belief level or position on an attitude scale, e.g., an attitude of "not satisfied," what is assumed important to him/her is both: (a) some weighted composite of the importance scores across all the attribute dimensions, and (b) that these importances are somehow independent of his/her belief level. That is to say, if one asks how to increase a respondent's attitude score/satisfaction level one Δ (i.e., one scale point), the assumption that has heretofore been made is that a weighted composite of attribute scores would be needed, and regardless of the level (higher or lower) on the attitude scale, the same weighted composite is used by the person.
   Asking three questions can test this uniform importances assumption. First, an "anchor" question establishing a position on the attitude scale of interest is presented to a respondent. In the example anchor question [1] immediately below, a "satisfaction" question is presented to the respondent. Following this anchor question hereinbelow are second and third questions which simply ask for the key attribute or reason that is the basis for the person's rating in question [1].

---

[1]. ANCHOR. How satisfied are you with (BRAND "Y") product/service?
  NOT AT ALL                                          PERFECTLY
  ----      ---   --   -    0   +   ++   +++      ++++
[2]. What is the one thing that causes you to rate your satisfaction at this level? That is, why did you rate your satisfaction at (X) and not (X − 1) (one scale point lower)?
[3]. What is the one thing that would increase your satisfaction by one scale level, that is, from (X) to (X + 1)?

---

If the assumption holds that importances are equally distributed across the scale points of the attitude scale, the most likely outcomes would be that the most important attribute would be mentioned for both questions [2] and [3] above, or alternatively, that the first and second most important attributes would be mentioned in the response for questions [2] and [3].

The conclusions from customer research using the above questioning format do not confirm the uniform importances assumption. In fact, importances are not equally distributed across such an attitude response scale. To empirically test this assumption, the above three questions [1], [2], and [3] were asked of independent samples of respondents (total of 750) across the five product/service categories mentioned previously, from durable goods to nonprofits. Analysis of the responses to questions [2] and [3] revealed that: (a) in less than two percent (2%) of the cases was the same attribute mentioned for both questions [2] and [3], and (b) the first and second most important attributes (determined by a traditional market research importance scale) combined were mentioned less than 50% of the time.

Thus, if the market research question(s) is how best to improve respondents' attitudes (e.g., satisfaction level underlying loyalty), the above attitude research methodology is believed to be flawed.

Within the attitude research methodology, another newly discovered assumption that is also suspect is as follows:

7. Product or Service Attributes Drive Customer Decisions and should be the Primary Area of Research Focus.
   This assumption is held by all traditional attitude models and has been empirically demonstrated to be false. Research has shown (Reynolds, 1985, Ref. 18 of the "References" section incorporated herein by reference; Reynolds, 1988, Ref. 19 of the "References" section incorporated herein by reference; Jolly, Reynolds and Slocum, 1988, Ref. 14 of the "References" section incorporated herein by reference) that higher levels of abstraction beyond attributes (e.g., consequences and personal values) contribute more to understanding preferences and performance ratings than do lower-level descriptor attributes. Therefore, to gain a more accurate knowledge of the basis of customer decision-making, one must understand the underlying, personally relevant reasons beyond the descriptor attributes provided by respondents.

Accordingly, it is desirable to have a market research method and system that provides accurate assessments of, e.g., customer loyalty, and accurate assessments of the attributes of an object that will influence customers most if changed. In particular, it is desirable that such a market research method and system is not dependent upon the above identified flawed assumptions.

The invention disclosed hereinbelow addresses the above identified shortcomings of prior art market research methods and systems, and in particular, the invention as disclosed hereinbelow provides a market research method and system that provides the desirable features and aspects recited hereinabove.

Definitions and Descriptions of Terms (Denoted DDofT Herein)

Object: An object as used herein may be any of the following: a brand, company, organization, product or service.

Equity: The equity of an object (e.g., a brand, company, organization, product or service), may be described as the aggregate loyalty of the object's customers to continue acquiring or using (service(s) and/or product(s) from) the object. Thus, equity is a combination of customer belief and behavior built up over time that creates customer perceptions about the desirability (or undesirability) of the object, such equity being effective for inducing (or inhibiting potential) customers to perform transactions directed to the object. Equity, then, may be considered a function of ($f_1$) the "likelihood of repeat purchase," which is a function of ($f_2$) loyalty, which in turn is a function of ($f_3$) customer satisfaction, which following from the standard satisfaction attitude research framework, is a function of ($f_4$) the belief and importances of attribute descriptors.

Strategic Equity: As used herein this term refers to the equity (i.e., loyalty) in or for an object ascribed thereto by a particular population.

Market segment (or simply "segment"): The definition of a segment is a homogenous group of people who react similarly to changes in a marketing mix element. While a customer and his/her neighbor may have identical incomes and other demographic characteristics, they may have different decision structures, and react differently to marketing mix efforts. But if they have the same choice structure, they will react in the same way to marketing efforts. Accordingly, the customer and his/her neighbor are members of one segment. Choice-based segmentation is important because it helps avoid thinking of "the" customer as a monolithic entity (see Reynolds and Rochon, 2001, Ref. 28 of the "References" section above for an example of decision segmentation). It also gives clues about how to make a product/service special and better. Again, this relates to the earlier discussions of market evolution.

Optimal competitive positioning: As used herein this term refers a process of evaluating positioning options. That is, given a competitive marketplace for a particular category of products and/or services, optimal competitive positioning is the process of selecting the option that has the most potential for the target customer population.

Means-End Theory: Means-End theory examines how product (or service) attributes are the means of achieving some personal end for a consumer. The goal is to identify the chain of respondent perceptional linkages between product (or service) attributes, the consequences of those attributes for the respondent, and the respondent perceptional linkages between such consequences and the respondent's personal values which are reinforced by the identified consequences. In its most general form, Means-End analysis is a technique for identifying such perceptional chains regarding a particular subject. Symbolically, Means-End chains can represented as follows:

Attributes->Consequences->Values

Laddering: Laddering is a methodology that utilizes one-on-one, in depth interviewing of people for identifying personal hierarchies of values related to a particular object, wherein each successively higher level of the hierarchy is descriptive of a personal value or goal that is more transcendent and personal to the interviewee. Further description of laddering can be found in the following references which are incorporated by reference herein: Reynolds and Gutman, 1988, Ref. 24 of the "References" section; Reynolds, Detloff, and Westberg, 2001, Ref. 21 of the "References" section).

Laddering Interview: A Laddering interview is an interview based on the laddering methodology for eliciting chains of attributes, consequences, and values according to means-end theory. The purpose of this kind of interview is to uncover more abstract, personally motivating reasons behind choices of an interviewee or respondent. An interviewer guides the respondent through the laddering of a given subject (e.g., product or service) by asking questions such as: "Why is this important to you?" to thereby transition between each level.

Interview Designer: A specialist that defines the questions/dialog to be used with study subjects to collect data of interest. This person uses the IDefML language to define a StrEAM Interview (or a GUI tool that generates IDefML).

Interviewer: A trained person who conducts a StrEAM interview session. The Interviewer desktop drives the one-on-one conversation and is operated by the Interviewer to extract the desired information from the study subject.

Respondent: One of the subjects of the study who responds to queries made by the Interviewer through the StrEAMInterview system. No expertise is required of the Respondent other than the use of a standard computer keyboard and mouse.

Analyst: Once StrEAMInterview has collected study data, the analyst will use the StrEAMAnalysis tools to manipulate and explore the collected information regarding the subjects of interest. The primary focus will be on the decision making factors and processes revealed by the study and their relationship to various other known factors.

Administrator: Conducting a StrEAM study requires the organization and maintenance of various data items, tools, schedules, and people. Included in this is the scheduling of one-on-one interviews (appointments), assignment of interviewers, handling of data, et cetera.

Top of mind (TOM) responses: Responses to interview questions that are open ended wherein the respondent is asked "what comes to mind" regarding, e.g., an object.

REFERENCES SECTION

The following references are fully incorporated herein by reference as additional information related to the prior art and/or background information related to the present invention.

Ref. 1. Aaker, D. (1991). *Managing Brand Equity*. New York: Free Press.

Ref. 2. Allport, G. W. (1935). Attitudes. In C. Murchison (Ed.), *Handbook of Social Psychology*. Worchester, Mass.: Clark University Press.

Ref. 3. Blattberg, R., Getz, G. and Thomas, J. (2001). *Customer Equity: Building and managing relationships and valuable assets*. Boston, Mass.: Harvard Business School Press.

Ref. 4. Carroll, J., Green, P. E. and Schaffer, C. (1986). Interpoint Distance Comparisons in Correspondence Analysis, *Journal of Marketing Research*, 23 (August): 271-80.

Ref. 5. Cliff, N. (1987). *Analyzing Multivariate Data*. New York: Harcourt, Brace and Jovanovich.

Ref. 6. Cliff, N. and Keats, J. A. (2003) *Ordinal Measurement in the Behavioral Sciences*. Mahwah, N.J.: Lawrence Erlbaum Associates.

Ref. 7. Christensen, G. L. and Olson, J. C. (2002). Mapping Consumers' Mental Models with ZMET. *Psychology and Marketing*, Vol. 19(6), 477-502.

Ref. 8. Fishbein, M. (1967). Attitude and Prediction of Behavior. In M. Fishbein (Ed.), *Readings in Attitude Theory and Measurement*. New York: John Wiley and Sons.

Ref. 9. Gutman, J. (1982). A Means-end Chain Model based on Consumer Categorization Processes. *Journal of Marketing*, 46 (1), 60-72.

Ref. 10. Gutman. J. and Reynolds. T. J. (1978). An Investigation of the Levels of Cognitive Abstraction Utilized by Consumers in Product Differentiation. In J. Eighmey (Ed.), *Attitude Research Under the Sun*. Chicago, Ill.: American Marketing Association, 128-150.

Ref. 11. Zikmund, W. G. (1982). *Exploring Marketing Research*. New York: Dryden Press.

Ref. 12. Howard, J. (1977). *Consumer Behavior: Application and Theory*. New York, N.Y.: McGraw-Hill.

Ref. 13. Johansson, J. and Nonaka, I. (1996) *Relentless. The Japanese Way of Marketing*. New York, N.Y.: HarperBusiness.

Ref. 14. Jolly, J. P., Reynolds, T. J., and Slocum, J. W. (1988). Application of the Means-End Theoretic for Understanding the Cognitive Bases of Performance Appraisal. *Organization Behavior and Human Decision Process*, Vol. 41, 153-179.

Ref. 15. Kendall, M. G. (1975). *Rank Correlation Methods*. London: C. Griffin.

Ref. 16. Peter, J. P. and Olson, J. (1993). *Consumer Behavior and Marketing Strategy*. Homewood, Ill.: Irwin.

Ref. 17. Reynolds, T. J. (1979). Dominance Interpretation of Binary Grid Data. *Proceedings of 1979 Southern Marketing Association*, Chicago, Ill.: American Marketing Association.

Ref. 18. Reynolds, T. J. (1985). Implications for Value Research: A Macro vs. Micro Perspective. *Psychology & Marketing*, Vol. 2, No. 4, 297-305.

Ref. 19. Reynolds, T. J. (1988). The Impact of Higher Order Elements on Preference: The Basic Precepts and Findings of Means-End Theory. *Proceedings of 1988 American Marketing Association Educator's Conference*, Chicago, Ill.: American Marketing Association.

Ref. 20. Reynolds, T. J. and Craddock, A. (1988). The Application of the MECCAS Model to the Development and Assessment of Advertising Strategy: A Case Study. *Journal of Advertising Research*, 1988, Vol. 28 (2), 43-54.

Ref. 21. Reynolds, T.J., Dethloff, C. and Westberg, S. (2001) Advancements in Laddering. T. Reynolds and J. Olson (Eds.), *Understanding Consumer Decision-Making: The Means-End Approach to Marketing and Advertising Strategy*, Mahwah, N.J.: Lawrence Erlbaum Associates.

Ref. 22. Reynolds, T. J., Gengler, C. and Howard, D. (1995). A Means-End Analysis of Brand Persuasion through Advertising. *International Journal of Research in Marketing*, Vol. 12 , 257-266.

Ref. 23. Reynolds, T. J. and Gutman, J. (1984). Advertising is Image Management. *Journal of Advertising Research*, 24(1), 27-36.

Ref. 24. Reynolds, T. J. and Gutman, J. (1988). Laddering Theory, Method, Analysis and Interpretation. *Journal of Advertising Research*, Vol. 28(1), 11-31.

Ref. 25. Reynolds, T. J. and Jamieson, L. (1984). Image Representations: An Analytical Framework. In J. Jacoby and J. Olson (Eds.), *Perceived Quality of Products, Services, and Stores*. Lexington, Mass.: Lexington Books.

Ref. 26. Reynolds, T. J. and Olson, J. C. (2001). *Understanding Consumer Decision-Making: The Means-End Approach to Marketing and Advertising Strategy*, Mahwah, N.J.: Lawrence Erlbaum Associates.

Ref. 27. Reynolds, T. J. and Rochon, J. (1991). Strategy-Based Advertising Research: Copy Testing is not Strategy Assessment. *Journal of Business Research*, Vol. 22, 131-142.

Ref. 28. Reynolds, T. J. and Rochon, J. (2001). Consumer Segmentation based on Cognitive Orientations: The ChemLawn Case. In T. Reynolds and J. Olson (Eds.), *Understanding Consumer Decision Making: The Means-end Approach to Marketing and Advertising Strategy*. Mahwah, N.J.: Lawrence Erlbaum Associates.

Ref. 29. Reynolds, T. J., Rochon, J. and Westberg, S. (2001). A Means-End Chain Approach to Motivating the Sales Force: The Mary Kay Strategy. In T. Reynolds and J. Olson (Eds.), *Understanding Consumer Decision Making. The Means-end Approach to Marketing and Advertising Strategy*. Mahwah, N.J.: Lawrence Erlbaum Associates.

Ref. 30. Reynolds, T. J. and Sutrick, K. H. (1986). Assessing the Correspondence of a Vector(s) to a Symmetric Matrix Using Ordinal Regression. *Psychometrika*, Vol. 51(1), 101-112.

Ref. 31. Reynolds, T. J. and Trivedi, M. (1989). An Investigation of the Relationship Between the MECCAS Model and Advertising Affect. In A. Tybout and P. Cafferata (Eds.), *Advertising and Consumer Psychology* (Vol. IV). Lexington, Mass.: Lexington Books.

Ref. 32. Reynolds, T. J. and Westberg, S. J. (2001). Beyond Financial Engineering: A Taxonomy of Strategic Equity. In T. Reynolds and J. Olson (Eds.), *Understanding Consumer Decision Making: The Means-end Approach to Marketing and Advertising Strategy*. Mahwah, N.J.: Lawrence Erlbaum Associates.

Ref. 33. Reynolds, T. J., Westberg, S. J., and Olson, J. C. (1997). A Strategic Framework for Developing and Assessing Political, Social Issue and Corporate Image Advertising. In L. Kahle and L. Chiagouris (Eds.), *Values, Lifestyles and Psychographics*. Mahwah, N.J.: Lawrence Erlbaum Associates.

Ref. 34. Schumpeter, J. (1934). *The Theory of Economic Development*. Cambridge, Mass.: Harvard University Press.

OBJECTS OF THE INVENTION

The following are objects of the present invention:

Provide a personal, interactive interview context for performing market research interviews via a network such as the Internet.

Enable the creation of a structured interview framework.

Enforce a flexible, but deliberate workflow for conducting an interview via a network such as the Internet.

Give automated assistance for the interviewer during an interview, e.g., via the interview application residing on an interviewer's computer (FIG. 29) in communication with the interview manager (FIG. 29) as described in subsection entitled "Major Components" of the StrEAMInterview Application Overview section hereinbelow.

Record results in a flexible, extensible, scalable form.

Actively support the process of "coding"/"categorizing" the resulting interview data.

SUMMARY

The present invention (denoted StrEAM™ herein) is a method and system for performing market research and developing marketing strategies by focusing on how to increase customer satisfaction and loyalty. The present invention also provides an effective method and system for the assessment of customer loyalty and satisfaction for an object whose market is being evaluated.

It is an aspect of the present invention to determine the substantially loyal customer groups for an object being marketed, and to understand and contrast these loyal customer groups with less loyal customer groups. In particular, the present invention facilitates understanding what drives decision making in a customer population (herein meaning the aggregate population of both customers and/or possible customers) when it comes to a particular object being marketed to members of the population. Typically, price sensitivity and the beliefs of such population members about the object are the important factors for such decision making. For the present discussion, price sensitivity and customer beliefs can be described as follows:

(a) Price sensitivity may be defined as the degree to which an expenditure (e.g., price or donation) is a barrier to object acquisition (e.g., purchase or contribution). Thus, for a given customer population, there is a first segment of the population for which there may be a price sensitivity barrier that is a "absolute" barrier; i.e., the product/service (more generally, object) is simply considered to be too expensive. For a second population segment there may be a price sensitivity barrier defined by these possible customers not deciding to spend their funds on the object. For example, many individuals could buy a jar of the finest caviar, and most choose to not do so. FIG. 2 is a snapshot of an example distribution of a population of possible customers.

(b) Regarding the distribution of customer beliefs about a specific brand of an object, one distribution might be as illustrated in FIG. 4. That is, some customers may view an object as inferior or unacceptable, some as comparable to competing objects in its class or acceptable, some may see it as better, and some may say they think it is superior, all things—including price—considered.

In one aspect of the present invention, a joint distribution of possible customer beliefs and customer sensitivities regarding an object, as shown in FIG. 5, may be output by the present invention. In particular, the present invention can identify not only important customer population segments (e.g., the typical, relatively small segment whose members believe that a particular object is superior AND that price is a minor consideration, i.e., upper left-hand portion of the sensitivity/beliefs matrix of FIG. 5), but also identify features or characteristics of the object that: (a) produce satisfaction in customers, and/or (b) if changed will enhance customer satisfaction with the object. Accordingly, the present invention is useful for understanding the reasons for customer loyalty to substantially any marketed object. For example, for an object identified as "Brand A" (FIG. 5), the present invention is useful for understanding the reasons for the loyalty of the customer population members represented by, e.g., the upper left-hand (non-shaded) four cells of the Joint Distribution of User's Beliefs and Sensitivities graph in FIG. 5. Additionally, the present invention provides the ability to contrast such loyal segments of the customer population (e.g., segments represented by the upper left-hand non-shaded four cells in (FIG. 5) with customer population members represented by other (non-shaded) cells in FIG. 5. Thus, the present invention can be useful for determining strategic market positioning strategies that can induce less loyal members of a customer population to become more loyal to a particular brand or object, and thereby become classified in, e.g., the upper left hand four cells of FIG. 5.

One aspect of the present invention is that for a given market research issue/problem, a joint distribution (as in FIG. 5) of price sensitivity and conditional beliefs may be output for integration with traditional research methodologies. Utilizing such a joint distribution summary, in combination with standard attitudinal and behavioral measures, may give a researcher the opportunity to contrast key segments, thereby gaining an understanding as to what measures best account for differences between customer population segments. However, the question remains: are the traditional attitudinal measures capturing the basis for customer decision-making?

It is also an aspect of the present invention to provide a framework for a detailed Laddering interview process, wherein there are four (4) levels to the laddering interview process. That is, the level (or rung) denoted "consequences", in the means-end theory description in the Definitions and Descriptions of Term section above, is divided into two distinct categories of "Functional Consequences" and "Psychosocial Consequences" (as also described in the Definitions Description of Terms section). Symbolically, this enhanced chain can be represented as follows:

Attributes->Functional Consequences->Psychosocial Consequences->Values

It is a further aspect of the present invention to enhance the laddering interview technique used by the present invention with an additional interviewing methodology. In some laddering interviews, beginning at the object attribute level and moving up the "levels of abstraction" to personal values, such interviews may not appropriately capture the respondent's decision structure related to the object. For example, for market assessments of objects, such as cars, wherein many prospective customers are interested in the image projected by driving or owning certain car models, an additional/alternative interview methodology may be used, known as "chutes". In the chutes interview methodology, one or more questions (i.e., Egosodic Valenced Decision questions as described in the Definitions and Descriptions of Terms section above) are directed to the interviewee for obtaining a "top of mind" (TOM) response(s) related to the object being researched (or competitive object(s)). Once such a TOM response(s) is obtained, additional questions are posed to the interviewee, wherein these additional questions are intended to obtain interviewee responses that recite what features of the object (or competitive object(s)) that typically serve as the centerpiece to choice for more high image categories. By initializing the laddering process through Egosodic Valenced Decision Structure (EVDS) questions, the general decision construct can be obtained. Then, by going "down" to what features of the product/service are used to define the presence of the construct ("chutes") and then going back up to values, a complete ladder can be developed. These decision networks can be developed individually for common TOM descriptors, yielding specific CDMs, which represent decision segments.

Five Aspects

The method and system of the present invention provides the following five major benefits over prior art market research systems:

1. A research method and apparatus is provided to identify and prioritize various customer market segments for analysis. In particular, the present invention can be used for assessing the various market segments with respect to their relative contribution to the sales related to an object.
2. A research method and apparatus is provided to determine the key underlying customer decision elements within customer decision structures that have the highest potential to increase customer satisfaction underlying loyalty.
3. A research method and apparatus is provided wherein computation of statistical indices are generated that can be used to track the changes in customer satisfaction within or for an object (e.g., a business organization) over time.
4. A research method and apparatus is provided wherein customer market segments can be identified by contrasting loyal customers with other customers that use a product or service.
5. A research method and apparatus is provided for quantifying the contribution of key perceptual associations that correspond to customer decision structures, caused by communications that drive affect for a product or service.

The present invention is a method and apparatus for obtaining and evaluating interview information regarding a particular topic, thereby determining significant topic-related factors that, if changed, are more likely to persuade the interviewees (and others with similar perceptions) to change their opinions or perceptions of the topic. The invention (also identified by the product name StrEAM®) includes two subsystems. A first such subsystem is an interactive interview subsystem (also identified by the product name StrEAMInterview) which is a set of computer-based tools used to conduct rigorous interviews and capture results therefrom for topics related to areas such as consumer market research, voter analysis, opinion polls, et cetera. A second subsystem is an interview data analysis subsystem (also referred to as StrEAMAnalysis herein) that includes an integrated set of software components for analyzing interview data. The interview data analysis subsystem includes interactive software tools that allow a market research analyst to: (a) categorize the interview data in terms of meaningful categories of responses, such as hierarchical chains of means-end categories (generally, chains of at least four in length; however, longer chains are within the scope of the invention).

The interactive interview subsystem StrEAMInterview is, in some embodiments, network-based such that the interviews can be conducted remotely via a telecommunications network (e.g., the Internet) in a interviewee convenient setting. The interactive interview subsystem provides automated assistance to an interviewer when conducting an interview wherein both interview presentations (e.g., interview questions) are provided as well as information for interpreting or classifying the interview data as it is gathered. In particular, the interactive interview subsystem is based on obtaining various hierarchical views of each interviewee's reason for having a particular opinion or perception of an interview topic. The interview presentations presented to each interviewee (also referred to a respondents herein) are designed to elicit interviewee responses that allow models to be developed of the interviewee's perceptual framework as it relates to the object that is the subject of the interview. In particular, open-ended questions may be presented to the interviewee, thereby allowing the interviewee greater flexibility of expression in providing insight into his/her perceptions of the object.

Another aspect of the present invention is that it can be administered and analyzed via the Internet using either real-time interaction with a trained interviewer, or substantially automated so that the interviewing process is substantially conducted by one or more computer algorithms.

The customer orientation focused upon here is not solely defined as those who buy the product. Clearly, definition is much broader, because distributors, employees, investors, and suppliers—even competitors—have sets of memories that influence their actions with regard to a company's product(s) and/or service(s). In applications including channel management, investor relations, and employee relations, we find the same phenomena are present: Beliefs, behavior, attitude, and loyalty, building over time and experience, yield a set of perceptions that create value in the minds of each of those groups. We know, moreover, that those perceptual equities interact with one another. We know from applications to such diverse firms as cosmetics companies and automobile manufacturers that people who feel strongly about the goodness of their employer tend to be better employees. We know from experience with a wide group of companies—direct selling companies, service stations, insurance agencies, automobile dealerships, and electrical and industrial distributors—that people who feel strongly about the goodness of their supplier tend to be better distributors, by almost any measure that can be observed.

A further feature of the present invention is to provide better direction in determining advertising for an object. In particular, the present invention can be used to derive advertising that is more effective, because such adverting can be provided with messages to which a targeted population is positively disposed. Additionally, the present invention has further advantages in retaining employees, retaining or attracting distributors, and retaining or attracting investors, via targeted advertising or other targeted marketing materials derived using the market insights resulting from various embodiments of the invention.

Other benefits and features of the present invention will become apparent from the accompanying drawings and Detailed Description hereinbelow.

BRIEF DESCRIPTION OF THE DRAWINGS

FIG. 1 is a graph showing how customer loyalty affects a company's sales as the company's product market becomes increasingly competitive.

FIG. 2 is an example of a distribution of responses from a sampling of a customer population regarding the degree to which the price of a product (Brand A) drives the purchasing of the product.

FIG. 3 shows graphs that represent the progression of a market from the innovation stage (where a product is initially developed) to an undifferentiated market at t1 (where the product is initially commercialized and there is no substantially significant distinction between market competitors) to a segmented market at a later time t2 (wherein it is not uncommon for there to be three market segments: one segment of product providers emphasizing quality of the product, one segment of product providers emphasizing the value that customers receive from purchasing the product, and one segment of product providers emphasizing the low price of the product). In many cases, product providers emphasize the value received by customers purchasing their products.

FIG. 4 illustrates a distribution of customer beliefs about a specific brand of, e.g., a product (more generally an object).

FIG. 5 illustrates a representative customer population distribution, wherein customers have rated a product (Brand A) both on their belief in the quality of the product and to what extent price is a barrier in purchasing the product. Note, the upper right-hand cells corresponding to (Not a barrier, Superior), (Not a barrier, Good), (Minor barrier, Superior), and (Minor barrier, Good) are generally representative of the segment of the customer population having an important amount of loyalty to the product. Accordingly, the greater percentage of customers in these cells, the more the company providing Brand A is insulated from competitive market pressures.

FIG. 6 shows the hierarchical levels (i.e., rungs) of decision-making information that are used by individuals in making a decision, such as determining whether to, e.g., purchase a product or remain with a company. Note that the hierarchical levels shown here are denoted a "ladder".

FIG. 7 provides further information related to the four levels of decision-making reasons (i.e., a ladder) that customers give for purchasing (or not purchasing) a particular product brand. In particular, such decision-making reasoning is related directly to attributes of the product at the lowest level and, as the reasoning process moves up the levels, the reasons recited by customers become progressively more personal.

FIG. 8 shows some representative laddering decision structures that express choice determination for one beer brand over another in a set of beer drinkers.

FIG. 9 shows how the results (i.e., data) from interviews with a customer (beer drinking) population can be summarized or aggregated as a directed graph, denoted herein as a Customer Decision-making Map or CDM. The directed graph shown in the present figure represents the beer drinking population sampled in obtaining the laddering decision structures of FIG. 8.

FIG. 10 shows the high level steps performed by the market research method and system of the present invention. In particular, the present invention provides a novel methodology and corresponding computational system for identifying cost-effective aspects of a marketed object to change and/or emphasize (de-emphasize) so that additional market share is obtained and/or greater customer loyalty is fostered.

FIG. 12 is a summary of the reasons why members of a country club joined the club and their corresponding weekly usage of the club, wherein a marketing analysis of the club is performed using aspects of the present invention.

FIG. 13 shows the sub-codes (i.e., subcategories) of aspects of the country club with their respective percentages developed from the equity question responses for the two USAGE groups. Noteworthy is the "Light Users" (identified as the golf segment) largest negative of "Pace of Play," and the largest equity is the staff and level of service (ENVIRONMENT), in particular, for the "Heavy Users."

FIG. 14 shows a table having various values calculated by the present invention for features offered by the country club. In particular, the following values are shown: importance values (I) which are representative of the perceived importances of the various features provided by the country club; belief values (B) which are representative of how favorably various features of the country club are viewed (the higher the number, the more favorably the feature is viewed); equity attitude values (EA) which are relative rankings of the country club features wherein each EA is derived as a composite function of both a corresponding importance and a corresponding belief. Additionally, the present figure shows computed values (denoted leverages or leverage indexes) that are indicative of the potential change in the equity attitude (EA) that may be gained by country club management concentrating club improvement efforts on the club features/areas that have the high leverage values.

FIG. 15 is a table showing the distribution of museum supporters' answers to the question: "Why did you join the Circle of Friends?". Additionally, the table shows, for each answer, the extent to which the supporters providing the answer use or access the museum facilities/events.

FIG. 16 shows a summary contrast of the PAST and FUTURE TREND anchor questions wherein museum supporters are asked about their past and anticipated future participation in museum activities.

FIG. 17 shows a table similar to the FIG. 14 which identifies the areas within the museum operations, which if improved, are likely to have the greatest positive affect on museum supporters views of the museum.

FIG. 18 shows a table of museum supporter responses to the question: "What is your primary source of museum activity information?".

FIG. 19 is a table summarizing the responses of patients of a hospital regarding their satisfaction with various groups and/or facilities of the hospital.

FIG. 20 is a table summarizing, for the hospital nurse group, the nurse subareas (also denoted "sub-codes") that hospital patients mentioned (either positively or negatively). Additionally, the table provides the importance values (I) and the belief values (B) for each of the nurse subareas.

FIG. 21 provides further illustration of a result of the analysis techniques of the present invention. In particular, this figure is representative of various diagrams that may be generated by the invention, wherein two population groups (i.e., "customer population" groups) have their decision-making reasons (e.g., for staying with or leaving a direct sales company as a sales associate) categorized according to whether their perception of the company is positive or negative as it relates to each decision-making reason. Thus, distinguishing decision-making reasons between the two population groups would be classified in the upper left-hand cell (labeled "Leverageable Equity"), and the lower right-hand cell (labeled "Competitive Equity") of the figure. For example, in the case of company loyalty, the decision-making reasons for the upper left-hand cell are the reasons that a population group with loyalty to the company perceives the company as highly positive, while the less loyal population group perceives the company as substantially less positive (i.e., "low" in the present figure). Conversely, the decision-making reasons for the lower right-hand cell are the reasons that the less loyal population group perceives the company as highly positive, while the more loyal population group perceives the company as substantially less positive (i.e., "low" in the present figure). Accordingly, by generating diagrams such as the one in the present figure, the present invention allows business management to better determine marketing and/or business strategies that: (a) can potentially change the perceptions of potential customers so that, e.g., their decision-making reasons become more like those of a loyal customer population, (b) change the object (e.g., product, brand, company, etc.) so that the decision-making reasons in the lower right-hand cell move to another cell, and preferably to the upper left-hand cell, and/or (c) select individuals whose decision-making reasons are more consistent with the loyal population group.

FIG. 22 shows a "customer decision map" (CDM) summarizing the decision-making chains determined according to the present invention for both the direct sales associates that are intending to stay with the direct sales company, and the direct sales associates that are considering leaving the company.

FIG. 23 is an instance of the diagram of FIG. 21 that identifies the decision-making reasons used by direct sales associates that are intending to stay with the direct sales company.

FIG. 24 diagrammatically shows the results from a sequence of interview questions for generating a ladder, wherein the first response was not the first rung of the ladder (i.e., an object attribute).

FIG. 25 shows the five decision-making chains obtained from "top of mind" (TOM) questions related to purchasing automobiles.

FIG. 26 is an instance of the diagram of FIG. 21, wherein FIG. 26 shows the distinguishing decision-making reasons between respondents who are first time buyers of an automobile having a particular nameplate, and others that "considered, but rejected" automobiles having the particular nameplate.

FIG. 27 illustrates the four primary components of a system for tracking equity according to the present invention, i.e., examination of the meta-category, examination of the drivers of choice and consumption (including corporate image), self-reported trend forecasts, and an evaluation of the effects of marketing activities.

FIG. 28 shows an alternative decision-making hierarchy that may be used with the present invention.

FIGS. 35A through 35C provide descriptions about the types of interview questions that the present invention supports.

FIG. 37 shows a computer display for viewing interview data when building a coding model. In particular, this figure shows that the operator is able to review the interview ladders one-by-one in order to code individual components (elements).

FIG. 42 shows a display screen for use by an analyst when selecting a data set.

FIG. 43 shows a computer display for use in determining significance values.

DETAILED DESCRIPTION

Figure 11A:
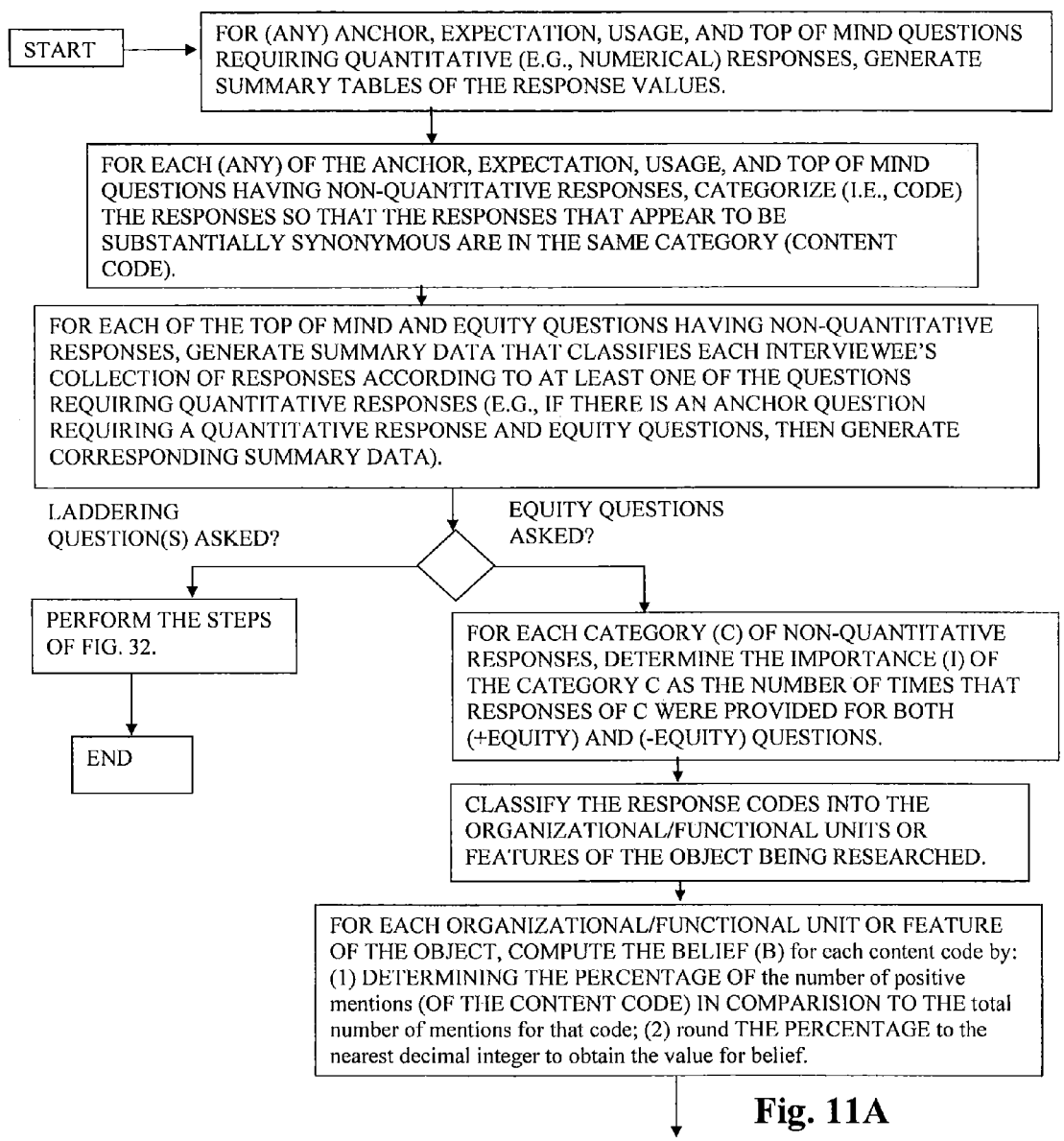
FIGS. 11A and 11B illustrate the steps of a flowchart showing additional details of the steps performed by the present invention.

The present invention is substantially based on a market research theory termed means-end theory (as described by the following references incorporated herein by reference: Howard, 1977, Ref. 12 of the "References" section; Gutman and Reynolds, 1978, Ref. 10 of the "References" section; Gutman, 1982, Ref. 9 of the "References"). Means-end theory hypothesizes that end-states or goal-states (defined as personal values) serve as the basis for the relative importance of attributes (e.g., of a product or service). That is, attributes derive their importance by satisfying a higher-level consumer need. Said another way, attributes have no intrinsic value other than providing the basis for the consumer to achieve a higher-level goal. For example, "miles per gallon" is an attribute of automobiles, but it derives its importance from "saving money" which, in turn, may be personally relevant because it enables the consumer to "have money to purchase other consumer items" or perhaps "save money." Means-end theory postulates that it is the strength of the desire to achieve these higher-level goals or motives that determines the relative importance of product/service attributes, which makes their identification translate directly into understanding the basis of customer decision-making (a more detailed discussion of means-end theory can be also found in Reynolds and Olson, 2002, fully incorporated herein by reference).

A standard methodology used to uncover such means-end higher-level goal or value hierarchies is termed laddering as described in the Definitions and Descriptions Terms section hereinabove. The laddering methodology models both the structure and content representative of the associative network of cognitive meanings that are rendered in a customer's memory, and thus, models a basis of decision-making. Importantly, with the present invention, interviews of a customer population can be conducted for: (a) obtaining, for those interviewed, the most important (object preference discriminating) attribute(s) that underlie object selection, and then (b) laddering such attributes to higher levels by asking alternative forms of a question such as "Why is that important to you?". Thus, in performing steps (a) and (b) immediately above for each interviewee (also denoted "respondent" herein), the interviewee's personal cognitive decision structure can be modeled. In particular, the applicant has discovered that a four-level goal/value hierarchy (as shown in FIG. 6) is effective for modeling personal decision making regarding, e.g., the purchase or selection of a particular product or service (more generally, object). That is, the personally important attributes of an object are identified by an interviewee (as the first level of the ladder); secondly, the personally important functional consequences related to the interviewee consuming and/or using the object are determined (as the second level of the ladder); thirdly, the psycho-social consequences that the interviewee obtains from consuming and/or using the object are determined (as the third level of the ladder); and finally, the personal values and/or end-states (goals) that the interviewee is motivated to obtain are determined.

An illustrative embodiment of the present invention for performing the laddering process is represented in FIG. 7. Note that, while implication goes "up" the rungs of the ladder, relevance (also denoted as importance in the art) goes "down" the rungs of the ladder (e.g., a psycho-social consequence derives its relevance from a values and/or end-state (goals) that the psycho-social consequence helps a person achieve). Thus, a primary aspect of the present invention is to determine such ladders that model an interviewee's decision-based processes that link attributes of an object to personal values of the interviewee. Moreover, the present invention can be used to understand which rung of such a ladder is the most important and why it matters to an . In particular, the present invention is useful for understanding the motives that result in a person's placement along the quality-value-price "density function" of FIG. 3.

In FIG. 8, some representative laddering decision structures are presented that express choice determination in a set of beer drinkers. To understand customer decision structures regarding a particular object (e.g., beer), a summary of such laddering decision structures is required. The results (i.e., data) from a customer population can be summarized or aggregated in a directed graph, denoted herein as a Customer Decision-making Map or CDM, such as the directed graph shown in FIG. 9, which represents the beer drinking population sampled in obtaining the laddering decision structures of FIG. 8. That is, by aggregating the laddering decision structures across a relevant sample of consumers, a customer decision map (CDM) of the product/service (more generally, object) category can be constructed. Such a summary hierarchical CDM contains the key discriminating attributes, functional consequences, psycho-social consequences and personal values, along with the dominant pathways that represent the associative decision networks of the customer population interviewed using the present invention. Thus, by knowing the salient attributes that underlie choice and then connecting them to the personal meanings that define their relevance to the consumer, a user of the present invention essentially has a graphical summary of the common customer decision networks in the marketplace.

Before describing the computational and network features of the present invention, a description of the methodologies used by the present invention, as well as a number of market research examples will be provided, wherein the methodologies and examples are illustrative of the use of the present invention. In particular, these methodologies and steps are illustrated in various market research study examples hereinbelow.

At a high level, the market research method (more generally, "perception" research method) of the present invention performs at least the first four of the five steps of FIG. 10. In step 1 of FIG. 10, a research problem/issue is specified (i.e., framed) in a manner that:

(a) identifies the customer population, whose perception of an object related to the problem/issue is to be investigated; and (b) allows the construction of interview questions in which the interview responses can be used to identify particular aspects of the object, wherein a change in these particular aspects is more likely (than a change to other aspects of the object) to generate more favorable responses from the customer population.

Subsequently, in step 2, research (i.e., interview) questions are developed according to the framing of the research problem/issue. Note, it is a feature of the present invention that the interview questions developed include substantially different questions from the types of questions asked in most prior art market research systems and methodologies. In particular, various "equity" questions may be constructed that are intended to elicit interviewee responses in order to identify aspects of the object that could change their perception of the object (positively and/or negatively). Additionally or alternatively, various "laddering" questions may be constructed for obtaining means-end chains of interviewee perceptions related to the object, wherein collections of such chains (also referred to as "ladders") can provide insight into the perceptual framework of the target customer population. Thus, for instance, by determining the values of a target customer population, marketing or advertising presentations may be developed that take existing features of the object and present them in a way that emphasizes their positive relationship to the values of this target customer population. Optionally, the perceptual framework of the target customer population also may be used to determine how to most cost effectively enhance or modify the object so that it appeals more to the target customer population (i.e., is more consistent with the decision chains of the target customer population).

In step 3, interviews are conducted with individuals of the target customer population, wherein responses to the questions from step 2 are obtained. Then, in step 4, the question responses are analyzed according to techniques and methodologies of the present invention for determining one or more of the following: (a) the perceptual framework of how the target customer population perceives the object being researched, (b) the relative importance of a change in various aspects of the object being researched, and/or (c) the relative importance of a change in various marketing aspects of the object being researched.

Finally, in step 5, strategic decisions can be made by those responsible for proposing how to address the problem/issue.

Regarding step 2 above, the applicant has discovered that the answers to four market issue/problem "framing questions" provide substantially all the marketing information needed to develop a sufficiently clear understanding of the market issues to be investigated so that appropriate (i.e., according to the present invention) market research interview questions can be constructed. Accordingly, it is an important aspect of the present invention that only a handful of specific questions (e.g., the four framing questions provided in the business examples hereinbelow) are required to address a marketing issue/problem, if the issue/problem is framed in terms of the customer decision-making that underlies satisfaction, and ultimately, loyalty. In one embodiment, these framing questions are:

1. Who are the relevant customers?
2. What are the relevant behaviors (and attitudes) of interest?
3. What is the relevant context (customer environment)?
4. What are the (future) competing choice alternatives?

Once a concise statement of the issue/problem to be researched is generated from the answers to such framing questions, interview questions can be generated according to the present invention. One important aspect of the present invention is that a substantially reduced number of market research questions are generated for presentation to members of a target population (e.g, the members of the country club), in comparison to the number of questions likely required if a standard attitudinal market research survey were conducted wherein 50 to 100 or more questions are likely to be generated in order to assess the beliefs and importances of a predetermined set of attribute descriptors. In particular, the present invention provides a substantially reduced number of questions (e.g., approximately 15 to 30 questions) to interviewees including at least some of the following questions (or their equivalents):

1. An information question for obtaining relatively factual information related to an object being researched, such as:
   a. What car did you buy last?
   b. In the last 12 months about how many museum activities and events did you attend?
   c. In an average week in the summer, about how much do you utilize each of the club's facilities?
2. An "expectation" question, inquiring of the interviewee (i.e., respondent) an expectation related to an object being researched.
3. An "anchor" question, inquiring of the interviewee as to his/her satisfaction with the object.
4. For each anchor question, two "equity" questions are asked of the interviewee as follows.
   a. A question (identified as "+EQUITY" hereinbelow) that requests the interviewee to identify at least one of the most important positive aspects of the object being researched wherein the aspect is the basis for the interviewee rating the object at an importance of "X" rather than a predetermined lesser importance of, e.g., "X−1" (on a satisfaction scale where larger values correspond to a greater satisfaction with the object).
   b. A question (identified as "−EQUITY" hereinbelow) that requests the interviewee to identify at least one of the most important changes to the object being researched, wherein such a change could make or induce the interviewee to change his/her satisfaction rating of the object from "X" to a predetermined greater importance of, e.g., "X+1" (on a satisfaction scale where larger values correspond to a greater satisfaction with the object).
   Note that it is within the scope of present invention that: (i) the equity questions hereinabove may be phrased in various ways, (ii) the predetermined increment (e.g., −1 or +1) above may be any discrete increment corresponding to a scale of interviewee satisfaction, (iii) the increment used in each question need not be predetermined, need not be fixed, and (iv) in at least one embodiment of the invention, there may be no increment at all. Regarding (iv), the immediately above equity questions (a) and (b) may be phrased, respectively, as follows:
   c. A question that requests the interviewee to identify at least one of the most important positive aspects of the object being researched, wherein the aspect is the basis for the interviewee rating the object at an importance of "X" rather than a lesser importance (on a satisfaction scale where larger values correspond to a greater satisfaction with the object).
   d. A question that requests the interviewee to identify at least one of the most important changes to the object being researched, wherein such a change could cause or induce the interviewee to change his/her satisfaction rating of the object from "X" to a greater importance (on a satisfaction scale where larger values correspond to a greater satisfaction with the object).
5. Laddering questions, for obtaining, i.e, a ladder of interviewee responses corresponding to the ladder levels (described hereinabove):
   Attributes->Functional Consequences->Psychosocial Consequences->Values
6. Top of mind (TOM) questions, wherein a first of these questions (referred to in the art as an Egosodic Valenced Decision Structure question) asks the respondent a "what comes to mind" question related to an object (e.g., "What comes to mind when you think of SurfNOW surfboards?"). Subsequently, there may be one or more follow up questions (referred to in the art as valence questions) to obtain response(s) that indicate whether the response to the "what comes to mind" question is positive or negative for the respondent. Following this latter question, an additional question of "Why?" the response to the "what comes to mind" question is positive or negative may be asked. For example, in response to the above "what comes to mind" question about the SurfNOW surfboards, a respondent might reply "maneuverability", and to the question regarding whether the respondent's reply is positive or negative, the respondent might answer that it is positive. Finally, in reply to the "Why?" question, the respondent may state: "the surfboard's short length".
   Note that once such TOM-question responses are obtained, laddering questions may follow in order to construct a ladder of the respondent's decision structure related to the object of the TOM questions (e.g., SurfNOW surfboards above).

Regarding step 3 above, it is an aspect of the present invention to provide a computed-aided interview subsystem which assists the interviewer in conducting interviews, and in particular, conducting interviews remotely via a communications network such as the Internet.

Figure 11B:
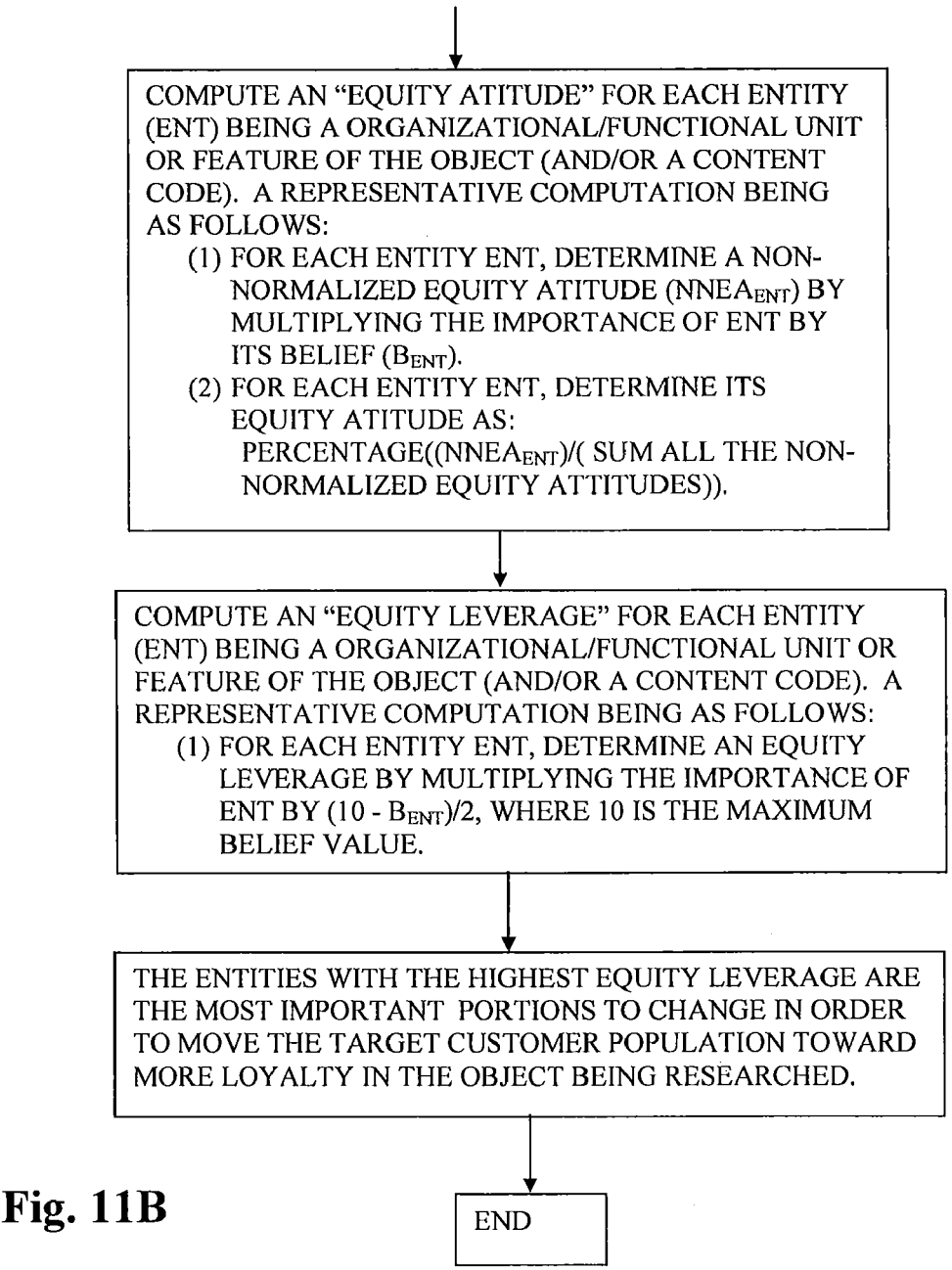

Regarding step 4 above, a high level flowchart of the steps performed by the present invention is illustrated in FIGS. 11A and 11B.

The five market research examples hereinbelow illustrate how to develop interview questions for use in interviewing members of a customer population according to the present invention, and how to analyze the interview responses therefrom according to the steps of the flowchart from FIGS. 10 and 11A-B. Note that the following two examples (i.e., a resort market research example and a museum market research example) illustrate how the market research method and system of the present invention can be used to determine the key underlying decision elements within the decision structures of customers/clients that have the highest potential to increase customer/client satisfaction and thereby increase loyalty.

Resort Example Scenario.

A marketing manager at a golf and country club in an exclusive mountain resort area with little or no competition is confronted with the situation that several new private and semi-private golf courses are in the planning stages, with two already under construction. The manager is worried about the competitive forces in the relatively small marketplace, that will be created by the new competitions' price points, both below and above his current pricing level (recall the initial market evolution diagram in FIG. 1).

Problem framing. The manager first defines the business problem in terms of answering the four framing questions:
1. Who are the relevant customers?
   Answer: Current members.
2. What are the relevant behaviors (and attitudes) of interest?
   Answer: Understanding what key elements drive the level of satisfaction with current resort facilities, which necessarily underlies loyalty, thereby minimizing the likelihood of switching.
3. What is the relevant context (customer environment)?
   Answer: The resort membership is comprised of 85% non-resident members who come for the summer to play golf. Their financial means are quite significant and price would have little barrier to switching memberships or joining another club.
4. What are the (future) competing choice alternatives?
   Answer: Five clubs are coming on line in the next four years. The first two will open within one year and will have initiation fees (price points) that are both higher and lower than the existing club's fee structure. Of the three new clubs in the planning stages, two will be at a significantly higher price point.

From the answers to the above framing questions, the market research problem is stated as follows:

For purposes of planning and budgeting for the next year, what key marketing elements, programs, and facilities of the resort should be focused upon to improve the satisfaction level of the current membership, thereby minimizing the likelihood of member switching when the new clubs open?

Note: The bolded and italicized phrases within the above problem statement are taken directly from the answers to the framing questions above.

The specificity of the problem statement above provides the manager (and/or an interview question designer) with the needed subject matter and focus to generate interview questions according to the present invention. In particular, the following questions are representative of interview questions according to the present invention.
1. EXPECTATION question: Why did you initially join the club?
2. USAGE question: In an average week in the summer, about how much do you utilize each of the club's facilities?
3. ANCHOR question:

| Overall, how satisfied are you with the club on the following scale? | | | | | | | | |
|---|---|---|---|---|---|---|---|---|
| 1 | 2 | 3 | 4 | 5 | 6 | 7 | 8 | 9 |
| Very Dissatisfied | | Average | | Good | | Very Good | | Perfect |

Note:
This question could additionally be made specific to each area of the club, if desired (e.g. dining, golf, tennis, pool, etc.).

4. (+EQUITY) question: What is the single most important positive aspect of that club that is the basis for you to rate satisfaction the way you did? More specifically, what is the one thing that caused you to rate it a (X) and not (X−1)?
5. (−EQUITY) question: What is the single most important change the club could make to increase your satisfaction level one scale point (e.g., from X to X+1)?

By asking questions such as the five listed above, the members provide direct insight into what specifically is important to them for increasing their level of satisfaction, which is the essence of the management question. The member's answers, when summarized, reflect the most leverageable aspects of the club, in terms of increasing the overall member satisfaction level.

Data Analysis Steps.

Once a statistically significant number of club member responses are obtained, the following data analysis steps are performed.
Step 1. Prepare a statistical summary of the USAGE and ANCHOR questions. Note FIG. 12 is illustrative of such a summary.
Step 2. Content analysis. All customer responses for the three qualitative questions (1, 4 and 5) are grouped into homogeneous categories of meaning (Reynolds and Gutman, 1988, Ref. 24 of the "References" section). Summary frequencies and percentages, corresponding to each set of content codes, are computed for each question.
Step 3. For question 4 (+EQUITY), perform StrEAM™ Equity Leverage Analysis (ELA) which translates the equity questions into an attitude research framework (Importance and Beliefs), which additionally permits the computation of potential leverage gained if specific changes are made. Equity Leverage Analysis, as used herein, is a methodology that assigns weights to key attitudinal elements that underlie dimensions of interviewee interest, e.g. satisfaction. By using the precepts of attitude theory, analysis of question responses can be used to impute Importance (a proportion corresponding to the number of mentions) and Belief (a percentage representing the overall proportion of positive mentions) rescaled to, e.g., a 0-10 range. Using these measurements as a basis, the potential improvement gained from addressing the negative barriers to increase the assessment of the dimension of interest can be estimated. Importantly, the ELA measurement system avoids violations of the latent assumptions underlying traditional attitude measurement.
   a. The frequency of mentions combined for the two equity questions (4 and 5), for each content code, reflects its relative Importance (I).
   b. Separate the codes into the respective club areas to assess how important (I) each area is to improving satisfaction and summarize.
   c. Within each club area, compute belief (B) for each content code by taking the number of positive mentions and dividing it by the total number of mentions for that code. Divide the percentage result by 10 and round to the nearest decimal integer to obtain the value for Belief.
   d. Compute Equity Attitude (EA) by multiplying I×B and dividing by the sum of EA (ΣEA).
   e. Compute Equity Attitude (EA) contribution percentages by area.
   f. Compute Leverage (ΔL) for any individual decision element or a combination thereof by determining the resulting EA score if the B proportion was increased by one half of the difference of 10-B. Note that the rationale for one half the difference is based upon the idea that management focusing on one specific area can increase performance at that level (e.g., by a combination of minimizing negatives and creating more positives). Said another way, the units of incremental gain across dimensions are assumed to be defined as one half of the difference to 10.
   g. Assign rank order integers corresponding to Leverage potential (ΔL).

Review of the output from ELA permits management to focus upon the key tactical and strategic issues that will raise the average level of satisfaction, for example, one level (ΔL).

If importances were asked directly, general member activities would appear as the highest scoring reason, with golf being second. The USAGE split at 3+ occasions per week, indicates that the "Light Users: (1-3)" are primarily golfers. FIG. 13 presents the sub-codes (i.e., subcategories) with their respective percentages developed from the equity question responses for the two USAGE groups. Noteworthy is the "Light Users" (identified as the golf segment) largest negative of "Pace of Play," and the largest equity is the staff and level of service (ENVIRONMENT), in particular, for the "Heavy Users."

The data presented in FIG. 13 is used to derive the Equity Attitude (EA) (shown in FIG. 14) which is a function of the measures of Importance (I) and Belief (B). EA is then used to compute the Leverage Index (ΔL). (Of course, this could be done for each USER group.)

Management Direction.

The management problem is determining which areas to focus upon in order to create more loyalty with the membership, thereby minimizing the likelihood of switching. Based upon the Leverage Analysis (e.g., FIG. 14), the three areas of change are (Note: the specific directions come from the qualitative comments obtained from customers):

Pace of Play:
  Increase spacing of tee times.
  Develop rigorous course marshal schedule.
  Provide fore caddies for each group.
Course condition (taken from qualitative responses):
  Redo tee boxes, sod where needed.
  Adjust watering system to minimize wet spots.
  Initiate ball mark repair program, including total repair function for crew every evening.
Facilities (taken from qualitative responses):
  Repaint walls with "warm" colors.
  Add "warm" accessories, like rugs and art work.

Museum Example Scenario.

A marketing manager for a national museum is concerned about reduced member participation over the last year (−15%) in sponsored events and exhibitions. The manager knows how vital membership "donations" are to the museum. In fact, such donations account for 50% of the gross operating budget with the remaining monies coming primarily from admission fees. As member participation falls, the manager fears donations will also fall, resulting in severe financial problems. A related concern of the manager is: What is the most effective manner in which to communicate with the membership?

Problem framing. The manager first defines the business problem in terms of answering four general framing questions.

Who are the relevant customers?
  Current members that have at least maintained their level of participation and say they will continue to do so. (SAME)
  Current members that have decreased their level of participation or anticipate they will do so in the future. (DECREASE)
What are the relevant behaviors (and attitudes) of interest?
  Understanding why the loyal group within the membership continues to participate at the same or higher levels (EQUITY), and the reasons underlying why the decreasing loyalty group is participating less (DIS-EQUITY).
What is the relevant context (customer environment)?
  The local economy is experiencing a downturn, leading to a moderate decrease in philanthropic activity.
What are the (future) competing choice alternatives?
  Primarily other museums both within and outside the geographic area. Second, are other philanthropic activities.
The Management Problem is Stated as follows:
  For the purpose of developing next year's activity and event schedule, identify what areas, activities and communications, should be focused upon to arrest and reverse the downward trend in member participation levels by the current membership.

Note: The key bolded and italicized phrases within the management problem statement are derived from the bolded and italicized portions of the answers to the relevant framing questions.

The specificity of the problem statement provides the manager with the needed focus to answer the management question, as opposed to a standard attitudinal survey gathering attitudes (beliefs and importances) toward a predetermined set of current and potential museum activities. In addition, by conducting the research in this format, much of the bias common to standard attitude research is avoided, in particular, the social demand influences.

Research Questions.
  1. EXPECTATION question: Why did you initially join the museum's Circle of Friends?
  2. USAGE question: Last year about how many museum activities and events did you attend?
  3. PAST TREND ANCHOR question:

Over the past year, to what degree has your participation level in the activities at the museum changed?

| A LOT LESS | A LITTLE LESS | ABOUT THE SAME | A LITTLE MORE | A LOT MORE |
|---|---|---|---|---|
| −− | − | = | + | ++ |

4. FUTURE TREND ANCHOR question:

Next year, what do you anticipate will be the change in your level of participation in museum activities?

| A LOT LESS | A LITTLE LESS | ABOUT THE SAME | A LITTLE MORE | A LOT MORE |
|---|---|---|---|---|
| −− | − | = | + | ++ |

5. (+EQUITY) question: What is the most important reason for your participation in museum activities?
6. (−EQUITY) question: What is the most important single change you would like to see in the activities offered by the museum that would result in your increased participation?
7. How do you learn about the offerings, events and activities of the museum?

By asking the questions in this manner, the members provide direct insight into what specifically is important to them, with regard to their current participation level, and what changes or additions they would like to see to increase their participation level (satisfaction).

When these customer inputs are contrasted by the two loyalty groups, SAME versus DECREASE, the strategic equities (+ and −) underlying participation can be identified and used to develop the design of future museum activities. In addition, the amount of participation question (USAGE) also permits another set of analysis contrasts to determine if there are differences between these groups.

Data Analysis Steps.
   Step 1. Statistical summary of the USAGE and TREND ANCHOR questions.
   Step 2. Content analysis. All customer responses for the four qualitative questions (1, 5, 6 and 7) are grouped into homogeneous categories of meaning (Reynolds and Gutman, 1988, Ref. 24 of the "References" section). Summary frequencies and percentages corresponding to each set of content codes are computed for each question.
   Step 3. Conduct Equity Leverage Analysis (ELA) (see resort example above).
   Summary Charts.

FIG. 15 summarizes the reasons for joining the donor group for the museum. According to this figure, the most important reason for joining, especially for those that are "Heavy Users" (events≧2), the programs and education offered.

FIG. 16 presents the summary contrast of the PAST and FUTURE TREND questions. Viewing the marginal sums of PAST, the downward level of participation appears. And, looking at the self-reported FUTURE TREND responses suggests the reduced level of activity is likely to continue (i.e., in both the past and future years, there are more members indicating a lower level of participation than an equal or increased participation).

The management question, then, is why people are reducing their participation, and, secondarily, what can be done to better satisfy the members, thereby increasing their participation level. The summary results provided by the present invention are presented in FIG. 17.

Review of the ELA results suggests focusing on two key areas to improve member satisfaction: Tutorials, which is consistent with the earlier reasons for joining (Programs and education), and improving the art works in the Collection. FIG. 18 summarizes the responses to the communication question.
   Management Direction.
   Review all tutorials and educational activities, with a focus on how to improve the content. Enlarge the scope of tutorials by adding a continuing series of informative programs.
   Improving the Collection is the second area of focus. Plans to rotate in visiting collections, as well as future acquisition plans, are to be developed.
   Modify the marketing communications schedule to reflect the cost efficiency of postcards and newsletters. Investigate alternative communications venues, including a website.
   Summary.

By framing the business problem in terms of satisfaction with key customer groups (defined by Loyalty and Usage), a research framework can utilize the ON THE MARGIN™ methodology to identify the most leverageable equities and disequities. Computation of the Leverage index provides a direct measure of the areas of potential changes that will have the largest effect on improving satisfaction with customer segments, such satisfaction being a logical predecessor of loyalty, the basis of strategic equity.

The following healthcare example illustrates how the market research method and system of the present invention can be used to provide a research methodology that permits computation of statistical summary indices, which can be used to track the changes in satisfaction by sub-units within a business organization over time.

Healthcare Example Scenario.

A hospital administrator for a healthcare provider in a relatively geographically isolated city, with few competitors, has noticed a decrease over time in the number of patients served, in particular, those undergoing surgical procedures. From her interactions with competitive healthcare administrators in the area, it is her understanding that the number of patients and procedures at the competitive hospitals is increasing. She wants to design a "satisfaction barometer" that:
   Identifies the key "levers" that drive customer satisfaction for each functional group within the hospital.
   Provides a feedback system, using both qualitative and quantitative dimensions, on a regular basis that can serve as a framework to focus the respective functional units on their performance and provide them specific areas of focus in an ongoing manner to continually improve satisfaction.

Problem framing. The administrator organizes a meeting with her staff, with the goal of defining the business problem, and they answer the four general framing questions.
   Who are the relevant customers?
      Primarily, all existing patients (first time and repeat).
      Secondarily, previous patients who have not returned after some reasonable period of time. [Instead of directly researching this group immediately, it was decided to begin tracking these from the time of initiation of the "satisfaction barometer" project. The satisfaction assessment will provide the appropriate sample of "dissatisfied" customers to estimate their likelihood of repeat usage of the hospital facilities.]
   What are the relevant behaviors (and attitudes) of interest?
      Understanding the key dimensions of hospital treatment and staff interaction, by functional area, that underlie satisfaction (realizing these will change over time as changes are implemented by staff), which lead to repeat usage and loyalty.
   What is the relevant context?
      Reason for visit: Elective and non-elective treatment.
   What are the competing choice alternatives?
      Two competing hospitals with virtually identical facilities.

The management problem is stated as follows:
For the purpose of providing ongoing feedback from patients (for elective and non-elective procedures) to the functional areas of the hospital staff, develop a management tool, a "satisfaction barometer," that will identify the key dimensions and defining facets underlying patient satisfaction, which will serve to focus the functional units on key areas of patient treatment to facilitate continual improvement in their level of satisfaction with the hospital.

Note: The key bolded and italicized phrases in the management problem statement immediately above refer to the primary framing aspects presented in the answers to the questions, with additional focus on the methodological tracking requirement for ongoing feedback.

There are three differences incorporated into this example scenario. First, the need to design an ongoing data-gathering and analysis system is called for because the sub-dimensions or facets of satisfaction that can optimally affect improvement in satisfaction levels will change over time. Second, there is a need to break down the responses into the sub-group areas so the information can be used as a management tool for each functional area. And third, there is a need to develop quantitative indices to track performance.

Research Format and Questions.

Various options can be considered as to the timing of the research administration of the "satisfaction barometer." At "time of check out" was considered to be the most appropriate due to its immediacy with regard to the hospital stay experience. This decision necessarily requires the questions to be administered to be few in number and easily presented by the current hospital staff.

1. ANCHOR question: (The interviewer hands the card with the scale to the patient.)

---

How would you rate your overall treatment in the hospital on the following 1–9 scale?
1  2  3  4  5  6  7  8  9
Very       Average     Good     Very       Perfect
Dissatisfied                    Good

---

2. (+EQUITY) question: (Using the scale rating response as a basis, the interviewer asks the following question.)

---

What was the primary reason you rated your overall treatment as highly as you did on the scale? (That is, why an X and not X − 1?)

---

3. (−EQUITY) question. (Using the scale rating as a basis, the interviewer asks the following question.)

---

What was the primary reason you did not rate the treatment you received higher on the scale? (That is, why an X and not X + 1)?

Note:
The interviewers are trained to get the specific functional area and personnel involved relevant to the + and − EQUITY questions.

---

The interviewer records each patient's identifying information (ID) (where more detailed questions as to treatments received, number of prior visits, background demographics, etc. can be added to the file later), as well as each patient's ANCHOR satisfaction rating, and the two qualitative responses (EQUITIES).

By asking only three short satisfaction questions in less than two minutes, at the time in which memories of their experience are the most fresh, plus no additional cost to gathering the data, the research process proves very efficient. The present analysis framework (i.e., format and questions) demonstrates the power of the present methodology.

Data Analysis Steps.

After constructing a data file merging in relevant patient background information:

1. Obtains statistical summary of ANCHOR ratings by key patient information classifications. That is, tally the number of interviewee responses for each of the values of the 1-9 scale for question 1.
2. Content analysis. Code all patient comments by (a) reference context (functional area) and (b) satisfaction element mentioned for both qualitative questions (2 and 3). That is, first determine the categories of responses to the equity questions 2 and 3 (i.e., "nurses", "staff", "personal" (pain, stress, etc.), "MDs", and "facilities"). Then, for each satisfaction value of question 1, determine the interviewees that responded with this value, and then tally the corresponding responses to the equity questions by these interviewees (e.g., if an interviewee responded with VERY DISSATISFIED, and with "Nurses" for the (+EQUITY) question, and with "Facilities" for the (−EQUITY) question, then increment to the tally value in the summary cell corresponding to (VERY DISSATISFIED, (+EQUITY)) by one, and add one increment to the tally value in the summary cell corresponding to (VERY DISSATISFIED, (−EQUITY)) by one.
3. Develop a new summary code for the ANCHOR rating, dividing the scale into three parts, Below Average (−), Average (0) and Above Average (+). For the 9-point scale used in this example, the three new summary recodes would be for 1-4, 5-6, and 7-9, respectively. Compute a $T_s$ statistic (based upon the rationale of Kendall's tau (Kendall, 1975, Ref. 15 of the "References" section) and extended by Reynolds and Sutrick, 1986, Ref. 30 of the "References" section), as follows:

$$T_s = [((n+) - (n-)) + \tfrac{1}{2} * (n0)]/N$$

where, "n+" is the number of Above Average (7-9) ratings, "n0" is the number of middle or Average ratings (4-6), and "n−" is the number of Below Average ratings, and N represents the number of total ratings.

The $T_s$ satisfaction index ranges from −1 to +1 and can be applied to each functional area as well as to overall satisfaction.

Note: The average "middle" level of satisfaction (Poor<0<Very Good) has a positive bias, which is suggested because the goal is to understand how to achieve the higher levels of satisfaction, and a "Good" rating is at best average.

Summary Charts.

The ANCHOR scale numbers serve as the basis to elicit specific reasons as to the positive and negative equities with regard to satisfaction. The first step of the analysis determines the major code categories. In the hospital example scenario, the categories are Nurses (attending), Staff (departments), Personal (pain, stress), MD's, and Facilities (environment). The (I) importances for each category of customer responses are computed. The nine-point satisfaction scale is recoded into three classifications: [−] (1-4), [0] (5-6) and [+] (7-9).

FIG. 19 summarizes the satisfaction data. In addition, the percentages of positive comments and negative comments by each major code category for the recoded satisfaction ratings are summarized.

Review of the equity data reflects significant differences in what is important by level of satisfaction. For example, the [−] satisfaction group focuses on Personal (pain, stress) as the dominant negative that, if addressed, would increase their level of satisfaction. At the upper end of the satisfaction, [+], one of the most significant barriers to satisfaction is MD's. The difference in importance by level of satisfaction detailed here corresponds to the violation of Assumption 6: *Importances are assumed to be independent of beliefs* (the "Attitudinal Research Framework Descriptions" section hereinabove). Therefore, without the methodology of the present invention, one would not be able to identify what the equities are that should be focused upon.

FIG. 20 summarizes an example breakdown for one of the major code categories, Nurses. Three sub-codes emerge from the content analysis, namely, Information, Manners and Empathy. The importance of the sub-code, $I_c$, is presented, as is the Belief (B) for each sub-code. The summary measure of satisfaction, $T_s$, for the major category of Nurses is computed.

Management Tool.

Review of the response data for Nurses provides a framework for management to prepare nurse training material. Moreover, by detailing the qualitative input that comprises each code, specific areas of focus that translate into customer satisfaction can be highlighted for use in periodic performance-improvement meetings. This, of course, should be done within each organizational unit.

Beyond the qualitative input and the summary statistics of importances and beliefs, a single measure, $T_s$, for each major code can be computed for purposes of tracking "satisfaction performance" over time. Note that this measure is relative, in the sense that the sum of all $T_s$'s across the operational units will be about zero. As the dynamics of the service component of the hospital improve (leading to increased customer satisfaction), the relative importance of the sub-codes will change, providing a management framework for focusing on constant improvement.

The following two examples illustrate how the market research method and system of the present invention can be used to identify the differentiating decision "equity" elements within and between Loyal×Usage customer population segments that have the most potential to drive loyalty and/or increase consumption.

Direct Selling Example Case.

A preeminent direct selling company of cosmetics, which has experienced steady sales growth for 20 years, sees its sales significantly decline over the course of a year, greatly reducing its market value (reduction in stock price of 80%). Because the perception of growth and financial opportunity is critical to maintaining and recruiting new sales associates, the decline in stock price causes the company to begin the "death spiral" to financial ruin. The fact that direct selling organizations commonly experience turnover of 100% of their sales force per year exacerbates this problem. Market research reports that the beauty products and their packaging sold by the company have an older, out of date look that is not appealing to either their existing as well as potential, end-users. Management must make a decision immediately as to which strategic issues to address, before the company loses critical mass necessary to fund the overhead cost of operations and its debt load, and cannot continue to operate.

Problem framing. Senior management meets to first define the business problem in terms of the four framing questions.

Who are the relevant customers?

Management is divided in their points of view. Marketing believes it is the end-users who buy the product who are the key customers. This group uses market research data that says the product line is old-fashioned and must be updated. The Sales faction believes it is the sales associates who sell to the end users that are the key customers. This group presents an analysis that demonstrates that sales are nearly perfectly correlated (0.99) with the number of sales associates. The position that directly selling is a push (sales associate), not a pull (end-user) business is decided upon, yielding the relevant customer target of:

Sales associates.

What are the relevant behaviors (and attitudes) of interest?

Why do sales associates join?

Why do sales associates stay? (What satisfies them about their work?)

Why do sales associates leave? (What dissatisfies them about their work?)

To understand these behaviors, three types of sales associates are relevant, namely, NEW: Recently joined the sales force, EXPERIENCED: Continues to remain active, and FORMER: Recently left the sales force.

What is the relevant context (for considering a direct selling opportunity)?

Additional income is needed to supplement the family income.

There is a realization that hourly jobs are a dead end, and they want a career opportunity.

What are the competitive choice alternatives?

Other direct sellers, e.g., Amway, Avon, etc.

Secretarial positions.

Retail sales.

The management problem is stated as follows:

Develop a marketing and sales strategy that assures long-term growth by focusing on the superior business and life experiences that can be attained by joining the company as a sales associate versus alternative career/job options that will motivate the recruitment of new sales people, while at the same time maximize their expected time in the sales organization (minimizing the rate of turnover).

Note: The key bolded and italicized phrases in the immediately above paragraph are grounded in the strategic nature of the problem facing management and come from the answers to the framing questions.

The interesting, new aspect in this management problem example is the need to define the basis of motivation of the sales force. This means designing research to gain an understanding of decision structures, in particular, with respect to the differences between the types of decisions (e.g. joining, staying and leaving).

To understand the decision structures, two more framing questions are necessary:

What choice criteria do customers use to distinguish among competitive choices?

Why are the choice criteria personally relevant to the customer? (What is their mean-end chain that reflects personal relevance?)

The research problem, then, can be defined as delineating the common decision structures underlying the three decisions central to the direct selling business, and determining the equities and disequities associated with this specific type of direct sales experience. The development of an optimal strategy, with regard to recruiting and retention, involves leveraging equities and supplanting disequities.

Research Questions.

1. EXPECTATION question: Why did you join?
2. (+EQUITY) question: What are the most positive aspects of being a sales associate? What is the single most positive aspect? (choice criteria)
3. LADDER question: For the customer's most important positive aspect (reason), what is the driving personal value that can be identified in a means-end chain? Note the multiple choice criteria could serve as the basis of the development of multiple means-end chains representing customers' decision structures, if desired.

4. (−EQUITY) question: What are the most negative aspects of being a sales associate? What is the single most negative aspect? (choice criteria)

5. LADDER question: For the customer's most negative aspect, what is the driving personal value for obtaining a corresponding means-end chain?

The ability to contrast the differences between the means-end chains across the three sample groups, representing the basis of their respective decisions that underlie their key behaviors, should provide an understanding of what to leverage (and supplant) in the recruiting process. The development of strategy, again, is based upon leveraging one's equities and, at the same time, supplanting one's disequities.

Data Analysis Steps.
1. Content code EXPECTATIONS and summarize by behavioral group.
2. Content code all elements from questions 2-5, developing a lexicon for each level of abstraction (attributes, functional consequences, psycho-social consequences and personal values) (Reynolds and Gutman, 1988, Ref. 24 of the "References" section).
3. Construct the Customer Decision Map (CDM) (Reynolds and Gutman, 1988, Ref. 24 of the "References" section).
4. Determine equities and disequities; that is, for each decision element, determine the number of times the decision element is mentioned in the (+EQUITY) question responses, and determine the number of times the decision element is mentioned in the (−EQUITY) question responses. Then compute an overall summary equity index for each of the decision element, and for each group, in the sample customer population. From this the summary equity index can be computed for each decision element (e.g., the decision element being one of the laddering rungs: attribute through value of a means-end chain) as a ratio of the positive equities to all equities for the decision element (i.e., the ratio of the number of mentions of the decision element in responses to the (+EQUITY) question(s) to the total mentions of the decision element in responses to both (+EQUITY) and (−EQUITY) decision questions). Plot each of the ratios on a graph such as that of FIG. 21 as described further hereinbelow.
5. Map the equities of the respective sample groups on the CDM.

To illustrate the equity analysis framework, consider FIG. 21. In this figure, the location of the decision elements (according to their corresponding equity ratios from (4) immediately above) on the graph/model of loyal versus non-loyal customers (in other embodiments, any other contrast between segments or groups of a population, e.g., Loyal Heavy versus Light USERS, or in the case of direct selling, STAY versus LEAVE) can be visually contrasted with the locations of other decision elements on the graph/model. For each of the decision elements, the projection of its location on the graph/model onto each axis represents the positive equity ratio for the group or classification identified by the axis.

Still referring to FIG. 21, in the upper right-hand corner of this general graph/model are "common equity" associations (e.g., decision elements) that are primarily positive for both groups (e.g., both loyal customers/buyers, and non-loyal customers/buyers see the decision elements here as positively associated with the company, brand, et cetera). In the lower left-hand corner of the graph/model are associations that are primarily negative for both groups. These are called "common disequities." In the upper left-hand quadrant of the graph/model are leverageable equities. They are aspects of the company (more generally object), that customers/buyers loyal to the company perceive as positively associated with the company, but that are not seen in so positive a light by non-loyal customers/buyers. In the lower right-hand quadrant of the graph/model are competitive equities, which are aspects of the company that non-loyal customers/buyers perceive as positive for someone else (e.g., a competitor or some alternative option), but that customers/buyers loyal to the company perceive less favorably. In this direct selling example, the competitive equities reflect the STAY versus LEAVE contrast, i.e., both the customers/buyers loyal to the company and the non-loyal customers/buyers put "STAY WITH THE COMPANY" in the leverageable category, and both the customers/buyers loyal to the company and the non-loyal customers/buyers put "LEAVE THE COMPANY" in the competitive equity category.

Summary Charts.
1. EXPECTATIONS. The analysis of the "Reasons for Joining" question (i.e., question (1) in the "Research questions" section immediately above) is dominated by financial expectations, nearly 90%.
2. Customer Decision Map (CDM).

The results of the laddering interviews were summarized in a decision-making map that provides insight for strategy formulation. As the simplified version of the map (FIG. 22) shows, there are several primary orientations that originated in the career attributes EARN MONEY, BE MY OWN BOSS, and PEOPLE ORIENTATION. EARN MONEY was the source of the greatest number of mentions. And, with no further analysis, the message "JOIN THIS DIRECT SELLER" and "EARN MONEY" would have been the obvious choice for a message strategy. The Earn Money positioning, however, is non-differentiating with respect to competitive work options. This was currently the recruiting message and given the company's situation, this strategy is incorrect.

Note that, on this map, "GOOD MOM" appears at a relatively lower level than, say, "INDEPENDENCE." This is an artifact of the map's construction, essentially trying to fit in all elements and their implicative relationships without crossing lines. "GOOD MOM" is a very high-level need, indeed, for most mothers.

This leads to some serious questions about the interpretation of standard "laddering" output. The value of the output to this point is in its articulation of the structure itself, and the unique pathways defining the decision structures. What is required is further insight to discover ways the manager can develop and optimize strategic options to tap into and increase equity.

3. Equity/Disequity Grid for contrasting the STAY vs. LEAVE sales associates.

The contrast is between those who stayed with the company (loyal), and those who had just left (non-loyal). The reasons that people joined the direct selling company were, in fact, the reasons that the company talked about in its current communications: Make money, Contribute to household, Be your own boss, and Work your own hours.

FIG. 22 contrasts the decision elements for people who left the company versus people who stayed with the company, were loyal, though, they were either different kinds of people with different motivations (evidence of a self-selection process), or they had learned over time to value some things in addition to flexibility and self-directedness: A "PERSONAL GROWTH" orientation, SHARING, LEARNING, ACCOM- PLISHMENT, and BROADENS HORIZONS. As mentioned above, FIGS. 22 and 23 shows the corresopnding direct selling CDM.

It is now possible to see that, if the goal is not only to get people to join, but also to stay with the company, one cannot put emphasis solely on the message "you can make lots of money." A more powerful pathway makes use of the teaching and learning component of the direct selling experience, explicitly highlighting the opportunity for personal growth and development that many loyal sales associates have found appealing over time. People work for money, and that is a given. What is the "value-added", in the present example, is the personal growth component offered by this direct selling company.

The StrEAM™ methods that led to this strategic insight, in this example scenario, were twofold. First, framing the marketing problem in terms of understanding human decision-making with regard to specific customer groups provided a research framework to focus precisely on the key issue at hand. Second, by using the classification of FIG. 21, decision structures of loyal and non-loyal customer populations can be contracted, thereby enabling management to develop a strategy that utilizes the differential leverages that represent the basis of loyalty. Thus, the present invention provides a method and system for coding (i.e., categorizing interviewee responses into a common set of semantic categories), determining perceptual relationships between the categories (e.g., by laddering), determining the significance of each of the categories (and/or ladders), and contrasting various customer population groups for identifying significant attitudinal and/or perceptual differences between the group that is loyal and the group that is not loyal.

Management Decisions.
1. Develop a training program for recruiters that focuses on this higher-level message of personal growth, connecting the relevant choice criteria into a cohesive decision orientation, which represents the strategic positioning.
2. Develop collateral materials, including a training tape that can be used by the sales associates recruiting in the field, which personalizes the personal growth story-strategy in a consistent manner. Note that in the case from which this example scenario was taken, these actions resulted in unprecedented growth brought about by enormous gains in recruiting new sales associates (Reynolds, Rochon and Westberg 2001, Ref. 29 of the "References" section).

Summary.

The direct selling example scenario illustrates the value of being able to contrast decision structures of different segments within a customer population in order to develop a marketing strategy (in this case, recruiting) using a computed Equity/Disequity grid based on the decision structures presented in the CDM.

Automobile Example Scenario.

The management of an American automobile nameplate (i.e., manufacturer) is very troubled by their declining sales figures. Increased advertising expenditures and promotional events are not driving sales. Management concludes their positioning strategy is not effective. Market research using, e.g., the present invention to determine joint distribution of price sensitivity and conditional beliefs framework (e.g., as shown in FIG. 5) indicates, not surprisingly, a significant decline in their "superior" belief column, and in particular, to the cells of the "superior" belief column where price is "not a barrier" or a "minor barrier". Further analysis of market research ratings on automobile attributes, such as handling, engine performance, safety features, convenience features, seating comfort, comfortable ride, and gas mileage, indicates that these differences do not account for understanding what drives the superiority belief. Additional analyses contrasting their nameplate with others from their self-defined competitive set reveal, in general, very few differences. The one attribute that does appear to be a significant negative for their nameplate is exterior styling. Uncovered in the market analysis is the fact that their loyal buyers are significantly older and that their sales decline is a combination of a very small number of younger buyers being attracted to their nameplate and their loyal faithful dying off. Management decides they need to understand other "image" aspects of their product that underlie customer decision-making.

Problem framing. Management defines the business problem by answering the four framing questions.

Who are the relevant customers (with an equal emphasis on potential customers)?
Current loyal customers (two or more purchases, consecutively).
First time car buyers of their nameplate.
With regard to their nameplate, potential customers that:
"Considered" but rejected, recent car buyers.
"Not considered" recent buyers of a price competitive set of alternative cars.

What are the relevant behaviors (attitudes) of interest?
Understanding of key elements that drive perception of the nameplate (ultimately decision-making) that influence (a) whether it is considered as a viable choice, (b) if considered, why it was selected (equity), or rejected (disequity), and (c) what is the basis of loyalty.

What is the relevant context?
The automotive technology across nameplates is virtually identical (except for styling features). Customers know the features are substitutable and are available on a wide set of competitive offerings, so the only real difference is the imagery of the nameplate and the appeal of the car's styling features.

What are the competing choice options?
Discussion of this question evolves into two different points of view. The classic, manufacturer's perspective, is that a hierarchically-tiered segmentation of foreign/domestic, size and price points serves to define the competitive set. An alternative perspective is that they are not sure who the competition is, and that should be an additional subject of the research.

The management problem is stated as follows:

For the purpose of developing a new positioning for the nameplate, identify the current competitive set and what are the bases of imagery that drive customer decision-making with respect to three distinct choice outcomes: namely, remaining loyal, becoming a first time buyer, or actively considering the nameplate as a serious automobile purchasing option.

Note: The bolded and italicized phrases within the management problem statement immediately above are derived directly from the answers to the four framing questions.

The specificity of the problem statement provides the research group with the needed focus to design a research project that answers the question.

Research Questions.

For an appropriately screened sampling of the four sample groups of recent car buyers noted above, the following interview questions are constructed according to the present invention:

1. PURCHASE question: What car did you buy last?
2. CONSIDERATION SET question: What other cars did you actively consider prior to purchasing your last car?

3. TOP OF MIND questions: Typically at least a pair of questions, such as (3a) and (3b) following:
   3a. EGOSODIC VALENCED DECISION STRUCTURE (EVDS) question: For each car mentioned (from Question 2), plus nameplate of interest if not mentioned, sequentially ask:
   What comes to mind when you think of "Car Brand X"?
   After all TOM responses (i.e., "top of mind" responses) are obtained for all cars, review all of them with the respondent and ask for the most representative one or more descriptors (also denoted "image descriptors" herein).
   3b. VALENCE question: For each of the image descriptors obtained, ask:
   Is (your response) for a (corresponding car) a positive (+) or a negative (−) to you? Why?
   Note, each positive or negative response is referred to as a "valence" response herein, and the corresponding response(s) to the "Why?" question are referred to "choice criteria" responses.
4. LADDERING questions: After the response(s) for (3b) are obtained, a laddering portion of the interview commences for at least one (and preferably each) of the choice criteria provided. That is, for such choice criteria, one or more laddering questions are presented to the respondent for obtaining responses from which, a four-rung ladder of the respondent's decision structure may be constructed. However, it may be the case that the respondent's answers to the "Why?" question of (3b) are not sufficiently specific regarding an attribute of the object to which the question is directed. Accordingly, prior to asking these laddering questions, further questions may be presented to the respondent to obtain the specific object attribute(s) related to the corresponding choice criteria. That is, in order to obtain what are typically higher-level respondent decision characteristics related to an object, the interview questions must initially "go down" one or more levels of specificity until an object attribute descriptor is mentioned by the respondent. This technique, termed "chutes" herein, ensures that a complete means-end chain is subsequently elicited from the respondent. For example, referring to FIG. 24, if a respondent mentions the TOM characteristic of "cool image" and indicates that this is a positive (+) to him, this psycho-social consequence would then be probed to uncover the lower-level functional consequence that defines it.

This is obtained by asking a question like, "What is it about the car that makes you think it has a 'cool image'?" The respondent then must think about what specific characteristics cause or lead to this image perception, with regard to the specific car being discussed. In this example, the respondent might reply, "superior interior design." Using this as the next level to probe lower as to what specifically about "superior interior design" is important to yielding a "cool image," this respondent might reply, "oversize instrument gauges" as illustrated in FIG. 24.

Once the attribute descriptor (i.e., "oversize instrument gauges") is obtained, the data for the entire means-end chain is linked together in the next set of questions that move toward related personal values of the respondent. That is, continuing with this example, the respondent could be asked, "Considering that 'oversize instrument gauges' are important because they help define your idea of 'superior interior design' and that translates to 'cool image,' why is this important to you?" Moving up the ladder in this way, using laddering probes, could yield responses such as "impress others" and then "enhanced social status" as indicated in FIG. 24. Thus, the entire means-end chain may be provided as a chain having five levels as follows: "oversize instrument gauges"→"superior interior design"→"cool image"→"impress others"→"enhanced social status". However, since "cool image" and "impress others" are both psycho-social consequences, a more typical four level chain may be generated by combining these two levels as described further herein, in particular, in the "StrEAM Ladder Coding" section hereinbelow.

Data Analysis Steps.
   Step 1. Summarize the consideration set mentions (percentages by sample group). In addition, a multidimensional graphical representation of the nameplates and the sample groups as points in the space, along with their respective demographic characteristics can be constructed (Carroll, Green and Schaefer, 1986, Ref. 4 of the "References" section).
   Step 2. Content code the TOM response, and compute Equity/Disequity grids for the following three pairs of customers:
      (a) Current loyal customers versus First time car buyers (of their nameplate).
      (b) First time buyers versus "Considered" but rejected recent car buyers.
      (c) "Considered" recent buyers versus "Not considered" recent buyers.
   Step 3. Content code the ladders representing decision structures (Reynolds and Gutman, 1988, Ref. 24 of the "References" section) and construct a CDM for frequent TOM codes.
   Step 4. Using the Equity/Disequity grid methodology for the respective sample groups, summarize the equities and disequities across the decision elements and contrast key decision segments.

Summary Charts.
FIG. 25 details the five prototypical decision orientations obtained from the TOM questions for the competitive set of automobiles (including, of course, the nameplate of interest). The primary TOM defining characteristic is capitalized in FIG. 25. The attribute element (identified by the label, "(a)"), and the value element (identified by the label "(v)", in italics), are labeled for each decision network shown in FIG. 25. The combination of associated elements from attributes to values (i.e., a chain) may be interpreted as a decision orientation related to purchasing (or not purchasing) the nameplate automobile.

For example, the COOL IMAGE orientation discussed earlier is a function of three possible decision pathways, namely; convertible, interior and exterior styling, each representing a segment. The common higher-level reason COOL IMAGE is important for customers is because of their perception of the automobile's ability to "impress others," which leads to "social status."

The management question, then, is "what do current customers believe that potential customers do not?" The research to answer this question, as noted, involves contrasting buyer segments to determine their respective equities and disequities. To illustrate, FIG. 26 contrasts "First time buyers" of the nameplate of interest with "Considered, but rejected" potential customers using the Equity/Disequity grid methodology.

The representation produced, using the TOM-derived segments as the basis, provides significant advantages over standard multi-dimensional representation methods. Standard analytical procedures place the characteristics in the space, assuming no connection or structural relationships between them (independence). The methods presented here have two significant advantages. First, by virtue of the sampling frame, key equity contrasts can be made, which leads directly into the strategy development process. Second, the a priori knowledge of the underlying decision structures allows for a more comprehensive interpretation, by providing a clustering or grouping basis for connecting the defining decision elements.

FIG. 26 is constructed by taking the TOM comments for the respective automobiles to be contrasted and computing the positive ratios using the StrEAM Equity Grid™ methodology. In this example, the "First time buyers" group data is based upon the TOM responses to the nameplate of interest. The "Considered, but rejected" data is taken from the automobiles they recently purchased.

Management Interpretation.

The dominant reason "First time buyers" decide to choose the nameplate of interest is because it HOLDS VALUE. As can be seen in FIG. 26 with the connecting arrows, the positions of the elements that are part of this decision network all have positive equities. In contrast, the dominant orientation for the "Considered, but rejected" segment is COOL IMAGE.

The challenge management faces is how to position their nameplate so as to appeal to this modern, style-driven decision segment. Two options emerge. One, change the design features. This is obviously too costly, takes many years to implement, and therefore is not practical in the short term. Second, change the perceptions of the target customer population regarding the social status that can be gained from being secure in one's (investment) decision to buy the nameplate of interest. The decision orientation to be developed is:

Social status
Secure in decision
Good investment
Holds value
Low depreciation (resale value)

The underlying premise of this redefining of social status is that social status drives the importance of the lower-level elements in the current COOL IMAGE decision orientation. And, if it can be communicated to the potential customers that there is another facet of status, one that is defined in terms of recognizing the value of a good investment, there is an increased likelihood of purchase by this target segment.

Summary.

The Equity/Disequity grid methodology, for identifying which decision elements obtained from traditional laddering data provide the most potential leverage to be incorporated into a positioning strategy, is detailed.

A second methodology, which avoids some of the limitations of laddering, is developed. Traditional laddering, beginning at the attribute level and moving up the "levels of abstraction" to personal values, does not necessarily capture the decision constructs that typically serve as the centerpiece of choice for more high-image categories. By initializing the laddering process through Egosodic Valenced Decision Structure (EVDS) questions, the general decision construct can be obtained. Then, by going "down" to what features of the service product/service are used to define the presence of the construct ("chutes") and then going up to values, a complete ladder can be developed. These decision networks can be developed individually for common TOM descriptors yielding specific CDMs, which represent decision segments.

The application of the StrEAM Equity Grid™ methodology "contrasts" to relevant customer groups provides the ability to identify differentiating decision "equity" elements that have the most potential to drive purchase for these high-image categories. Management prioritization of these contrasts leads to the development of optimal strategy.

Marketplace Tracking

The general management problem common to all businesses is:

Develop a market research platform to benchmark the competitive environment by obtaining ongoing market research measurements on a periodic basis in order to identify and quantify the changes in the marketplace and their relation to marketing activities.

Examples of the types of strategic questions that a tracking framework must address are:

1. Who is my competition? What effect does context have on defining my competitive set?
2. What is "my" brand share contribution by context, as well as for the relevant competitors?
3. What percentage of my sales comes from loyal customers (as well as for the competition)? How much non-loyal switching is taking place in the marketplace? What are the dominant switching patterns?
4. What decision elements drive loyalty, the basis of equity, for "my" brand as well as that for the competitors?
5. What effect do "my" marketing activities have with regard to the decision elements underlying equity?
6. What are the customers' perceptions of their consumption trends in the marketplace, both past and future?

The central feature of tracking is the identification of the key differentiating and leverageable decision elements (e.g. Equity/Disequity grid methods) that define the "equity" segments by the StrEAM™ joint distribution of price sensitivity and conditional beliefs classifications. In addition, this research framework can encompass other StrEAM™ methodologies, plus measures of marketing activities variables, to quantify their effects with regard to increasing superiority perceptions that drive loyalty.

There are four primary components of a system that can track strategic equity: examination of the meta-category, examination of the drivers of choice and consumption (including corporate image), self-reported trend forecasts, and an evaluation of the effects of marketing activities. It is useful to refer to FIG. 27 as the components are explained. The point of the diagram is that each of the tracking elements is to be related back to a loyalty metric: the number of people who agree with the statement that a product is "superior" and buy the product (a certain percentage of the time, in the case of frequently purchased consumer goods).

Examine the Meta-Category: Understand Who is the Competition.

Who is "the competition?" One must realize that customers always have choices, and those directly competitive choice options may not be obvious. This question is analogous to the question: "What constitutes market share of what?" Competitive alternatives differ across customer groups, geography, and consumption context (occasion). And, as the automobile example above illustrates, who constitutes the direct competition, is not always obvious. Therefore, a broad approach to defining the meta-category of competitive options is required to frame the research. Without this meta-category perspective, one would not be able to understand the nature of the competitive forces in the marketplace.

Choice is context-dependent, so the meta-category definition depends on context. This means the choice context drives who is defined as the competition, in particular for frequently purchased consumer goods. For example, in 11 of 12 countries in the Eastern hemisphere, the number one competitor for a certain carbonated soft drink brand is not a carbonated soft drink—but "CSDs (Carbonated Soft Drinks)" are only what the company tracks. Brand usage information, correspondingly, is gathered by consumption occasion where relevant. Brand share, along with demographic information. Brand share should first be thought of in a consumption occasion context. Of course, for consumer durables this distinction is not nearly as relevant. However, for most consumer goods the concept of occasion-specific decision-making is critical to understanding the equities in the marketplace.

The central point here is that one gains a complete strategic picture only by examining the buyer beliefs that drive choice (brand usage) in different contexts, where context can be defined by the behavior of interest (purchase or consumption, for example), or by time of day, location, or significant others present. Not taking into account context differences, and not grounding the respondent in this way, results in ambiguity and error in terms of each individual respondent's interpretation of the research questions. People do not behave or think in general terms; they seek satisfaction, think and behave in specific situations. And these situations determine the decision structures that will be utilized by the consumer.

From the product usage information obtained, brand loyalty for all brands can be computed in various ways, which serves as a primary classification for the StrEAM Equity Grid™ contrasting analysis (depending on the management issue).

Understand the Strategic Elements that Drive Choice.

Which strategic elements drive choice? Again, in the case of frequently purchased consumer goods, one needs to measure the relevance of the strategic decision elements (product features or attributes, consequences of consumption, and psycho-social imagery) in each context to determine which specific strategic elements are the key drivers of equity for each consumption occasion. Again, consumption contexts need to be analyzed individually to identify the decision structures that drive the equities and disequities of the respective competition.

In addition, elements of corporate image, defined as leadership traits, should also be measured. Note that image research (Reynolds, Westberg and Olson, 1997, Ref. 33 of the "References" section ) indicates that characteristics comprising the concept of a "leader" parallel the psycho-social consequences for consumer brands, which also holds for political candidates. These key leadership traits, and their respective definitions, that define corporate (and political) image are: Trustworthy: Honest and worthy of trust; Effective: Capable, Gets things done; Popular: Number one; Lots of people like it; Traditional: Has strong heritage and tradition; Caring: Cares and concerned about people; Efficient: Uses resources wisely; and Innovative: Comes up with creative new ideas. The measurement of corporate image is important because many marketing activities, as detailed below, are intended to drive corporate image. Therefore, the ability to measure their effect on these key dimensions must be provided. Note that corporations can be considered leaders in society because they fit key leadership-role criteria: They can exert influence in order to affect the performance of society. Because one needs to measure the linking of elements of strategic equity with marketing mix elements, one must also be sure to examine the relationship between the kind and degree of sponsorship participation and the strategic elements, particularly those that comprise the leadership/corporate image dimensions. Companies' ability to profit, in the sense of increasing strategic equity from sponsorship of events or causes, varies greatly. The reason is that some of their sponsorship efforts are "on strategy," and some are not. If the corporate philanthropy efforts are focused not only on being a leading corporate citizen, but also on building the image of a leading corporate citizen, then the community, but as well as the employees, customers, and other stakeholders, will benefit.

Ability to Evaluate Marketing Activities.

Which marketing elements are working and what are they affecting? One should measure awareness and recall by key demographic and behavioral variables. And, one should be able to measure the effects of company messages on the beliefs and salience of the strategic elements (the attributes, functional consequences, and psycho-social consequences) that are the decision elements of one's target equity segments of customers. And, as mentioned, some types of promotional activities are intended to affect corporate image, so these measures should also be analyzed for differences resulting from exposure or participation in sponsored events. Perhaps most telling is the longitudinal aspects of measuring pre- and post-differences corresponding to before and after a marketing activity. And, to carry this a bit further, the possibility of correlating the co-relation of gains in equity directly to these marketing activities becomes possible.

Identify Trends and their Underlying Causes.

The final addition to the strategic equity tracking process is that it has great possibilities with regard to providing management with a perspective on the future of their marketplace. By asking a panel of consumers to explain trends in their consumption behaviors (i.e., FUTURE TREND ANCHOR), one can get insight into the reasons that changes have occurred, as well as insights into the likely future competitive environment in which their brand exists. This is accomplished by asking the consumers how their behavior is different today as compared to some product-relevant time frame (e.g. one year ago), and how it will likely change, for example, in the next year. Understanding the "Why?" of these customer-perceived changes provides management with the ability to substantiate the reasons for changes in sales, as well as the ability to understand future trends that are likely to influence their sales. Tracking changes in sales, share, entry, or exit data will give an after-the-fact trend line, whereas the StrEAM™ methodology will give another, superior one that explains trends from a customer's point of view. The value of an "early warning system" such as this for management cannot be overstated.

Components of StrEAM Strategic Equity Tracking™

The steps of such a tracking system necessarily involve a computer-driven algorithm to adaptively ask relevant questions to the individual respondent. That is, the consumer will only assess brands that are relevant, as well as decision elements that were indicated as important by the individual consumer. This tailoring of questions greatly reduces the number of questions asked of each respondent, providing greater overall efficiency to the research process. To illustrate, consider the following steps of the computer-driven interview. (This research platform assumes, like all such tracking models, that an appropriate sampling of consumers is identified.) The categories of questions are:

1. Sample characteristics, corresponding to demographics and psychographics, and any relevant background information.
2. Identification of brands consumed by consumption context/occasion, including average amount of consumption for a prespecified time period (e.g. one week). Note that consumption information can also be collected by using consumer diaries, then using this input as a basis for the brand usage data. This method typically provides more accurate usage data.
3. Rating equity classifications on the two dimensions of price sensitivity and conditional beliefs, e.g., as shown in the StrEAM™ joint distribution of user beliefs and price sensitivity of FIG. 5.
4. Salience of decision elements (e.g., attributes, functional consequences and psycho-social consequences) for each decision occasion. These importances are assigned on the basis of "point allocation" by level of the means-end decision hierarchy. Note that point allocation refers to providing the respondent with a prespecified number of points, corresponding to their beliefs or importances, and having them allocate these points, corresponding to the dimension of interest (importance, beliefs or corporate image) to a prespecified set of representative statements. (Decision elements that do not exceed an expected allocation level (meaning the number of elements in that level divided by the total points allocated) will not be used to assess brand beliefs, thereby greatly reducing the number of questions required.)
5. The beliefs of decision elements (attributes, functional consequences and psycho-social consequences), again using a point allocation system for normalization. Only the brands that are consumed in one of the occasional contexts are rated (further reducing the number of questions for an individual respondent.
6. Information on marketing activities, including advertising and promotions, are gathered by traditional measures such as recall or slogan identification, and for promotions, knowledge of and level of participation. The appropriate sequencing of these questions also serves to minimize the number of questions asked to an individual respondent.)
7. Corporate image ratings (i.e., leadership traits) are obtained for relevant brands, again using the point allocation methods.
8. Trend questions, past and future, allowing for qualitative explanatory input.

Non-Alcoholic Beverage Example.

Consider the case where management of a carbonated soft drink company, with several products in their portfolio, including non-carbonated beverages such as juices and water, would like to understand the interactions across their products and their respective competitors. Only by defining the competitive set in the broadest possible terms, the meta-category, can these interactions be understood.

The meta-category competition framing question for this example is, "What is your share of stomach?," which necessarily includes defining competition across non-alcoholic beverages.

The inputs that are required for the computer-interviewing program to implement StrEAM™ STRATEGIC EQUITY TRACKING for the non-alcoholic beverage example are:
  Background information. Demographic and psychographic questions and response categories for each.
  Consumption contexts, occasions. In this case, time of day: Breakfast, Mid-morning, Lunch, Afternoon, Dinner, and After dinner.
  (Optional) Brands by functional category. A list of the major competition by category to be used as stimuli. Alternatively, respondents can enter their own brand information in an open-ended manner.
  Decision elements by level. Note that these decision elements are developed from decision structure studies (laddering) across all relevant non-alcoholic beverages. The labels of the decision elements presented here reflect these concepts. In practice, the exact wording of each involves a complete descriptive phase. (Attributes: carbonation, ingredients, sweet taste, strong taste, special taste, light taste, natural taste and aroma; Functional consequences: thirst quenching, refreshing, provides energy, maintain weight, complements food, and body effect; Psycho-social consequences: mood effect, maintain routine, reflection, health, modern/trendy, concentration, and comfortable). Also note that values are not used for direct assessment by consumers because they are too abstract, with unclear meanings, if not dealt with in a more personal manner, like laddering. The fact is that the laddering process causes consumers to "discover" values and how they underpin choice behavior.
  Point allocation sizes. Number of points to be allocated for each component (importances, beliefs and leadership dimensions of corporate image).
  Marketing activities and corresponding labels. Descriptions of marketing activities of interest, advertising and promotions that will be used, along with their relevant slogans, et cetera.
  Time period to be used for TREND questions.

Strategic Analysis.

When a representative sample of consumers is obtained, a decision as to the definition of loyalty is required. This can be done in several ways, including overall percentage of consumption by occasion (time of day) and/or by functional subcategory (e.g. diet colas). Once this decision is made, the types of analyses used to understand equity is almost limitless. The framing of these analyses, however, is universally centered on understanding the (loyal) classification categories output from the StrEAM joint distribution of price sensitivity and conditional beliefs. Understanding what drives the "superiority" classification underlying loyalty, combined with either one or two levels of the price sensitivity classification ("not a barrier" and/or "minor barrier"), with respect to all of the marketing questions detailed earlier, is the critical research output for management. And, being able to track these differences over time, especially with regard to the (positive or negative) differences in equity resulting from marketing activities, is of great value to future management decision-making.

StrEAM™ Advertising Strategy Assessment

The StrEAM™ ADVERTISING STRATEGY ASSESSMENT provides the fifth of the "Five Aspects" briefly described in the Summary section hereinabove. In particular, this aspect of the present disclosure provides a methodology to quantify the contribution of key perceptual associations, corresponding to customer decision structures, caused by communications that drive affect for the product/service.

Communications Strategy Specification: A Management Perspective

Communication or positioning strategy is the process of specifying how consumers in a target population will meaningfully differentiate an object (e.g., a brand, company, idea, or candidate) from its competitors (Reynolds and Rochon, 1991, Ref. 27 of the "References" section). The phrases "specifying" and "meaningfully differentiate" are noteworthy.

Several benefits accrue when management clearly articulates and specifies the basis for positioning strategy. First, company management retains control of the process. Strategy is, after all, the responsibility of the company, not the copywriter or agency account manager. Next, the strategy articulation provides a basis for the discussion of alternative executions, based in a common lexicon. Finally, managers and agency personnel can assess advertising executions and their delivery against desired product positions objectively. This benefits both the agency and the manager, since it keeps the agency on strategy and protects the agency from arbitrary second-guessing.

The phrase "meaningfully differentiate" refers to the goal that advertising strategy must be in the consumer's own language and follow decision pathways that ensure that the message is personally relevant. Thus, by understanding what are the leverageable strategic elements, through the StrEAM™ family of research methodologies, that drive satisfaction and/or loyalty, that in turn define strategy, the MECCAS framework (Reynolds and Gutman, 1984, Ref. 23 of the "References" section), to be defined below, permits a direct translation to advertising strategy specification.

To facilitate that specification process, a manager can use the MECCAS strategy model, where the components of the model are isomorphic to the decision structures developed through means-end theory. MECCAS is an acronym for Means-End Conceptualization of the Components of Advertising Strategy. This framework helps a manager translate the understanding of consumer decision making into advertising language. The MECCAS framework is usually presented with Message Elements at the bottom and Driving Forces at the top so as to directly correspond to the means-end decision structure generated from means-end data.

i. Attributes are called Message Elements. These are the differentiating physical attributes of the product explicitly communicated in a commercial message.
   ii. Functional Consequences are referred to as Consumer Benefits. These are direct consequences, usually performance outcomes, which result from the product's attributes.
   iii. Psycho-Social Consequences are defined as Leverage Points. These are the ways in which the message activates or "taps into" the individual's personal value system.
   iv. Personal Values are referred to as Driving Forces. These constitute the motivating value orientation of the strategy, the end-level focus of the message. The values may be explicitly communicated, or may be implied only.
   v. The final component of MECCAS, the Executional Framework, is the "delivery vehicle" for the four fundamental strategic components and, as such, is not considered part of strategy specification per se. It is the tone, the scene, the action scenario, the Gestalt of the plot of the commercial. Note that the ZMET methodology noted earlier (Christensen and Olson, 2002, Ref. 7 of the "References" section), with its focus on metaphors and their experiential meanings relevant to the product category, is particularly useful in the development of the Executional Framework.

Implementation.

Once management decides what is to be communicated or linked (i.e., the positioning strategy), it is the job of the creative team to create three "bridges" linking the product to the self. The product bridge, linking message elements and functional or performance benefits, the personal relevance bridge, linking consumer benefits with the leverage point; and the values bridge, linking the leverage point to the driving force. An illustration may make the process easier to understand.

In most product classes, decisions are made, not at the level of values, but at a lower psycho-social consequence level, such as "coping" or "caring." Note that Reynolds and Trivedi 1989, Ref. 31 of the "References" section, found that the highest correlations with "affect for the product" with statements representing the Leverage Point, which corresponds to the psycho-social consequence level of means-end decision structures. Moreover, within the concept of "coping," one can imagine people who are hanging-on-by-the-fingernails-and-hoping-to-get-through-unscarred coping (need for Peace of Mind), and people who are I-have-lots-to-do-and-I-can-do-more-and-get-that-corner-office coping (need for Accomplishment). These two types of coping are defined by their respective higher-level goals or end-states, represented by their personal values. But, it is coping that is the "leverage" to activate this end value, and as such, is the most meaningful driver of affect for the product/service. To illustrate this point, FIG. 28 shows is what one might communicate with the less secure holders-on target.

Indeed, the message to such a decision segment (Accomplishment driven) is different than the message directed at a target segment motivated by "holding on," with an orientation to just get through the day (Peace of Mind driven). Understanding this difference that is grounded in meanings, which are defined by the connections between the respective levels, is the focus for the new research methods that will be introduced in the following section.

Research Methods.

There are two primary inputs to the computer program that administers the communication strategy assessment: affect questions, for both product and the advertising, and statements that correspond to the decision elements by means-end level. The program has flexibility to accommodate statements for the Executional Framework and qualitative responses, as well, but these are optional and as such are not an integral part of the strategic analysis.

There are three types of strategic questions presented. For the first type, the computer program presents Affect statements using a standard scale format, anchored by the degree of agreement with the specific statement. Note that Affect statements are a combination of two statements. For example, Affect for the Product/Service is a composite summary score of "increase liking" and "more likely to buy (intent)." The second type, the decision element statements, phrased appropriately to the level they represent, are presented in a two-step process. The first question asks if it the concept is "CLEARLY" communicated (YES or NO). The second question is asked only in the case of a YES response, and it focuses on the strength, "CLEARLY" or "PERFECTLY." This two-step process is key in that it permits the program to adaptively only ask the relevant questions of the third type. This final type focuses on the degree of connection or association between the decision elements caused by the advertisement. The three-point scale used to represent connectivity is presented in a Venn diagram format, with approximately 15%, 50% and 85% overlaps, respectively.

The weighting system utilized to assign weights to the responses for the NOT CLEARLY, CLEARLY and PERFECTLY response categories for the statements are 0, 62.5 and 100, respectively. Note that these weights were derived from a series of studies contrasting different scale markers on 100-point scales. The strength of connections is scored 0, 1 and 2, respectively. A multiplicative composite score for a connection is computed using the relevant ends (the statements scored 0, 1 and 2) multiplied by the connection strength between them (0, 1 and 2), which yields a range of scores from 0 to 8 (2×2×2). The resulting product is then assigned a number ranging from 0 to 9. These equal distance ranges of outcomes for each assigned number are defined by the probabilities of random occurrence of the possible combinations of connection product scores (0, 1, 2, 4 and 8).

The resulting numbers output by the computer program reflect the (mean) strength of communication of a statement (decision element) caused by the advertisement on a 0-100 scale, and the (mean) connection strength for all pairs of statements on a 0-9 scale.

Conceptually, the strategy assessment process mirrors the strategic goal of advertising, namely, linking the product (defined by its attributes) to the person (defined by personal values) using the (differentiating) decision structure that drives choice. The interpretation of the strength of a decision network created by the advertisement is the evaluative criteria as to how effective it is in communicating the positioning strategy represented by the entire network of meanings.

Research Findings.

Analysis of over 100 advertisements using the StrEAM™ ADVERTISING STRATEGY ASSESSMENT methodology across product classes using advertisements from different countries reveals that a single composite score of the three levels of connections (composite summative scores range from 0-27) correlates 0.71 ($r^2$=0.50) with Affect for the respective product/service. This one-dimensional solution strongly supports the theory that creating connections between decision elements drives the creation of Affect for the product/service. Note that contrasting structural models comprised of the strategic elements to models comprised of only the connections across LOYALS and COMPETITIVE LOYALS reveals significant differences in the basis of how Affect is created and reinforced (see Reynolds, Gengler and Howard, 1995, Ref. 22 of the "References" section).

Management Application.

The application of the StrEAM™ ADVERTISING STRATEGY ASSESSMENT methodology to an a priori defined strategy provides a common framework to assess how well advertising delivers the desired positioning. What remains is expanding this research framework to a multidimensional perspective. That is, what is needed is the development of an analysis frame that permits additional learning by quantifying the correlational relationship of both the strategic elements and their connections to both Affect for the product and Affect for the advertisement. This new analysis should provide management additional insight, beyond simply assessing their one predetermined strategy, by identifying other strategic elements that have the potential to drive product/service Affect, the basis of the superiority belief. This application will be of particular value in assessing the competition's advertising communications, as well as gaining a better understanding of their own current and past advertising (which could be related to sales trends at the time it was on air).

Multidimensional Analysis Model.

The research problem the analysis model addresses is identifying, in order of contribution, which decision networks best predict Affect (either type could be used, but product/service is the primary one). This can be accomplished by a stepwise regression analysis, optimizing the selection of pairwise connections for each of the three types. This analysis requires that equal weights be applied to the three sets of predictor connections, thereby not capitalizing on the bias often created by least squares optimization (Cliff, 1987, p. 182, Ref. 6 of the "References" section). This means a simple summary composite index can be computed for each combination of the three bridges between decision elements. Note that the independent measures for each decision network range from 0-6, which is computed from adding the connection scores, which has a maximum of two for each. In this regression analysis, the summaries of the three-way combinations (across four decision element levels in MECCAS), representing the three connections, are evaluated as to how well the combination predicts Affect (resulting $R^2$). Note that the dependent measure in the regression has five integer scores, 0-4, representing the sum of the two Affect statements. The statistical significance of the multiple correlations for the decision networks provides the order of contribution and thereby identifies what possible other decision structures, representing positioning strategies, are activated by the communication. To obtain a measure of overall fit, or predictability accounted for by the respective decision networks included, another regression analysis, permitting least squares weights to be computed, can be done. The $R^2$ output provides an upper bound estimate of how much affect is explained.

There are two sub-models of this analysis, which result from the assumption regarding common elements in the decision network. Model I does not allow any common elements in any levels, essentially yielding statistically independent dimensions. Of course, true independence is unlikely, due to the commonality of meanings (which translates to dependence) between and across of the decision elements. Model II permits common elements to be used in the different decision networks.

Summary

The translation of understanding the decision networks that drive satisfaction and loyalty into positioning strategy can be readily accomplished using the MECCAS model. This evaluation of how well a pre-specified strategy is communicated by a given advertising execution can be assessed by the strength of the levels of the key statements corresponding to the decision elements and their respective levels of connectivity.

By developing a research methodology to investigate advertisements where there is a general understanding that there is no a priori knowledge as to strategy, or one assumes no a priori knowledge, management has the ability to determine which driving elements are creating Affect. This understanding is particularly useful when studying the competitive communications environment. When results from studying the competitive communications environment is combined with the equity analysis derived from the Equity/Disequity grid (e.g., as in FIG. 5), a more comprehensive perspective on developing optimal competitive positioning options is provided to management.

StrEAM™ Methodology Summary

Building strategic equity—defined as the set of positive associations extant in the minds of customers that drive choice behavior and loyalty—is management's first and last job. As markets evolve and become more complex, resulting in products and services that are essentially fungible, differentiation that drives choice still takes place, and this is because of strategic equity.

Strategic equity serves to insulate a brand, company, or service. It provides protection from the competitive forces in the marketplace. Conversely, a store of strategic equity makes one's marketing programs more effective, precisely because one has a base upon which to attract competitive customers (shift their beliefs underlying brand choice).

The logic equation that underlies the StrEAM™ research framework for identifying and quantifying the basis of strategic equity is as follows:

$$\text{Equity} = f_1(\text{likelihood of repeat purchase})$$
$$= f_2(\text{loyalty}) = f_3(\text{satisfaction}) = f_4(\text{beliefs, importances})$$

This general equation can be applied to frame marketing problems into research problems that focus on defining the relationships between and across these key functional relationships.

The fundamental grounding of the research process requires gaining an understanding of the customers' decision elements that drive choice. This understanding provides the foundation for the development of optimal strategic options.

There are five interrelated components of the StrEAM™ Process Model, each with their own combinations of research methodologies that define the management problem framing task specific to optimizing strategic equity. These requirements, along with their respective research solutions, are (1) through (5) following:

1. Provide a research methodology to identify and prioritize equity segments for analysis. This framework also permits assessing the equity segments with respect to their relative contribution to the organization's sales.

The construction of the StrEAM™ joint distribution of price sensitivity and conditional beliefs matrix provides management the basis to quantify and assess their equity in the marketplace in contrast to that of each of their competitors. Moreover, it provides management the metric that can serve as the orienting frame for development and communication of strategy across business units. As such, this analytic equity summary permits the assessment of longitudinal changes resulting from marketing activities, from a competitive perspective, within the marketplace.

2. Determine the key underlying decision elements within the decision structures that have the highest potential to increase customer satisfaction underlying loyalty.

Focused problem specification permits the framing of research in terms of increasing customer satisfaction. The application of the methods of the present invention for eliciting customer decision criteria, both avoids the pitfalls of traditional attitude measurement techniques and obtains the strategic equities, both positive and negative, that when considered jointly, define how to optimally improve customer satisfaction. Optimally refers to defining the priorities to provide the maximal increase in customer satisfaction.

Utilization of the StrEAM™ Equity Leverage Analysis methodology yields highly focused and precise measures of the attitude model components of beliefs and importances, without the limitations inherent to traditional assessment techniques. The additional advantage of being able to quantify potential gains in satisfaction (leverage) by changing elements of the marketing mix (both tactical and strategic) provides management concrete direction as to the solution to their customer-defined satisfaction problem.

3. Provide a research methodology that permits computation of statistical summary indices that can be used to track the changes in satisfaction by sub-units within the business organization over time.

The extension of the StrEAM™ Equity Leverage Analysis methodology—to provide dynamic output use as a management tool to increase customer satisfaction for functional units within an organization—is developed. Central to the dynamic nature of the management problem is the identification of the leverageable aspects of service at a given point in time and the ability to quantify and track relative performance of the functional units over time.

4. Identify the differentiating decision "equity" elements of a customer population, wherein each such "equity" element corresponds to a predetermined perception of the object being researched by at least some members of the customer population. In one embodiment, this is performed by identifying perceptual distinctions between relevant segments of the customer population. For example, perceptual distinctions may be identified between loyal and non-loyal object consumers, object buyers, object employees, and/or object users, etc. Note that identification of such distinctions is generally necessary to determine a marketing strategy for increasing the proportion of the customer population that can be considered loyal to the object, i.e., increasing the customers that are less likely to purchase, use, or consider other competing objects. In particular, the present invention uses the following:

A. A means-end method and corresponding computational model to identify the structural components of decision-making in a customer population, wherein, e.g., such structural components may be: (i) various categories relating to customer perception of the object being researched, and/or (ii) the customer perceived relationships between such categories (as is obtained by laddering). That is, by interviewing a sampling of problem-appropriate customer population segments for a marketplace (such segments identified, in one embodiment, by a combination of object loyalty and usage level classifications), analysis of interview responses for the segment respective perception valences (i.e., positive or negative responses) yields an index reflecting the degree of positive differentiation power for each decision element. When these indices are computed for relevant customer population segments (e.g., Loyal "Y" vs. Non-Loyal, or Loyal Heavy vs. Loyal Light Users, or Loyal "Y" vs. Loyal "Z"), the contrasting of these indices permits the identification of decision elements that have the most strategic potential to move customers from one equity segment to a more advantageous and desirable equity segment. When these strategic elements with the most potential are then put in context of the overall decision structure (Customer Decision Map), strategic options that incorporate these high-potential leverageable decision elements can be integrated, producing an optimal strategy.

B. A general marketing research tracking model that permits strategic analysis of the marketplace. Using the input obtained from identifying the decision elements (from the CDM), measures of belief and importance are obtained for the customer-specific relevant set of competitive products/services, defined in a meta-category context. Beliefs are considered stable for the products/services. Importances are considered to vary by relevant consumption context. These measures, when used as the basis to understand the different equity segments in the StrEAM™ joint distribution of price sensitivity and conditional beliefs matrix, yield statistical indices reflecting their degree of differentiation power.

Tracking in this way permits the measurement of differences over time of these key explanatory decision variables.

The other components of the tracking system include corporate image and marketing activities and events. Measurements of these corporate image constructs can be related directly to the equity segments, providing the ability to measure and contrast their respective equity effects (over time) with the StrEAM™ joint distribution of price sensitivity and conditional beliefs segments. The measures of marketing activities, comprised of awareness and participation, can be used in a predictive sense to assess their impact on decision elements and usage, by equity classification. These general analyses represent only the most rudimentary ones to understanding and quantifying equity. Given the multi-component aspect of this tracking system, virtually a limitless number of analyses could be undertaken to answer specific problems or questions management could pose.

5. Provide a methodology to quantify the contribution of key perceptual associations that correspond to customer decision structures caused by communications that drive affect for the product/service.

The MECCAS translation (Reynolds and Gutman, 1984, Ref. 23 of the "References" section, Reynolds and Craddock, 1988, Ref. 20 of the "References" section) of communication and advertising strategy to customer decision elements, reflecting the means-end network, is used as a framework to assess communications. The StrEAM™ assessment framework obtains measures of the strength of the strategic elements (decision nodes) and the strength of their respective connections between elements at different levels of the model. Management review of these communication measures reveals the extent to which the communication is "on strategy," meaning the degree to which it communicates the a priori positioning strategy.

StrEAM™ also presents a methodology to assess advertising communications without an a priori strategy specification. Using Affect as a dependent criterion variable, the optimal predictive set of decision structures (using the three connection bridges as a composite independent variable) can be identified and ordered by degree of explanatory contribution. This methodology provides management with the ability to specify what decision networks are being developed or impacted by advertising, which is relevant to analysis of competitive advertising.

The StrEAM™ family of research methodologies is applicable to solving a wide variety of marketing problems, both tactical and strategic in nature. The basic key to their successful implementation is the framing of the marketing problem in customer satisfaction and/or loyalty terms. This is critical because these constructs represent the operational components of strategic equity of the product/service, which management uses as the guiding metric to their decision-making.

The entire set of StrEAM™ research methodologies is designed to be implemented via computer interfaces with electronic communications. In many cases, the adaptive questioning procedures embedded in the programming are necessitated due to the branching required to select the most appropriate question for the individual respondent. That is, questions are either asked using either the respondent's prior answer as a basis to frame the subsequent question, or, by using input as to relevant criteria obtained for a respondent, to select only those questions that are pertinent. Additionally, because graphical scales and other stimuli are standard to the research methods, the ability to present these images and work with them in real time, to focus the respondent on the distinctions of interest, is required.

Network/Internet Embodiments

Figure 29:
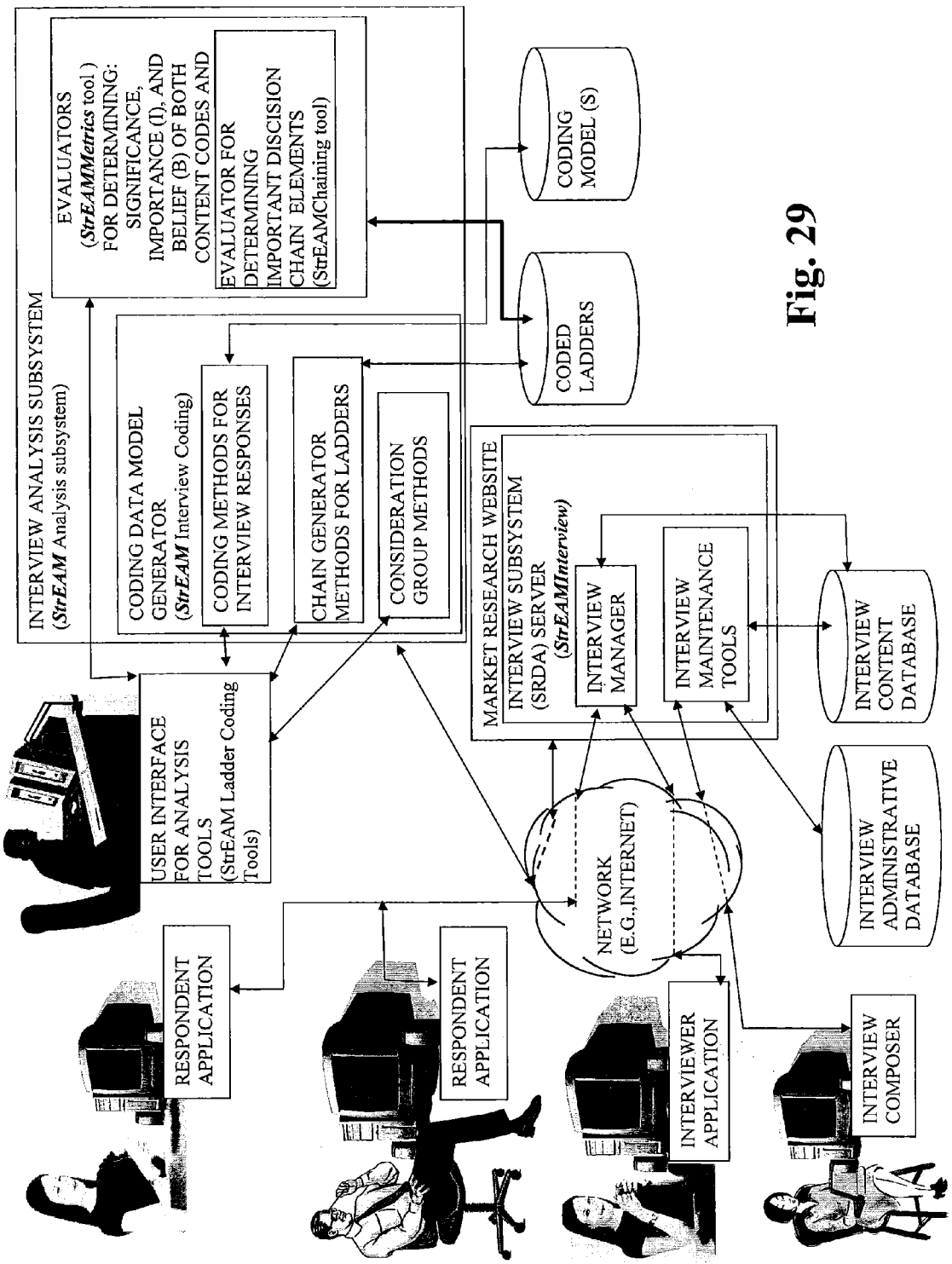
FIG. 29 is a block diagram of a network embodiment of the invention, wherein the network may be the Internet.

As described in the summary section hereinabove, the present invention includes two subsystems, i.e., an interactive interview subsystem (also referred to herein as StrEAMInterview) for assisting an interviewer in conducting an interview (particularly networked interviews, such as interviews conducted remotely via the Internet), and an interview data analysis subsystem (also referred to herein as StrEAMAnalysis) for analyzing the interview data according to the techniques of the present invention. FIG. 29 shows these subsystems and some of their high level functional components in an embodiment wherein various components of the invention communicate via the Internet.

The StrEAMInterview is a key component of the process to develop Strategic Equity Assessment and Management models (StrEAM®). Such models are the basis of a rigorous approach to the development of optimal business strategies to maintain and attract loyal customers. At a high level, the StrEAM methodology involves the steps depicted in FIG. 10.

To support this process, StrEAMInterview provides automated assistance for Step 3 of FIG. 10, Conducting Laddering Interviews. It provides a web-based framework in which an interviewer and a respondent can interact over the Internet to conduct a structured interview. StrEAMInterview serves up predefined presentations to the respondent and also allows for unstructured dialog between the interviewer and respondent at the same time. The results of these interviews are captured in a form facilitating both downstream analysis and preservation of the original verbatim dialog between the respondent and the interviewer.

Means-End Analysis Approach

The StrEAMInterview system is designed to support a Means-End approach to understanding consumer decision-making. This is achieved, not by gathering input from an exhaustive questionnaire, but rather by engaging in a multi-level dialog with individuals (i.e., respondents) about their decision-making process. Of interest are the relationships between, e.g., one or more product (or service) attributes and the perceptions of the respondent(s) regarding the product or service. In particular, such relationships are discovered and explored through an interview technique known as Laddering. StrEAMInterview implements intelligent support for Laddering and the definition of a structured interview framework around it.

StrEAMInterview Application Overview

The interactive interview subsystem implements support for on-line, one-on-one interviews. Each interview is conducted between an interviewer and a respondent by way of resources provided by an Internet (or other network) web server.

Major Components

Figure 30:
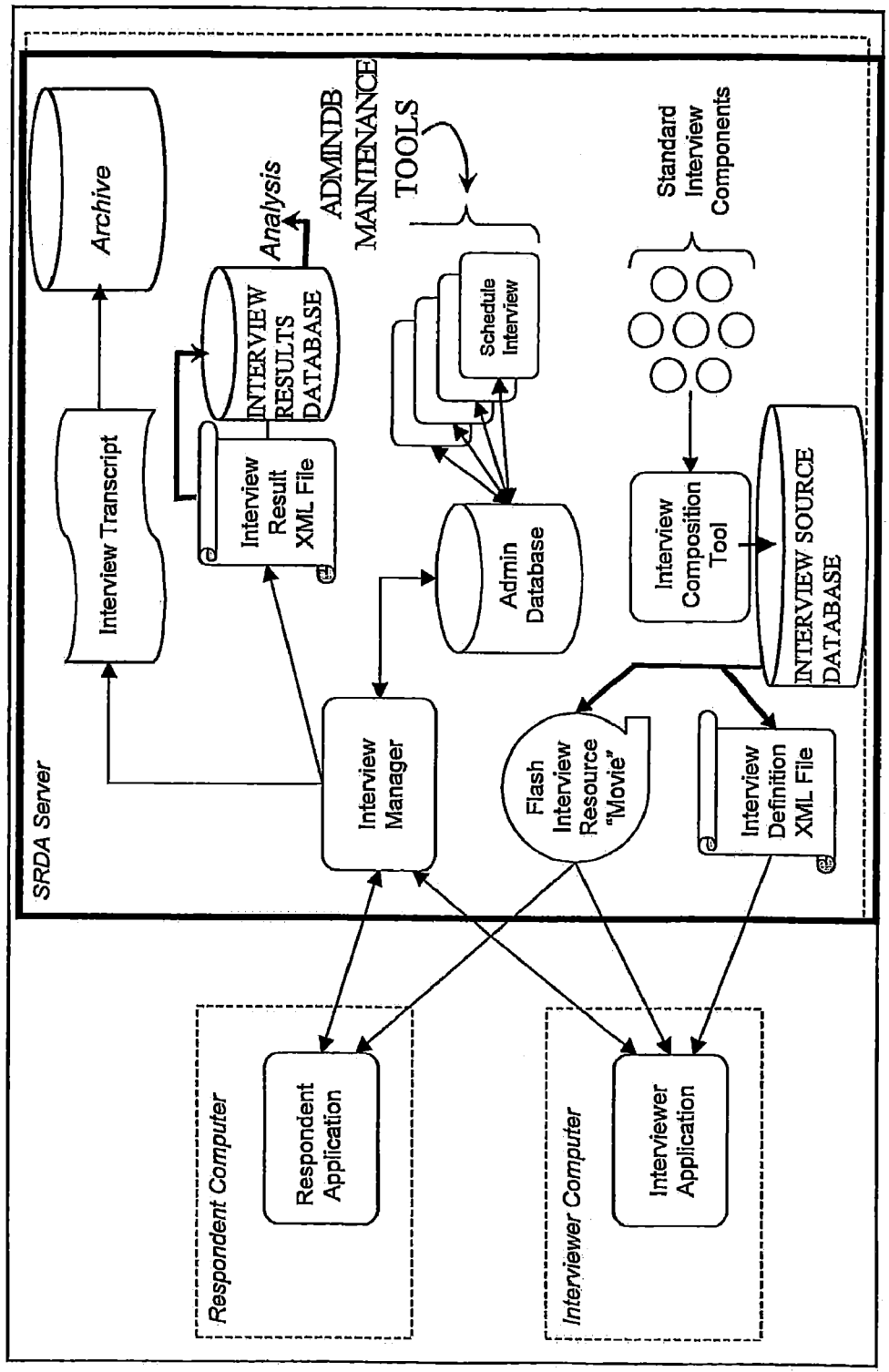
FIG. 30 is another block diagram of the invention providing additional detail as to the components of the invention.

In one embodiment, the present invention includes an interactive interview subsystem (also denoted an SRDA interactive interview subsystem) that is used to conduct interviews interactively via the Internet. Accordingly, a web server (denoted an "SRDA server" herein) is provided for communicating with: (a) (a likely remotely located) interviewer computer that an interviewer uses to conduct an interview, and (b) a respondent computer used by a respondent for responding to interview presentations. The major components of the SRDA interactive interview subsystem are depicted in FIGS. 29 and 30.

Each component is described briefly as follows:

(a) An interviewer application. This application is an application residing on the interviewer computer for conducting an interview with a respondent. In one embodiment, the interviewer application is provided as an Adobe Flash Player™ "client" application (implemented in ActionScript™, a web-based scripting language by Adobe Inc. for providing real-time communications between network (e.g., Internet) nodes. The interviewer application provides a display framework that the interviewer uses to conduct an interview with a respondent via, e.g., a telecommunications network such as the Internet (however, the invention may also utilize other networks such as private IP networks such as an enterprise-wide network of a corporation having numerous sites, or even a local area network such as a network for a single high rise building). The display framework is presented from an activation of a network browser at the interviewer computer (such browsers being, e.g., Internet Explorer by Microsoft, the Netscape browser by America On-Line, or any number of other network browsers).

During an interview, the interviewer uses the interviewer application to control the interview according to, e.g., (i) a predetermined sequence of presentations presented to the user (e.g., questions and statements corresponding to a laddering chain as described above), (ii) when to present to a respondent a summarization of a laddering chain, and (iii) when to provide audio information to the respondent, e.g., requesting further clarification of a response by a respondent. Note that for conducting an interview, the interviewer application is provided by an interview definition file from the interview manager (described further hereinbelow), wherein such a file contains interview data for conducting a particular interview. Additionally, the interviewer application communicates with an interview manager for coordinating communications between the interviewer and the respondent, as will be described further hereinbelow. The interviewer application also communicates with various flash intelligent graphics components (as described in the Definitions section above) for providing, e.g., pictorial, animated, and/or movie presentations to the respondent. The interviewer application also communicates with a respondent through a flash communication server (as described in the Definitions section above) running on the SRDA web server.

Figure 31:
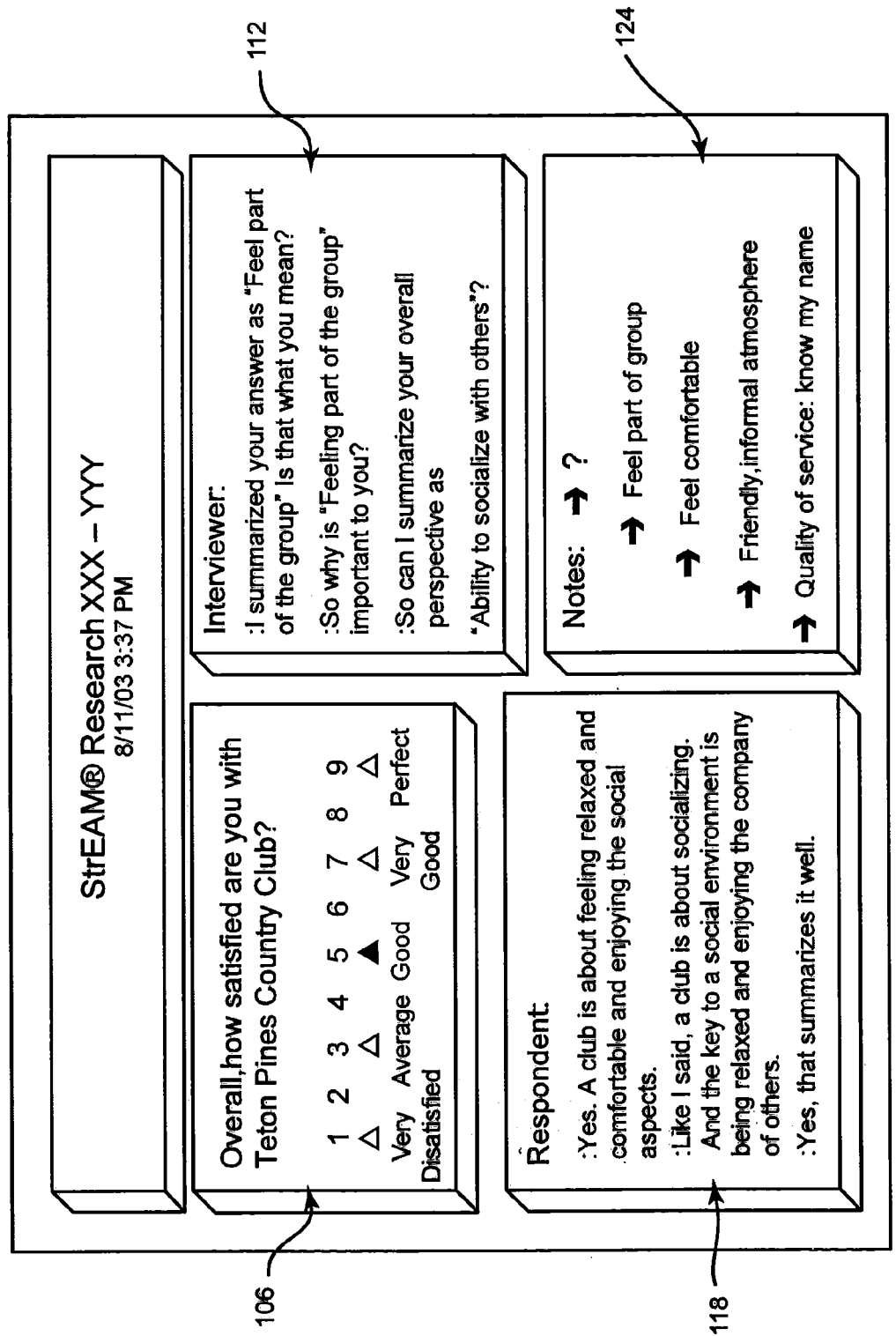
FIG. 31 is an illustrative example of the user interface provided to an interviewee that is, e.g., being interviewed via the Internet (or another communications network).

(b) A respondent application. This application is an application that is downloaded to the respondent computer for interacting with the respondent during the interview. The respondent application is a flash client application (also implemented in ActionScript) as described in the Definitions and Descriptions of Terms section above. An example of the graphical display provided by one embodiment of the respondent application is shown in FIG. 31, and is described further below.

(c) An interview manager. This manager is an application residing at the SRDA server for managing communications between the interviewer application and the respondent application. In particular, the interview manager is a Flash-Comm application (as described in the Definitions and Description of Terms section above) that manages certain aspects of an interviewer/respondent session. For example, the interview manager takes care of various aspects of housekeeping such as the orderly storage of the interview results and the management of the network connections between the interviewer application and the respondent application. Note that the interview manager is also an ActionScript application.

(d) An interview administrative database. This is a relational database (implemented using MySQL as the database manager) that stores administrative data associated with the survey process: information about interviewers, studies, interview appointments, the status of interviews, and respondent information. Further details regarding the interview administrative database are provided hereinbelow.

(e) Interview administrative maintenance tools. These tools include a set of utilities for creating, reading, updating, and deleting information from the interview administrative database. The interview administrative database maintenance tools are implemented in PHP script. Further details are provided hereinbelow.

(f) Interview content database. This database includes the following data:

(i) An Interview definition file (IDefML) which is a text file containing an XML-based grammar (described further in "Interview_Results_XML_(IResML)_Schema.txt" of the Computer Program Listing Appendix) for defining the structure and content of an interview on a particular topic. Each interview definition file is a text file defining the structure of the interview (which questions to ask, in what sequence, using what form of questioning). Note that each such topic will have one or more topic-specific interview definition files. During an interview, the corresponding topic specific interview definition file(s) is read by the interviewer application for providing the interviewer with guidance in conducting and controlling an interview. Thus, this file is not, in general, input to the respondent application. Such interview definition files are stored in the interview source database. Further description of the interview definition files is provided hereinbelow.

(ii) An interview resource file which is an Adobe Flash "movie" file (as described in the Definitions and Descriptions of Terms section above) that provides intelligent graphics for use during an interview, such intelligent graphics being animations, movie clips, and/or graphical scenes that a respondent may view and/or interact with. For a given interview topic, the interview resource file includes substantially all the additional interview related information that is not in the interview definition file(s), and in particular, provides access to most of the non-text interview presentation materials for an interview. In one embodiment, such interview resource files may be Adobe Macromedia Flash® movie files (as are the StrEAMInterview applications) which contain the display mechanics that support the interview defined in the interview definition file. Each interview resource file is read by both the interviewer application and the respondent applications during an interview session. Note that such interview resource files are stored in the interview source database. Further description of the interview resource files is provided hereinbelow.

(iii) An interview results file which is a file that contains the recorded results of an interview session. The interview results file is a text file containing text structured according to an XML-based grammar, wherein the formal responses obtained by the interviewer from a particular respondent are recorded as the text in the file. The file is built by the interviewer application during a corresponding interview session and stored by the interview manager in an interview result database for later analysis.

(iv) One or more interview transcript files which contains the unstructured dialog that is communicated between the interviewer and the respondent. Each interview transcript file records in order the communications of both the interviewer and respondent during an interview session. Such interview transcript files are generally not used for interview analysis, but rather for later inspection if an audit is performed.

(g) An interview composition tool which is a tool that hides the XML definition language and presents a graphical user interface (GUI) front-end for interview composition by an interview designer.

Interview User Interface

Displays

Below is a list of the display items on the Interviewer's desktop generated by the interview application (FIG. 29). Each of these display items displays some information about the current interview session. None of these items can be used to change settings or cause any change in the interview application's behavior.

| | |
|---|---|
| Interview Title | This simply displays the title of the interview/study. This comes from the IDefML file (the <interview-title> element). |
| Interviewer Screen Name | This displays the screen name of the Interviewer. The screen name is currently envisioned to come from the Interview Administrative database which keeps track of Interviewers, including assignments to conduct interviews. |
| Interviewer Status | The Interviewer's status is displayed (offline [red] - or ready [green]). It is possible to have the application running but not (yet) connected to the interview manager. In this case the Interviewer's status is offline. As soon as all of the Interviewer's connections have occurred, his/her status becomes 'ready'. |
| Interviewer Connection Light | This Connection Light is a standard FlashCom component that monitors the quality of the Interviewer's connection to the SRDA sever and displays the status with a green, yellow, or red light. If clicked, this component will toggle to display a little transparent information box that gives more details about the quality of the connection. |
| Respondent Screen Name | This displays the screen name of the Respondent. It is passed along from the Respondent, once connected, in one of the FlashCom SharedObjects. |
| Respondent Status | The status of the Respondent's network connection is displayed here (offline [red] - or ready [green]). This is detected by the handshake through FlashCom. In one embodiment, the detection occurs in one of the SharedObjects. In another embodiment, the interview manager will keep each of the interviewer application and the respondent application appraised of the connection status of the other party. |
| Elapsed Time | This displays the total time that has elapsed since an interview began. This displays the time since the "Start Interview" button was pressed, not the beginning of the connections. |
| Respondent Audio Status | This displays whether the Respondent's audio is on or off. If it is off, the Interviewer can't rely on the microphone to communicate with the Respondent. |

Buttons/Controls

| | |
|---|---|
| Start Interview | This button is available only at the beginning of the interview. The initial display state is that a Welcome slide is displayed and the conversational windows are available for dialog. Typically the Interviewer might have "Welcome. Please let me know when you are ready" in the Interviewer dialog box for transmission to a Respondent. Accordingly, when the Interviewer decides the time is appropriate he/she presses the Start Interview button to begin the structured part of the interview. As soon as the Respondent and Interviewer connect (through the Interview Manager), the Interview Transcripts begin. However, the interview session itself doesn't begin until the Start Interview button is pressed (by the Interviewer). When the Start Interview button is pressed, the header of the Interview Results File for the session is written and the application proceeds to the first Topic of the interview session. It is also at this point that the Elapsed Time clock begins on the Interviewer side. Once the Start Interview burton is pressed, it is no longer available. |
| Finish Interview | This button is available only at the end of the interview. When the interview has reached the Closing slide, the application will await Interviewer action (by activating this button) to conclude the session. Pressing the Finish Interview button will cause the Interviewer application to write out the footer to the Interview Results file for this session, will cease any further interaction, and cause both sides (Respondent and Interviewer) to be disconnected from the Interview Manager. The Finish Interview button is used to conclude a fully executed interview session and records an appropriate status to that effect. |
| Blank Playback | This button is active when the Respondent's 'Notes' window is not blank. Clicking this will cause the Respondent's Notes window to become blank. It will have no effect on the content of the Notes window on the Interviewer's side. |
| Send Playback | This button is active any time there is information in the 'Notes' window that has not been sent to the Respondent; clicking this button causes the content of the Interviewer's 'Notes' window to be sent to the Respondent (and displayed by the Respondent's application in the respondent's 'Notes' window). |
| Record Results | This button is active any time there is information in the Interviewer's 'Notes' window (that has not been recorded); clicking this button causes the content of the Interviewer's 'Notes' window to be treated as the formal result of the current topic and formatted and written out to the IResML file. |
| Next Topic | This button is active any time the previous Topic has been completed (answered, skipped, or info-only). Clicking this will cause the Interviewer application to proceed to the next Topic. The display for that next Topic will occur and the control information will be transmitted by the Respondent Application to cause the same to happen on the Respondent's application. The information will be sent through the Display SharedObject. |
| Suspend Interview | This button is available outside of "question/answer transactions" communications between an Interviewer and a Respondent. Activation of this button will cause the current interview session to be suspended and shut down. This would typically be used at the behest of the Respondent. A confirmation window is displayed in order to avoid accidental use of this button. In order to support orderly restart later, questions can either be asked (and answered) or not asked. So in the case of a question that is not a Set-Consumer, this means that after a question is asked, the Interviewer cannot press Suspend Interview, unless he/she first presses "Skip Question" (see below). That way, the Interviewer can either get the Respondent to complete the answer to the current question, or can wipe out any partial responses. |

-continued

| | |
|---|---|
| | Note that in the case of a Set-Consumer, the boundary will be around each instance in the set (rather than forcing the interview through the whole set or wiping out all of the set done so far). |
| Microphone On/Off Toggle | This button is always available and allows the Interviewer to toggle the status of his/her microphone. When it is ON, the Interviewer may speak through the microphone and Respondent's. When it is OFF, the microphone is deactivated. Typically the Interviewer will want to keep the Microphone on to use voice to elaborate the discussion. However there may be reasons (including the Respondent's preference) to not use voice, and just text dialog. |

Context Menus (Right Button)

In one embodiment, there are context-dependent pop-up (right-click) browser menus for assisting the interviewer by, e.g., providing "hints". Basically, the function of any of these Interviewer application context menu pop-ups is to offer a piece of text to be input to the applicable text entry buffer for transmitting to the respondent application. The text will not be automatically sent; the Interviewer must activate the sending (by hitting return). This way the Interviewer is able to edit (if desired) such text prior to it being transmitted to the Respondent.

Note that if there is any text in the chosen buffer prior to the menu choice it will be overwritten by the menu choice.

Interviewer Area (Window)

If a right-click is detected over the interviewer's text box (or in one embodiment, the whole Interviewer dialog window) any interviewer hints (as described in the section "Interviewer Hints" hereinbelow) that are available are displayed.

The options that are available for use with the interviewer hints may be:

(i) Paste the last line of text from the Respondent's dialog (if anything); or
(ii) Paste whatever is in the paste buffer (if anything); And then any <interviewer-hints> (for that topic context).

Notes Area (Window)

There will be three different Notes area modes depending on what kind of input is being constructed by the interviewer.

Ladder Building Result Boxes

When a ladder is being constructed as the official interviewee response, there are four text boxes in the Notes area (i.e., one for each of: a value response, a psychosocial consequence response, a functional consequence response, and an attribute response).

Right-clicking over any of these boxes will offer the following options:

(i) Paste the last line of text from the Respondent's dialog (if anything); or
(ii) Paste whatever is in the paste buffer (if anything)

And then any <ladder-hints> (for that topic context) by category:

(a) When over Values any <values><hint> elements;
(b) When over either Consequence box any <consequences><hint> elements; and
(c) When over Attributes any <attributes><hint> elements.

Set Building Result Boxes

When building a set as a result (this is both for a set generator or for a set elaborator), there will be several text boxes in the Notes Area (the number specified by the IDefML set-maximum attribute for the set producing topic, or the number of actual set members when doing a set elaboration). Each box will correspond to an answer. There is an unselected box border (thin white) for boxes not selected, and a selected box border (thick yellow) for selected boxes.

The right-click/pop up menu available is the same for all boxes. The box that is right-clicked over is the box that will be the target for whatever is pasted. The options are:

(i) Paste the last line of text from the Respondent's dialog (if anything);
(ii) Paste whatever is in the paste buffer (if anything); and
(iii) And then any <response-hints> (for that topic context).

Simple Response Box

This is a text box that will be used to construct and/or replay any other kind of response. There should be a border around this text box, just like the typeBox, but it need not scroll. When a user right-clicks over this box the options available are:

(i) Paste the last line of text from the Respondent's dialog; or
(ii) Paste whatever is in the paste buffer;

And then any <response-hints> (for that topic context).

...

Gathering Answers

Below is a summary of the interview question types from the perspective of how the "results" are formed and captured. Note that from that viewpoint, questions that are Set-Consumers are treated just on an individual basis. In other words, only in the case of a set-generator is there the notion of a list being created for an answer (from a User Interface standpoint). In the cases where a list exists and is being elaborated or being cycled through for a ladder (or the like), then the question is repeated for each set member—so its "type" from a result gathering standpoint is independent of the fact there is a set involved.

The result is that there are four (4) basic forms of result construction:

(i) Simple answers;
(ii) Interactive answers;
(iii) Set Generation answers;
(iv) Ladder answers.

Each of these is described in more detail below:

| | | |
|---|---|---|
| Simple | <general-question> <expectation-question> <usage-question> <purchase-question> <image-question> | This is the form when there is just a text response to be provided. The Notes area is just be a simple text box. The completeness test will be to see if it is not blank. |
| Interactive | <rating-scale> <trend-scale> <valence-question> <radio-question> <chip-allocation> <preference-question> | These are questions where an interactive slide provides the answer from the respondent (it may also come through the dialog). So there is a simple constrained set of responses that can be here. |

| | | |
|---|---|---|
| Set Generation | <occasion-question> <consideration-question> | These are questions that result in the creation of a list (set). The answer for these questions is actually a list created together. The user interface will have a text box for each possible set member (up to the limit declared in the IDefML file). Note that there needs to be at least one non-null box for an answer. But there is no requirement for more than that. |
| Ladder | <plus-equity> <minus-equity> <ladder-question> | Ladder questions are those where the "answer" is the construction of at least a 4-level ladder. There will be four text boxes containing (from the top): Values, Psychosocial Consequences, Functional Consequences, Attributes. Each of these boxes must contain something in order for the answer to be considered complete. |

Respondent User Interface

Display

Below is a list of the display items on the Respondent's desktop. Each of these item displays some information about the current interview session. None of these items can be used to change settings or cause any change in the application's behavior.

| | |
|---|---|
| Interview Title | This simply displays the title of the interview/study. This comes from the IDefML file (the <interview-title> element). |
| Interviewer Screen Name | This displays the screen name of the Interviewer. It is passed along from the Interviewer in one of the FlashCom SharedObjects. |
| Interviewer Status | The status of the Interviewer is displayed here (offline [red] - or ready [green]). This is detected by the handshake through FlashCom. For now that just occurs in one of the SharedObjects. In the future, the interview manager (server) will keep the applications appraised of the connection status of the other party. |
| Respondent Screen Name | This displays the screen name of the Respondent. The screen name is currently envisioned to come from the Interview Administrative database. However, it might also be appropriate to have it come from a log-in screen. It is really only there to provide an on-line identity. |
| Respondent Status | The Respondent's status is displayed (offline [red] - or ready [green]). It is possible to have the application running but not (yet) connected to the interview manager. In this case the Respondent's status will be offline. As soon as all of the Respondent's connection has occurred, his/her status will become 'ready'. This may be too redundant with the Connection Light (see below). We'll see. |
| Respondent Connection Light | This Connection Light is a standard FlashCom component that monitors the quality of the Respondent's connection to the SRDA sever and displays the status with a green, yellow, or red light. If clicked, this will toggle to display a little transparent information box that gives more details about the quality of the connection. |

Representative Display

A representative display of a respondent user interface is shown in FIG. 31, wherein there are four interview interactions areas or frames 106, 112, 118, and 124.

The frame 106 (also denoted a "display window") is generally for presenting a formal stimuli (e.g., a question and/or scenario) to the respondent and receiving a response from the respondent. Such formal stimuli may be presented as a series of "slides" (some of which can be animated) that are controlled by the interviewer. In certain cases the respondent will interact with the display window. The area 106 of FIG. 31 shows a range of nine degrees of satisfaction with a particular country club, wherein the respondent is able to select one of the numbers (one through nine) as being indicative of his/her satisfaction. Such selection may be performed with a mouse, trackball or other computational selection device. However, it is within the scope of the present invention to obtain such respondent selection via voice input or use of a touch screen.

The area 112 (also denoted as the "interviewer dialog window") is generally for presenting unstructured text entered by the interviewer (e.g., feedback, comments, and/or further information such as explanation) to the respondent. In FIG. 31, the area 112 displays an interviewer provided summary of a previous portion of the interview. Area 112 is generally a display only area.

The area 118 is where a respondent can input unstructured text at any time during an interview. In the area 118 of FIG. 31, the respondent's responses are provided to the interviewer's inputs displayed in area 112. Note that a textual dialog can be carried on between the respondent and the interviewer via the areas 112 and 118. For example, the interviewer entered the text: "I summarized your answer as "Feel part of the group." Is that what you mean?". In response the respondent input (via typing and/or voice recognition) "Yes. A club is about feeling relaxed and comfortable and enjoying the social aspects." Subsequently, the interviewer responded with: "So why is "Feeling part of the group" important to you?", and the respondent then enters: "Like I said, a club is about socializing. And the key to a social environment is being relaxed and enjoying the company of others." After which the interviewer communicates: "So can I summarize your overall perspective as 'Ability to socialize with others'?".

The area 124 (also known denoted the "notes window") is used for presenting formal responses (i.e., responses recorded by the interviewer) to the respondent for his/her approval. The content of area 124 is built by the interviewer and when appropriate (e.g., approved by the respondent), is recorded as the formal response to a currently presented interview question or scenario. In particular, the area 124 is used, for instance, in building a ladder. For example, in the area 124 of FIG. 31 a current ladder or chain is being constructed according to the respondent's inputs. The lower-most line (i.e., "Quality of service: know my name") is an attribute of the particular country club that the respondent has previously indicated is important to him. The next line up (i.e., "Friendly, informal atmosphere") is a functional consequence of the lower attribute that the respondent has previously indicated is an important consequence of the attribute. The next line up (i.e., "Feel comfortable") is a psychosocial consequence that the respondent has previously indicated is an important consequence of the functional consequence. The next line up (i.e., "Feel part of group") is a value that the respondent has previously indicated is an important to him/her.

Buttons/Controls

The following are user interface controls available to the respondent via the respondent application.

| | |
|---|---|
| Audio Volume Control (Slider) | This is a 'slider' control that can be used by the Respondent to adjust the volume of the audio (if on). The Respondent clicks and holds the slider and moves it right and left to increase and decrease (respectively) the volume of the audio. |
| Audio On/Off (Toggle) | This button is available all the time to the Respondent to turn on (default) or off the audio input from the Interviewer. Note that in one embodiment, the change of state of this button may be communicated back to the Interviewer (through SharedObject). That way the Interviewer will know not to bother using the microphone if the Respondent turns it off. |
| Yes | This button is a convenience item for the Respondent. Clicking this will put 'Yes' into the Respondent's 'Type Box' and send it to the Interviewer. It is available all the time. |
| No | This button is a convenience item for the Respondent. Clicking this will put 'No' into the Respondent's 'Type Box' and send it to the Interviewer. It is available all the time. |
| Pause Interview | This button is available all the time to the Respondent to allow him/her to signal to the Interviewer a desire to pause the interview. The button has no effect other than to send this message. The Interviewer will be required to take action to both respond to the request, and to either just wait for the Respondent to continue, or to actually suspend the interview for restart some time in the future. |

StrEAMInterview Application Workflow

An interviewer proceeds sequentially through a series of presentations, continuing from one step to the next only as allowed by a predetermined interview framework as defined in a corresponding interview definition file.

Since the interviewer application controls what happens on the respondent application, the interview workflow may be described in terms of the state of the interviewer application.

Interviewer Application States

Interviewer application states may be described in terms of interview "presentations", wherein the term "presentation" refers herein to a semantically meaningful segment of the interview. Said another, "presentation" refers to a largest collection of program elements for presenting interview information to the interviewer (and likely to the respondent as well), wherein the collection is either executed until a predetermined termination is reached, or, the collection is not activated at all. Accordingly, each such "presentation" corresponds with what is commonly referred to as a database transaction. There are four general types of presentations: OPENING, CLOSING, QUESTION, and INFO. The QUESTION type is where the interviewer causes a presentation, requiring a response from the respondent, to be presented to the respondent. In one embodiment, may select such presentation from thumbnail displays provided to the interviewer by the interviewer application. However, at least one preferred sequence of presentations is available to the interviewer for conducting the interview session. The OPENING and CLOSING presentations are special placeholder presentations at the beginning and end of an interview session, respectively. The collection of program elements for these states, respectively, initiate and terminate the capture of interview information. The INFO presentations are for presenting introductory information to the respondent, or help information to assist a respondent during an interview. No interviewer or respondent action may be required by an INFO presentation.

Give the above discussion of interview presentations, there are four basic states or modes that the interviewer application may be in during an interview session. They are:

OPENING This is an initial state for an interview session. Only one presentation in an interview session is presented in this state, and it is always the first presentation of the interview session.

QUESTION In this state the following occurs: (a) interview presentations are displayed to both the interviewer and the respondent, (b) the respondent's inputs are captured and provided to the interviewer, and/or (c) there is interactive (near) real-time dialog between the interviewer and the respondent. When in the Question state, the interactive interview subsystem either (i) progresses through the programmatic instructions that define the type of interview inquiry or question presentation currently being presented to both the interviewer (via the interviewer application) and the respondent (via the respondent application), or (ii) allows the interviewer to abandon the current presentation altogether. Other than when abandoning a presentation, the interviewer application may wait for a respondent input to a Question presentation so that such input can be recorded prior to allowing the Question presentation to terminate.

BETWEEN In order to allow the interviewer to control the pace of an interview session, the present state may entered between activating consecutive QUESTION presentations, or after an INFO slide has been displayed.

CLOSING This is a termination state for an interview session. Only one presentation in the interview session is presented in this state, and it will always be the last presentation of the interview session.

An interview, therefore, progresses from an OPENING presentation through any number of QUESTION and INFO presentations until reaching a CLOSING presentation.

Interviewer Assistance

The StrEAMInterview subsystem is intended to support an interactive dialog between an interviewer and a respondent. As such, it allows for unstructured dialog between the two. However, as an optimization, the StrEAMInterview subsystem provides some automated assistance to the interviewer for inputting dialog to be communicated to the respondent. The availability of such assistance, as well as some of its content, is controlled by entries in the interview definition file (IDefML). This way an interview designer can create controlled, context-specific assistance to aid the interviewer during an interview session.

Interviewer assistance is provided in the form of context-specific pop-up menus that are displayed when, e.g., a computer pointing or selection device (e.g., a mouse, light pen, joystick, trackball, etc.) is used to identify a particular area of the interviewer's computer display. The options on these menus depend on the arrangement of the interviewer's computer screen, and more particularly, on the context or state of the interview session.

Additionally, convenient paste options are provided that allow the interviewer to select and copy, e.g., a display of respondent text input (if available) to another area for the interviewer display. Moreover, an interviewer may have access to various interview information agents that can provide the interviewer with "hints" regarding how to proceed with the interview. In general, such hints may be pre-formed questions or statements (whole or partial) that can be used when probing a respondent or capturing a response.

Interviewer Hints

Interviewer hints are aids for the interviewer during the questioning process. For any instance of a question, an interview designer may include a set of interviewer hints. If so included, then during a Question state, a pop-up menu will be available in (or near) the Interviewer Dialog box, wherein the pop-up menu will contain each of the specified "hints" as selections. Choosing one of those hints will cause the text to be inserted into the Interviewer's Dialog text box. The interviewer can either send that text verbatim, or edit it to form a more specific probe for the occasion.

An interviewer-hints element in the IDefML file has the following form:

```
<interviewer-hints>
    <hint> Why is that important to you? </hint>
    <hint> How does that help you out? </hint>
    <hint> What do you get from that? </hint>
    <hint> Why do you want that? </hint>
    <hint> What happens to you as a result of that? </hint>
    <hint> How does that make you feel? </hint>
</Interviewer-hints>
```

Figure 33:
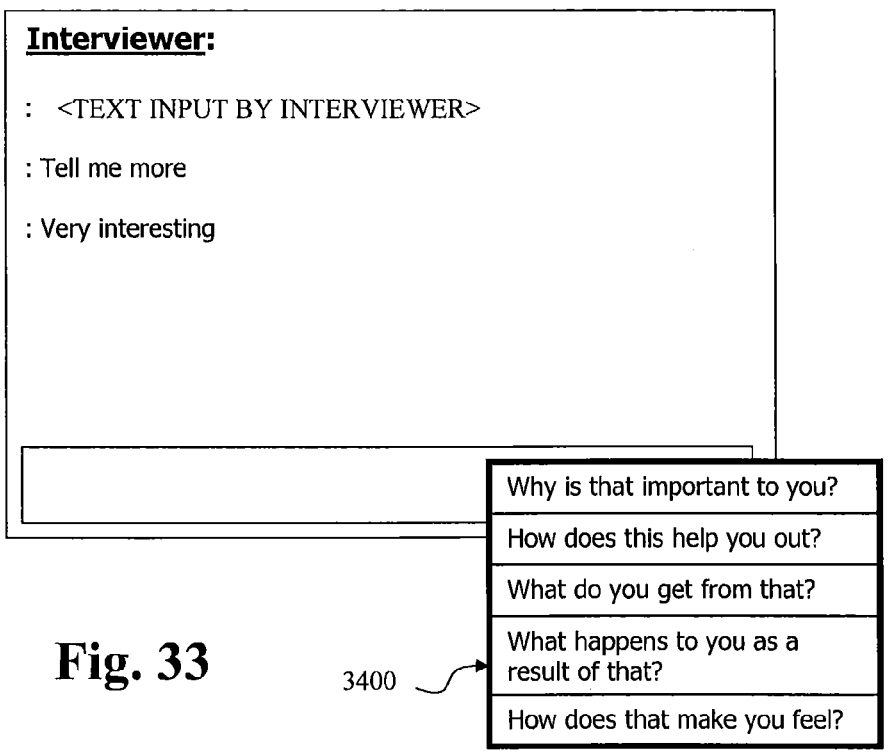
FIG. 33 shows a user interface popup menu available to an interviewer using the present invention, wherein the menu provides the interviewer with assistance in proceeding with the interview.

With an IDefML element like this for a particular Question, clicking the mouse button in the Interviewer Dialog box would result in a pop-up menu with the content of menu 3400 of FIG. 33

Ladder Hints

The Interview Designer may further facilitate the laddering process by providing aids (hints) to be associated with each ladder level. Words, phrases, statements, etc. can be defined by the Interview Designer that are available to the Interviewer by bringing up a menu when the mouse is over (or near) one of the Ladder Level text boxes 3504 through 3516 of FIG. 34. There are three (3) possible categories of Ladder Hints: Values, Consequences, and Attributes. Value hints are associated with the top Ladder Level, and Attribute hints with the bottom. Items listed as Consequences are associated with either of the two middle Ladder boxes (i.e., functional consequences, and psychosocial consequences).

An example of a set of Ladder Hints is given below:

```
<value-hints>
    <hint>Accomplishment</hint>
    <hint>Family</hint>
    <hint>Belonging</hint>
    <hint>Self-esteem</hint>
</value-hints>
<consequence-hints>
    <hint>Quality</hint>
    <hint>Filling</hint>
```

-continued

```
    <hint>Refreshing</hint>
    <hint>Consume less</hint>
    <hint>Thirst-quenching</hint>
    <hint>More feminine</hint>
    <hint>Avoid negatives</hint>
    <hint>Avoid waste</hint>
    <hint>Reward</hint>
    <hint>Sophisticated</hint>
    <hint>Impress others</hint>
    <hint>Socialize</hint>
</consequence-hints>
<attribute-hints>
    <hint>Carbonation</hint>
    <hint>Crisp</hint>
    <hint>Expensive</hint>
    <hint>Late</hint>
    <hint>Bottle shape</hint>
    <hint>Less alcohol</hint>
    <hint>Smaller</hint>
</attribute-hints>
```

Figure 34:
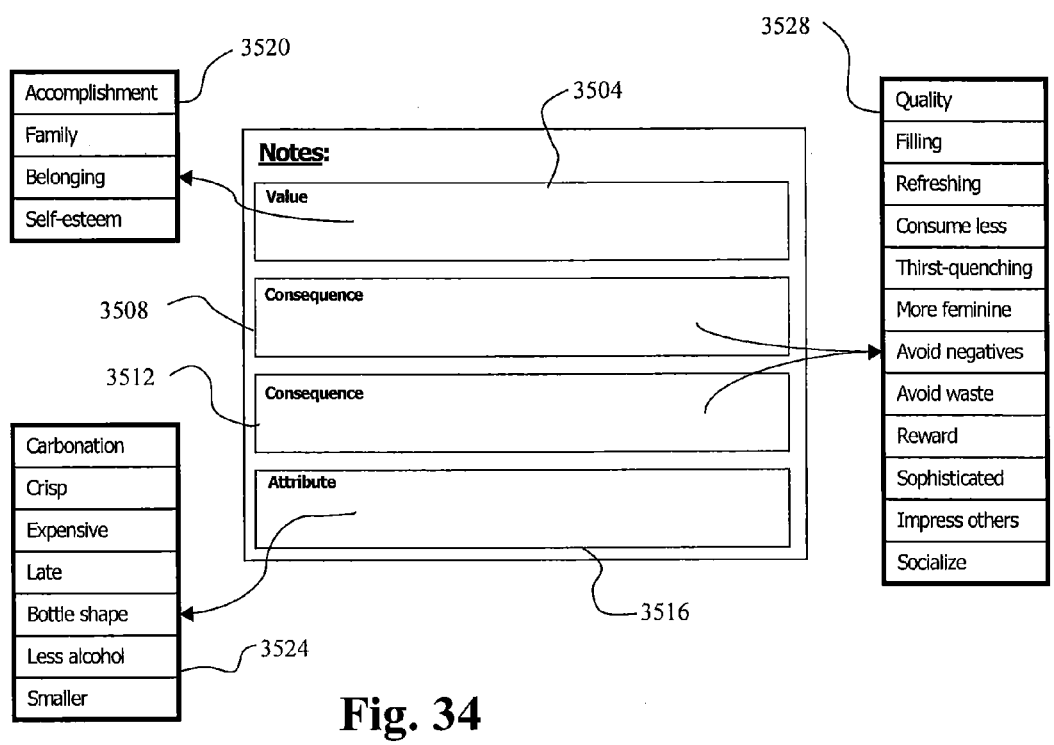
FIG. 34 shows another user interface popup menu available to the interviewer, wherein the menus of this figure assist the interviewer in obtaining laddering interview data from the interviewee.

Representative examples of the pop-up menus for hints are shown in FIG. 34 (i.e., menu 3520 for values, menu 3524 for both functional and psychosocial consequences, and menu 3528 for attributes). Note, the hints shown are for an interview about a particular brand of wine.

Question Types for Various Interviews

FIGS. 35A through 35C provide descriptions about the types of interview questions that the present invention supports.

XML Interview Files

In at least some embodiments of the invention, each interview may be predefined in an interview definition file. In order to interpret such interview definition files (also denoted as an Interview Definition XML (IDefML) files herein), an XML grammar has been defined for specifying the structure of each IDefML file. "Interview_Definition_XML_ (IDefML)_Schema.txt" of the Computer Program Listing Appendix provides a description of an embodiment of an IDefML grammar.

Additionally, each IDefMS identifies the resources (e.g., movies, animations, pictures, stored audio, etc.) needed for conducting the corresponding interviews. Both the interviewer and respondent applications load this file. It contains default display presentation (i.e., slide) mechanics for all of the different interview question types. It also can contain custom developed slides that are called out for specific topics in the Interview Definition File.

The Flash Interview Resource file is usually specific to a particular interview definition (though the generic default one may be used where no custom presentations/slides are specified). As with the IDefML file, the path to the Flash Interview Resource file is specified to the interviewer and respondent applications at runtime. "Interview_Results_XML_ (IResML)_Schema.txt" of the Computer Program Listing Appendix provides a description of an embodiment of the IDefML grammar.

XML Interview Definition File

An XML grammar has been defined to use in the file that specifies the overall structure on an interview. This Interview Definition XML (IDefML) file is used, along with a Flash Interview Resource file, to completely define a StrEAMInterview interview.

There are two sections in an IDefML file, a header and the topics.

IDefML File Header

```
<interview-definition>
    <header>
        <interview-id> ... </interview-id>
        <interview-title> ... </interview-title>
        <interview-name> ... </interview-name>
        <interview-description> ... </interview-description>
        <interview-author> ... </interview-author>
    </header>
    ...
</interview-definition>
```

IDefML Topics

After the header section come the actual interview topics. There can be any number of topics, and they will be performed in StrEAMInterview in the order defined in the IDefML topic section. These topics consist of either interview questions or information only displays. All are contained within a <topics> element.

```
<interview-definition>
    ...
    <topics>
    ...
    </topics>
</interview-definition>
```

Each of the supported topic elements is described below.

Information Topics

There are three (3) information-only topics. All they do is display something. There are no questions being asked or results being recorded.
    <opening-information>
    can have one resource attribute
    must have one <display-text> element
    can have 0 or more <interview-text> elements
    can have 0 or 1<interviewer-hints> element
    <general-information>
    can have one resource attribute
    must have one <display-text> element
    can have 0 or more <interview-text> element
    can have 0 or 1<interviewer-hints> element
    <closing-information>
    can have one resource attribute
    must have one <display-text> element
    can have 0 or more <interview-text> element
    can have 0 or 1<interviewer-hints> element Question Topics In one embodiment, there are a total of fifteen (15) question topic elements supported in IDefML. However, it is within the scope of the invention for embodiments to have a greater or smaller number question topic elements supported. Note that many of these are identical in form currently with the only distinction being the question's purpose. However we will keep these as separate element types for clarity and in anticipation of question type specific structuring that might be possible in the future.

The supported question topics are:
  <consideration-question>
  <expectation-question>
  <general-question>
  <image-question>
  <ladder-question>
  <minus-equity-rating>
  <minus-equity-trend>
  <occasion-question>
  <plus-equity-rating>
  <plus-equity-trend>
  <purchase-question>
  <rating-scale>
  <trend-scale>
  <usage-question>
  <valence-question>
  <chip-allocation>
  <radio-question>

Each of these question types is described below. They are grouped into six (6) categories according to their structure and typical usage.

Simple Questions

These are the simplest forms of questions. There is just some simple display and then (for now) unstructured results. Note that they could all be one kind of question.
    <general-question>
    must have an id attribute
    can have one resource attribute
    must have one <display-text> element
    can have 0 or more <interview-text> elements
    can have 0 or 1<interviewer-hints> element
    <expectation-question>
    must have an id attribute
    can have one resource attribute
    must have one <display-text> element
    can have 0 or more <interview-text> elements
    can have 0 or I<interviewer-hints> element
    <usage-question>
    must have an id attribute
    can have one resource attribute
    must have one <display-text> element
    can have 0 or more <interview-text> elements
    can have 0 or 1<interviewer-hints> element
    <purchase-question>
    must have an id attribute
    can have one resource attribute
    must have one <display-text> element
    can have 0 or more <interview-text> elements
    can have 0 or 1<interviewer-hints> element Interactive Scale Questions These two are the animated "scale" type of question/displays. Each involves a "smart" display area that the users can interact with. Others are possible here like ranking and chip allocation.
    <rating-scale>
    must have an id attribute
    can have one resource attribute
    must have one <display-text> element
    can have 0 or more <interview-text> elements
    can have 0 or 1<interviewer-hints> element
    can be referenced by id (supplies rating)
    <trend-scale>
    must have an id attribute
    can have one resource attribute
    must have one <display-text> element
    can have 0 or more <interview-text> elements
    can have 0 or 1<interviewer-hints> element
    can be referenced by id (supplies trend)

Explicit Questions

These are questions for obtaining laddering responses from a respondent. Note that there must be at least one line of <interview-text> because the display is likely to just show a previous prompt. Note also that the question(s) may be skipped if the rating/trend chosen by the respondent is a boundary value that renders one of the equity-type (+Equity or –Equity) questions nonsensical.

<plus-equity-rating>
    must have an id attribute
    can have one resource attribute
    must have a reference attribute with the id of a <rating-scale>. That allows $(rating)$ & $(rating-1)$ token values to be used from the reference.
    must have one <display-text> element
    must have one or more <interview-text> elements
    can have 0 or 1<interviewer-hints> element
    can have 0 or 1<value-hints> element
    can have 0 or 1<consequence-hints> element
    can have 0 or 1<attribute-hints> element
    <plus-equity-trend>
    must have an id attribute
    can have one resource attribute
    must have a reference attribute with the id of a <trend-scale>. That allows $(trend)$ & $(trend+1)$ token values to be used from the reference.
    must have one <display-text> element
    must have one or more <interview-text> elements
    can have 0 or 1<interviewer-hints> element
    can have 0 or I<value-hints> element
    can have 0 or 1<consequence-hints> element
    can have 0 or 1<attribute-hints> element
    <minus-equity-rating>
    must have an id attribute
    can have one resource attribute
    must have a reference attribute with the id of a <rating-scale>. That allows $(rating)$ & $(rating-1)$ token values to be used from the reference.
    must have one <display-text> element
    must have one or more <interview-text> elements
    can have 0 or 1<interviewer-hints> element
    can have 0 or I<value-hints> element
    can have 0 or 1<consequence-hints> element
    can have 0 or 1<attribute-hints> element
    <minus-equity-trend>
    must have an id attribute
    can have one resource attribute
    must have a reference attribute with the id of a <trend-scale>. That allows $(trend)$ & $(trend+1)$ token values to be used from the reference.
    must have one <display-text> element
    must have one or more <interview-text> elements
    can have 0 or 1<interviewer-hints> element
    can have 0 or 1<value-hints> element
    can have 0 or 1<consequence-hints> element
    can have 0 or I<attribute-hints> element Ladder/Chute Questions This is a question for producing a ladder, but without the explicit On-The-Margin view of a scale as the items above. So this can be a simple question. However, it is also capable of operating on a set of inputs, iterating through the members of those sets to do a ladder for each.

<ladder-question>
    must have an id attribute
    can have one resource attribute
    can have a reference attribute with the id of a set generation topic. This allows the use of the $(reference)$ token representing an answer from the reference topic.
    can have an answer2 attribute with the id of a set elaboration topic. This allows the use of the $(answer2)$ token representing an answer from the referenced set elaboration topic.
    can have an answer3 attribute with the id of a set elaboration topic. This allows the use of the $(answer3)$ token representing an answer from the referenced set elaboration topic.
    can have an answer4 attribute with the id of a set elaboration topic. This allows the use of the $(answer4)$ token representing an answer from the referenced set elaboration topic.
    can have an answer5 attribute with the id of a set elaboration topic. This allows the use of the $(answer5)$ token representing an answer from the referenced set elaboration topic.
    must have one <display-text> element
    can have 0 or more <interview-text> element
    can have 0 or 1<interviewer-hints> element
    can have 0 or 1<value-hints> element
    can have 0 or 1<consequence-hints> element
    can have 0 or 1<attribute-hints> element Set Generation Questions These questions have the ability to produce a "set" of answers. The number of answers will need to be constrained (perhaps with an attribute in the IDefML like limit="5"). Note also that the interviewer may be provided with a way of editing the raw responses (so they will fit, grammatically, in later use).

<occasion-question>
    must have an id attribute
    can have one resource attribute
    must have one <display-text> element
    can have 0 or more <interview-text> elements
    can have 0 or more <set-include> elements
    can have 0 or I<interviewer-hints> element
    <consideration-question>
    must have an id attribute
    can have one resource attribute
    must have one <display-text> element
    can have 0 or more <interview-text> elements
    can have 0 or more <set-include> elements
    can have 0 or 1<interviewer-hints> element Set Elaboration Questions These next questions have the ability to operate on a set of answers and for each, add yet another (column) of information/response. Note that the <valence-question> could be considered another category, because it will have some animation smarts (clicking positive or negative). But I left it here.

<image-question>
    must have an id attribute
    can have one resource attribute
    can have a reference attribute with the id of a set generation topic. This allows the use of the $(reference)$ token representing an answer from the reference topic.
    can have an answer2 attribute with the id of another set elaboration topic. This allows the use of the $(answer2)$ token representing an answer from the referenced set elaboration topic.

can have an answer3 attribute with the id of another set elaboration topic. This allows the use of the $(answer3)$ token representing an answer from the referenced set elaboration topic.
can have an answer4 attribute with the id of another set elaboration topic. This allows the use of the $(answer4)$ token representing an answer from the referenced set elaboration topic.
can have an answer5 attribute with the id of another set elaboration topic. This allows the use of the $(answer5)$ token representing an answer from the referenced set elaboration topic.
must have one <display-text> element
can have 0 or more <interview-text> element
can have 0 or I<interviewer-hints> element
<valence-question>
must have an id attribute
can have one resource attribute
can have a reference attribute with the id of a set generation topic. This allows the use of the $(reference)$ token representing an answer from the reference topic.
can have an answer2 attribute with the id of another set elaboration topic. This allows the use of the $(answer2)$ token representing an answer from the referenced set elaboration topic.
can have an answer3 attribute with the id of another set elaboration topic. This allows the use of the $(answer3)$ token representing an answer from the referenced set elaboration topic.
can have an answer4 attribute with the id of another set elaboration topic. This allows the use of the $(answer4)$ token representing an answer from the referenced set elaboration topic.
can have an answer5 attribute with the id of another set elaboration topic. This allows the use of the $(answer5)$ token representing an answer from the referenced set elaboration topic.
must have one <display-text> element
can have 0 or more <interview-text> element
can have 0 or I<interviewer-hints> element StrEAMInterview Examples Below are several examples of questioning that come directly from the StrEAM methodology of the present invention. With each example is a sample of the IDefML that may be used to define the interview. Note that all of these examples can use the default Flash Interview Resources, so no custom resources are specified in the IDefML for any of these examples.

Resort Example

Regarding the resort marketing example scenario described hereinabove, the following questions and the corresponding IDefMS interview file are as follows.

| | |
|---|---|
| EXPECTATION | Why did you initially join the club? |
| USAGE | In an average week in the summer, about how much do you utilize each of the club's facilities |
| RATING-SCALE (1-9) | Overall, how satisfied are you with the club? |
| PLUS-EQUITY (LADDER) | What is the single most important aspect of that club that is the basis for you to rate satisfaction the way you did? More specifically, what is the one thing that caused you to rate it X and not X – 1? |
| MINUS-EQUITY (LADDER) | What is the single most important change the club could make to increase your satisfaction level one point? |

```
<interview-definition>
    <header>
        <interview-id>SAMPLE001</interview-id>
        <interview-title>Teton Resort</interview-title>
        <interview-name>Teton Resort Satisfaction and Loyalty
        Research Interview</interview-name>
        <interview-description>
            Determine what areas the Teton Resort should focus on
            to create more loyalty with membership,
            thereby minimizing the likelihood of switching.
        </interview-description>
        <interview-author>TomG</interview-author>
    </header>
    <topics>
        <opening-information>
            <display-text>Welcome</display-text>
        </opening-information>
        <general-information>
            <display-text>Thanks for participating in this
            discussion.</display-text>
        </general-information>
        <expectation-question id="joining-expectation">
            <display-text>Why did you initially join the
            club?</display-text>
        </expectation-question>
        <usage-question id="summer-usage">
            <display-text>
                In an average week in the summer about how
                much do you utilize each of the club's
                facilities?
            </display-text>
        </usage-question>
        <rating-scale id="overall-satisfaction">
            <display-text>Overall, how satisfied are you with the
            club?</display-text>
        </rating-scale>
        <plus-equity id="plus-equity" type="rating"
        reference="overall-satisfaction">
            <display-text>Overall, how satisfied are you with the
            club?</display-text>
            <interview-text>
                What is the single most important aspect of the
                club that is the basis for you to rate
                satisfaction the way you did?
            </interview-text>
            <interview-text>
                More specifically, what is the one thing that
                caused you to rate it $(rating)$ and
                not $(rating–1)$?
            </interview-text>
        </plus-equity>
        <minus-equity id="minus-equity" type="rating"
        reference="overall-satisfaction">
            <display-text>Overall, how satisfied are you with the
            club?</display-text>
            <interview-text>
                What is the single most important change the club
                could make to increase your
                satisfaction level one point? (From $(rating)$
                to $(rating+1)$)?
            </interview-text>
        </minus-equity>
        <closing-information>
            <display-text>Thank You</display-text>
        </closing-information>
    </topics>
</interview-definition>
```

Museum Example

Regarding the museum marketing example scenario described hereinabove, the following questions and the corresponding IDefMS interview file are as follows.

| | |
|---|---|
| EXPECTATION | Why did you initially join the museum's Circle of Friends? |
| USAGE | Last year about how many museum activities and events did you attend? |
| TREND-SCALE | Over the past year, to what degree has your participation level in the activities at the museum changed? |
| TREND-SCALE | Next year, what do you anticipate will be the change in your level of participation in museum activities? |
| PLUS-EQUITY (LADDER) | What is the most important reason for your participation in museum activities? |
| MINUS-EQUITY (LADDER) | What is the most important single change you would like to see in the activities offered by the museum that would result in your increased participation? |
| GENERAL | How do you learn about the offerings, events, and activities of the museum? |

```
<interview-session>
    <header>
        <interview-id>SAMPLE002</interview-id>
        <interview-title>City Museum</interview-title>
        <interview-name>City Museum Circle of Friends Attitude
            Interview</interview-name>
        <interview-description>
            Determine what areas the City Museum should focus on
            to create a more active
            Circle of Friends organization.
        </interview-description>
        <interview-author>TomG</interview-author>
    </header>
    <topics>
        <opening-information>
            <display-text>Welcome</display-text>
        </opening-information>
        <general-information>
            <display-text>
                As a member of the museum's Circle of Friends your
                thoughts are greatly appreciated.
            </display-text>
        </general-information>
        <expectation-question id="joining-expectation">
            <display-text>Why did you initially join the museum's
                Circle of Friends?</display-text>
        </expectation-question>
        <usage-question id="past-year-usage">
            <display-text>
                Last year, about how many museum activities and
                events did you attend?
            </display-text>
        </usage-question>
        <trend-scale id="past-year-trend">
            <display-text>
                Over the past year, to what degree has your
                participation level in the activities
                at the museum changed?
            </display-text>
        </trend-scale>
        <trend-scale id="next-year-trend">
            <display-text>
                Next year, what do you anticipate will be the
                change in your level of participation
                in museum activities?
            </display-text>
        </trend-scale>
        <ladder-question id="participation-reason">
            <display-text>
                What is the most important reason for your
                participation in museum activities?
            </display-text>
        </ladder-question>
        <ladder-question id="desired-change">
            <display-text>
                What is the most important single change you would
                like to see in the activities offered
                by the museum that would result in your increased
                participation?
            </display-text>
        </ladder-question>
        <general-question id="communication-means">
            <display-text>
                How do you learn about the offerings, events, and
                activities of the museum?
            </display-text>
        </general-question>
        <closing-information>
            <display-text>Thank You</display-text>
        </closing-information>
    </topics>
</interview-definition>
```

Healthcare Example

Regarding the healthcare marketing example scenario described hereinabove, the following questions and the corresponding IDefMS interview file are as follows.

| | |
|---|---|
| RATING SCALE (1-9) | How would you rate your overall treatment in the hospital on the following 1-9 scale? |
| PLUS-EQUITY (LADDER) | What was the primary reason you rated your overall treatment as highly as you did on the scale? (That is, why X and not X − 1?) |
| MINUS-EQUITY (LADDER) | What was the primary reason you did not rate the treatment you received higher on the scale? (That is, why X and not X + 1?) |

```
<interview-definition>
    <header>
        <interview-id>SAMPLE003</interview-id>
        <interview-title>Mercy Union Hospital</interview-title>
        <interview-name>Mercy Union Hospital Satisfaction Tracking
            Study</interview-name>
        <interview-description>
            Determine the key satisfaction related issues that
            drive decisions about using Mercy Union
            Hospital services so that a Satisfaction Barometer can
            be designed.
        </interview-description>
        <interview-author>TomG</interview-author>
    </header>
    <topics>
        <opening-information>
            <display-text>Welcome</display-text>
        </opening-information>
        <general-information>
            <display-text>
                Thanks for your time to help us evaluate your
                experience with Mercy Union Hospital.
            </display-text>
        </general-information>
        <rating-scale id="treatment-rating">
            <display-text>
                How would you rate your overall treatment in the
                hospital on the following 1-9 scale?
```

```
            </display-text>
        </rating-scale>
        <plus-equity id="plus-equity" type="rating" reference=
        "treatment-rating">
            <display-text>
                How would you rate your overall treatment in the
                hospital on the following 1-9 scale?
            </display-text>
            <interview-text>
                What was the primary reason you rated your
                overall treatment as highly as you did on the
                scale? (That is, why $(rating)$ and not $(rating−
                1)$?)
            </interview-text>
        </plus-equity>
        <minus-equity id="minus-equity" type="rating"
        reference="treatment-rating">
            <display-text>
                How would you rate your overall treatment in the
                hospital on the following 1-9 scale?
            </display-text>
            <interview-text>
                What was the primary reason you did not rate the
                treatment you received higher on the
                scale? (That is, why $(rating)$ and not $(rating+
                1)$?)
            </interview-text>
        </minus-equity>
        <closing-information>
            <display-text>Thank You</display-text>
        </closing-information>
    </topics>
</interview-definition>
```

Direct Selling Example

Regarding the direct selling example scenario described hereinabove, the following questions and the corresponding IDefMS interview file are as follows.

| | |
|---|---|
| EXPECTATIONS | Why did you join? |
| PLUS-EQUITY (LADDER) | What are the most positive aspects of being a sales associate? What is the most important aspect (choice criteria)? |
| MINUS-EQUITY (LADDER) | What are the most negative aspects of being a sales associate? What is the most negative aspect (choice criteria)? |

```
<interview-definition>
    <header>
        <interview-id>SAMPLE004</interview-id>
        <interview-title>ACME Corporation Sales</interview-title>
        <interview-name>ACME Corporation Sales Force
        Study</interview-name>
        <interview-description>
            Determine the key issues affecting sales force turnover
            at the ACME Corporation
        </interview-description>
        <interview-author>TomG</interview-author>
    </header>
    <topics>
        <opening-information>
            <display-text>Welcome</display-text>
        </opening-information>
        <expectation-question id="why-join">
            <display-text>Why did you join the ACME Sales
            team?</display-text>
        </expectation-question>
        <general-question id="positive-aspects">
```

```
            <display-text>
                What are the most positive aspects of being an
                ACME sales associate?
            </display-text>
        </general-question>
        <ladder-question id="positive-ladder">
            <display-text>What is the most positive aspect (choice
            criteria)?</display-text>
        </ladder-question>
        <general-question id="negative-aspects">
            <display-text>
                What are the most negative aspects of being an
                ACME sales associate?
            </display-text>
        </general-question>
        <ladder-question id="negative-ladder">
            <display-text>What is the most negative aspect (choice
            criteria)?</display-text>
        </ladder-question>
        <closing-information>
            <display-text>Thank You</display-text>
        </closing-information>
    </topics>
</interview-definition>
```

Automobile Example

Regarding the automobile marketing example described hereinabove, the following questions and the corresponding IDefMS interview file follow. Note that the automobile example hereinabove explicitly has this notion of a 'SET' (in this case a 'CONSIDERATION' list).

| | |
|---|---|
| PURCHASE | What car did you buy last? |
| CONSIDERATION-SET | What other cars did you actively consider prior to purchasing your last car? |
| <for each "Car Brand" in list, and any others of interest> | |
| TOP-OF-MIND | What comes to mind when you think of "Car Brand"? |
| <next> | |
| <for each "Car Brand" & "Image" in list> | |
| VALENCE | Is "Image" for "Car Brand" a positive (+) or negative (−) to you? |
| <next> | |
| <for each "Car Brand" & "Image" & "Valence" in list> | |
| CHUTE | Why? |
| <next> | |

```
<interview-definition>
    <header>
        <interview-id>SAMPLE006</interview-id>
        <interview-title>Rambler Motors Inc.</interview-title>
        <interview-name>Rambler Motors Brand Attitude
        Study</interview-name>
        <interview-description>
            Determine the key factors that car buyers are
            considering and how their perspective of
            Rambler regarding those factors.
        </interview-description>
        <interview-author>TomG</interview-author>
    </header>
    <topics>
        <opening-information>
            <display-text>Welcome</display-text>
        </opening-information>
        <purchase-question id="last-car-purchased">
            <display-text>What car did you buy last?</display-text>
        </purchase-question>
        <consideration-question id="brand-considered"
        set-producer="true" set-maximum="10">
```

-continued

```
            <display-text>
                What other cars did you actively consider prior to
                purchasing your last car?
            </display-text>
            <set-include>Rambler</set-include>
        </consideration-question>
        <image-question id="brand-image" set-producer="true"
set-user="true" set1="brand-considered">
            <display-text>What comes to mind when you think of
                $(set1)$?</display-text>
        </image-question>
        <valence-question id="image-valence" set-producer="true"
set-user="true"
                    set1 ="brand-considered" set2="brand-image">
            <display-text>Is $(set2)$ for $(set1)$ a positive or
                negative for you?</display-text>
        </valence-question>
        <ladder-question  id="brand-image-equity" set-user="true"
                    set1="brand-considered" set2="brand-image"
                    set3="image-valence">
            <display-text>
                You said that $(set2)$ for $(set1)$ is a $(set3)$
                for you. Why is that?
            </display-text>
        </ladder-question>
        <closing-information>
            <display-text>Thank You</display-text>
        </closing-information>
    </topics>
</interview-definition>
```

Wine Cooler Example

An analysis of interview data related to the purchasing of various brands of wine coolers according to the present invention is provided below. Immediately following are questions for corresponding interviews and the related IDefMS interview file.

| | |
|---|---|
| OCCASION-SET | What are several occasions where you are most likely to have a wine cooler. |
| <for each "Occasion" in list> | |
| PLUS-EQUITY (LADDER) | Why would you choose to have a wine cooler on "Occasion"? |
| <next> | |

```
<interview-definition>
    <header>
        <interview-id>SAMPLE005</interview-id>
        <interview-title>Mad Dog 5050</interview-title>
        <interview-name>Mad Dog 5050 Wine Cooler
Preference</interview-name>
        <interview-description>
            Determine what areas the Mad Dog 5050 Wine Company
            should focus on to create a strong
            brand in the wine cooler market.
        </interview-description>
        <interview-author>TomG</interview-author>
    </header>
    <topics>
        <opening-information>
            <display-text>Welcome</display-text>
        </opening-information>
        <general-information>
            <display-text>Thanks for participating.</display-text>
        </general-information>
        <usage-question id="usage-rate">
            <display-text>How often do you consume a wine
                cooler?</display-text>
```

-continued

```
        </usage-question>
        <occasion-question id="use-occasions" set-producer="true"
set-maximum="5">
            <display-text>What are the most likely occasions for you
                to have a wine cooler?</display-text>
        </occasion-question>
        <ladder-question id="choice-ladder" set-user="true"
set1="use-occasions">
            <display-text>Why would you choose to have a wine
                cooler $(set1)$?</display-text>
        </ladder-question>
        <closing-information>
            <display-text>Thank You</display-text>
        </closing-information>
    </topics>
</interview-definition>
```

Wine Cooler Example with Hints

The following IDefMS interview file is for the same wine cooler interview definition as described above. However, the file now provides some helpful "Hints" to aid the interviewer.

```
<interview-definition>
    <header>
        <interview-id>SAMPLE005</interview-id>
        <interview-title>Mad Dog 5050</interview-title>
        <interview-name>Mad Dog 5050 Wine Cooler
Preference</interview-name>
        <interview-description>
            Determine what areas the Mad Dog 5050 Wine Company
            should focus on to create a strong
            brand in the wine cooler market.
        </interview-description>
        <interview-author>TomG</interview-author>
    </header>
    <topics>
        <opening-information>
            <display-text>Welcome</display-text>
        </opening-information>
        <general-information>
            <display-text>Thanks for participating.</display-text>
        </general-information>
        <usage-question id="usage-rate">
            <display-text>How often do you consume a wine
                cooler?</display-text>
        </usage-question>
        <occasion-question id="use-occasions" set-producer="true"
set-maximum="5">
            <display-text>What are the most likely occasions for
                you to have a wine cooler?</display-text>
        </occasion-question>
        <ladder-question id="choice-ladder" set-user="true"
set1="use-occasions">
            <display-text>Why would you choose to have a wine cooler
                $(set1)$?</display-text>
            <interviewer-hints>
                <hint>Why is this important to you?</hint>
                <hint>How does this help you out?</hint>
                <hint>What do you get from that?</hint>
                <hint>Why do you want that?</hint>
                <hint>What happens to you as a result of
                    that?</hint>
                <hint>How does that make you feel?</hint>
            </interviewer-hints>
            <ladder-hints>
                <values>
                    <hint>Accomplishment</hint>
                    <hint>Family</hint>
                    <hint>Belonging</hint>
                    <hint>Self-esteem</hint>
```

-continued

```
        </values>
        <consequences>
            <hint>Quality</hint>
            <hint>Filling</hint>
            <hint>Refreshing</hint>
            <hint>Consume less</hint>
            <hint>Thirst quenching</hint>
            <hint>More feminine</hint>
            <hint>Reward</hint>
            <hint>Sophisticated</hint>
            <hint>Impress others</hint>
            <hint>Socialize</hint>
        </consequences>
        <attributes>
            <hint>Carbonation</hint>
            <hint>Crisp</hint>
            <hint>Expensive</hint>
            <hint>Late</hint>
            <hint>Bottle shape</hint>
            <hint>Less alcohol</hint>
            <hint>Smaller</hint>
        </attributes>
      </ladder-hints>
    </ladder-question>
    <closing-information>
        <display-text>Thank You</display-text>
    </closing-information>
  </topics>
</interview-definition>
``` will use the "goToAndPlay(label)" directive in order to invoke one of these resources. Those frames can contain any combination of graphics and actionscript. Multiple frames can be used if desired so long as the resource concludes with a "stop( )". For very complex effects, a resource may in turn load and play other movies, though no application of such complexity is anticipated at this time.

It should be noted that the use of Flash Interview Resources must be done with attention paid to the parameters and behaviors expected for the interview topic it is being used in. For instance, it is possible to create a custom resource to use in the context of a <rating-scale> topic. That resource, however, must be prepared to deliver and accept a rating value and should be able to properly handle an on-the-margin animation. It is possible that input parameters can be ignored by the custom resource, but the StrEAMInterview application may not function properly if the custom resource does not provide output parameters expected by the usage context.

Default Interview Resources

As implied above, it is possible to define an interview that makes no explicit references to Flash Interview Resources. This is because the basic behavior is provided by a set of default interview resources that will always be available in the Flash Interview Resource file. These resources support the default functionality of all of the current interview topic types. The default resources are as follows:

| Resource Name | Interactive? | Purpose/Description |
| --- | --- | --- |
| defaultDisplaySlide | No | Global variables (parameters) used: _global.displayAreaText - a string |
| defaultBlankSlide | No | Global variables (parameters) used: <none> |
| defaultRatingSlide | Yes | Global variables (parameters) used: _global.displayAreaText - a string _global.currentScale - object |
| defaultTrendSlide | Yes | Global variables (parameters) used: _global.displayAreaText - a string _global.currentScale - object |
| defaultValenceSlide | Yes | Global variables (parameters) used: _global.displayAreaText - string _global.currentScale - object |
| defaultPreferenceSlide | Yes | Global variables (parameters) used: _global.displayAreaText - string _global.preferenceScale - object |
| defaultChipAllocationSlide | Yes | Global variables (parameters) used: _global.displayAreaText - a string _global.chipAllocation - object |
| DefaultRadioQuestionSlide | Yes | Global variables (parameters) used: _global.displayAreaText - a string _global.radioQuestion - object |

Flash Interview Resource File

As described hereinabove, the interview resource file contains resources for conducting the interview. Both the Interviewer and Respondent applications load it. It contains default "slide" mechanics for all of the different topic types. It also can contain custom developed slides that are called out for specific topics in the Interview Definition File.

The Flash Interview Resource file is usually specific to a particular interview definition (though the generic default one could be used where no custom slides are present). As with the IDefML file, the path to the Flash Interview Resource file is specified to the StrEAMInterview applications at runtime.

The resources in a Flash Interview Resource file are actually labeled "frames". The StrEAMInterview applications Custom Interview Resources Custom variations of the display slides may be created, typically to provide richer graphics for the display area. Slides can be defined with different and more complex text formatting than provided by the default mechanisms. Or they may be built to display more advanced graphics as part of the stimuli for an interview. This includes the delivery of full Flash movies and/or video.

If a custom resource is to be used in a context expecting some form of animation, care must be taken to make sure that the custom resources comply with the input/output requirements. Generally it is best to start with a copy of the applicable default resource and customize from there.

Interview Results

An Interview Results XML (IResML) file records the results of each unique individual interview session between an Interviewer and Respondent. It will be uniquely named by according to the Session ID it is recorded for.

IResML files are organized into three sections: a header, the body of results, and a footer. Each of these is described in detail below. All of it is contained within an <interview-session> element. Note that there are also special annotation elements that may appear anywhere within the body of an IResML file.

IResML File Header

The IResML header section is composed of information from the Interview Definition XML file (IDefML) and from the specific interview session itself. This header captures all of the information about the interview session. Note that some of this information is redundant (repeated in each IResML file), but the philosophy here is to make the IResML files stand-alone.

There is only one header section in an IResML file. It is generated when the interview session starts and consists of the following elements.

```
<interview-session>
    <header>
        <interview-id> ... </interview-id>
        <interview-title> ... </interview-title>
        <interview-name> ... </interview-name>
        <interview-description> ... </interview-description>
        <interview-author> ... </interview-author>
        <session-id> ... </session-id>
        <session-start-date> ... </session-start-date>
        <session-start-time> ... </session-start-time>
        <interviewer-id> ... </interviewer-id>
        <interviewer-screen-name> ... </interviewer-screen-name>
        <interviewer-ip-address> ... </interviewer-ip-address>
        <respondent-id> ... </respondent-id>
        <respondent-screen-name> ... </respondent-screen-name>
        <respondent-ip-address> ... </respondent-ip-address>
        <definition-filename> ... </definition-filename>
        <resource-filename> ... </resource-filename>
    </header>
    ...
</interview-session>
```

The first five (5) elements (interview-id, title, name, description, and author) all come from the actual IDefML file controlling the interview. The rest of the header information comes from the actual instance of the interview session itself.

IResML File Footer

The footer section of an IResML file contains wrap-up information about the interview session itself. Some of this is information in anticipation of a pause/restart capability down the road. There is only one footer section in an IResML file. It gets generated when the interview session concludes. It consists of the following information:

```
<interview-session>
    ...
    <footer>
        <termination-status> ... </termination-status>
        <last-question> ... </last-question>
        <session-end-date> ... </session-end-date>
        <session-end-time> ... </session-end-time>
        <session-duration> ... </session-duration>
    </footer>
</interview-session>
```

IResML Question Responses

Of course, the most important contents of any result file will be the responses to questions. The responses in an IResML file will be contained within a  section in that file. The response(s) to each question are then contained in <question-answer> elements, one for each question topic in the interview. The attributes of the <question-answer> element will identify the question (using the <question-id> from the IDefML), and whether to expect multiple responses (in the case of a "set").

```

<question-answer id="question-id" set="true" or "false">
        ...
    </question-answer>
    <question-answer id="question-id" set="true" or "false">
        ...
    </question-answer>
    ...

```

Thus, there are different response types for each type of question as defined in the IDefML file.

There are a total of thirteen (13) different possible response types to go with the currently defined question (topic) types. These break down into three (3) basic categories of result types:

1. Simple Response Topics
2. Interactive Choice Topics
3. Ladder/Chute Topics

Simple Response Topics

These each have a response that is a simple text string, and so they are grouped together. Note that in some cases they may be "set" types of questions, and, if not using some other response set as input, will have the same question text recorded for each response. However, the only other way to handle that cleanly would be to have set-producer questions that are not set-users (and therefore will always have the same question) be treated as a different kind of response type.

There are seven (7) response elements in this category, each corresponding to a question topic of the same type:
    <general-response>
    <expectation-response>
    <usage-response>
    <purchase-response>
    <occasion-response>
    <consideration-response>
    <image-response>

Each of these elements has the same structure. The structure for a single response and a multiple (set) response is as follows:

```

<question-answer id="question-id-1" set="false">
        <general-response>
            <question> ... </question>
            <response> ... </response>
        </general-response>
    </question-answer>
    <question-answer id="question-id-2" set="true">
        <image-response>
            <question> ... </question>
            <response> ... </response>
        </image-response>
        <image-response>
            <question> ... </question>
```

-continued

```
        <response> ... </response>
    </image-response>
    ...
    </question-answer>
...

```

Interactive Choice Topics

Each of these question topics will generate a response that is constrained to some set of values by virtue of the fact that it is asked through an interactive component. This includes scale, trend, and valence questions:

<rating-response>

<trend-response>

<valence-response>

Each of the responses is structured in the same way as above insofar as there is a <question> element and a <response> element. The only difference is that the <response> element values are constrained as follows:

```
<rating-response>
    <result> can be "1", "2", "3", "4", "5", "6", "7", "8", or "9"
<trend-response>
    <result> can be "--", "-", "=", "+", or "++"
<valence-response>
    <result> can be "positive" or "negative"
```

Note also that even though the current rating slide mechanism is hardwired to produce choices on a 1-9 scale only, this might be made more general. An example is:

<rating-response min="1" max="9">

Ladder/Chute Questions

One of the main purposes of any interview is the production of one or more "ladders". There may be three (3) types of question topics that result in a ladder response:

<plus-equity-response>

<minus-equity-response>

<ladder-response>

Each of these will then have the same response structure, as follows:

```

<question-answer id="question-id-1" set="false">
        <plus-equity-response>
            <question> ... </question>
            <value-level> ... </value-level>
            <consequence-level> ... </consequence-level>
            <consequence-level> ... </consequence-level>
            <attribute-level> ... </attribute-level>
        </plus-equity-response>
    </question-answer>
    <question-answer id="question-id-2" set="false">
        <minus-equity-response>
            <question> ... </question>
            <value-level> ... </value-level>
            <consequence-level> ... </consequence-level>
            <consequence-level> ... </consequence-level>
            <attribute-level> ... </attribute-level>
        </minus-equity-response>
    </question-answer>

```

Or in the case where there is a set of ladders created, something like the following:

```

<question-answer id="question-id-1" set="true">
        <ladder-response>
            <question> ... </question>
            <value-level> ... </value-level>
            <consequence-level> ... </consequence-level>
            <consequence-level> ... </consequence-level>
            <attribute-level> ... </attribute-level>
        </ladder-response>
        <ladder-response>
            <question> ... </question>
            <value-level> ... </value-level>
            <consequence-level> ... </consequence-level>
            <consequence-level> ... </consequence-level>
            <attribute-level> ... </attribute-level>
        </ladder-response>
        ...
    <question-answer>

```

Annotations

The Interviewer can cause the recording of a comment/quote of something interesting at most any time during an interview. This could include the interviewer's own comments or the interviewer's selection of some interesting text from the respondent and recording it.

There would be two (2) types of annotation elements:

<interviewer-comment>

<respondent-comment>

Each of these will be a simple text string.

Interview Administrative Database & Tools

Administration Database

This is a simple MySQL database. It currently consists of five (5) tables:

```
Tables_in_srdainterviewdb
interviewers
interviewsessions
interviewtypes
respondents
statusdefinitions
```

The purpose of this database is to store administrative information about interviews. This includes the definition of interviewers, respondents, and the types of interviews that can be conducted. It also will record information about the lifecycle of an interview session from when it is planned, scheduled, conducted, and completed. Note that there is also a table in which the various potential status codes for interview sessions are defined.

The individual tables are defined as follows:

Interviewers Table

| Field | Type | Null | Key | Default | Extra |
|---|---|---|---|---|---|
| interviewerID | int(10) unsigned | | PRI | NULL | auto_increment |
| interviewerScreenName | varchar(16) | | | | |
| interviewerPassword | varchar(6) | | | | |
| interviewerFullName | varchar(64) | | | | |
| interviewerEmail | varchar(128) | YES | | NULL | |
| interviewerPhone | varchar(16) | YES | | NULL | |
| interviewerDescription | text | YES | | NULL | |

InterviewSessions Table

| Field | Type | Null | Key | Default | Extra |
|---|---|---|---|---|---|
| sessionID | int(10) unsigned | | PRI | NULL | auto_increment |
| interviewID | int(10) unsigned | | | 0 | |
| interviewerID | int(10) unsigned | | | 0 | |
| respondentID | int(10) unsigned | | | 0 | |
| sessionPassword | char(10) | | | | |
| sessionStatus | char(1) | | | | |
| dateScheduled | date | YES | | NULL | |
| timeScheduled | time | YES | | NULL | |
| dateFinished | date | YES | | NULL | |
| timeFinished | time | YES | | NULL | |
| sessionDuration | int(10) unsigned | | | 0 | |
| sessionCount | int(10) unsigned | | | 0 | |
| dateLastStarted | date | YES | | NULL | |
| timeLastStarted | time | YES | | NULL | |
| dateNextResume | date | YES | | NULL | |
| timeLastResume | time | YES | | NULL | |

Interview Types Table

| Field | Type | Null | Key | Default | Extra |
|---|---|---|---|---|---|
| interview ID | int(10) unsigned | | PRI | NULL | auto_increment |
| interviewName | varchar(16) | | | | |
| interviewMovie | varchar(64) | | | | |
| interviewDescription | text | | | | |

Respondents Table

| Field | Type | Null | Key | Default | Extra |
|---|---|---|---|---|---|
| respondentID | int(10) unsigned | | PRI | NULL | auto_increment |
| respondentFullName | varchar(64) | | | | |
| respondentScreenName | varchar(16) | | | | |
| respondentEmail | varchar(128) | YES | | NULL | |
| respondentPhone | varchar(16) | YES | | NULL | |
| respondentDescription | text | YES | | NULL | |

Status Definitions Table

| Field | Type | Null | Key | Default | Extra |
|---|---|---|---|---|---|
| statusCode | char(1) | | PRI | | |
| statusName | varchar(12) | | | | |
| statusDescription | text | YES | | NULL | |

Below is a summary of a couple of utility scripts that are available for development of the Admin Database:

SRDAinitInterviewDB.php

This is a utility script that will create a fresh SRDAinterviewDB.

SRDAloadInterviewDB.php

This is a utility script that will load some test data into SRDAinterviewDB.

Administration Tools

Several PHP scripts are implemented to provide a forms-based interface to maintain the Interview Administrative Database. These are very simple scripts that do some reasonable data checking, but not much else.

At the top is a very simple menu (SRDAmaintenanceMenu.php). This simply provides access to the various administration tools.

There is a set of three (3) scripts for the maintenance of each table. They are named: <tablename> List.php, <tablename> Form.php; and <tablename> Update.php. The List script presents a list of all of the entries in the table with the ability to choose one for further editing. The list may be sorted by any of the columns in the table. The Form script presents a form-based ability to create, display, or modify a row of the table. Data validation is assisted by a Javascript include file (SRDAfieldValidation.js). The actual modifications to the database table are performed by the Update script, given data provided by the other scripts.

Interviewer Table
    SRDAinterviewerList.php
    SRDAinterviewerForm.php
    SRDAinterviewerUpdate.php Respondent Table
    SRDArespondentList.php
    SRDArespondentForm.php
    SRDArespondentUpdate.php Interview Definition Table
    SRDAinterviewTypeList.php
    SRDAinterviewTypeForm.php
    SRDAinterviewTypeUpdate.php Note that the Status Definition table has no maintenance tools because they are static.

Introduction to StrEAMAnalysis Subsystem

Figure 32:
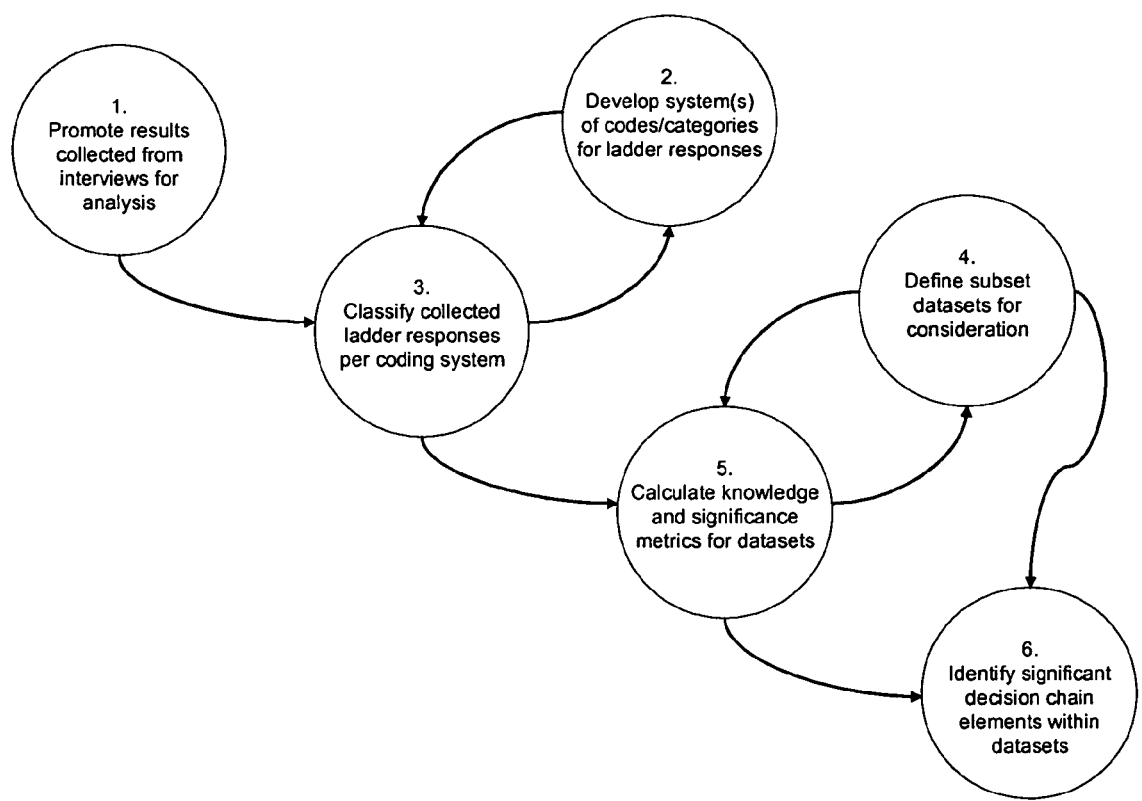
FIG. 32 is a flow diagram showing the high level steps performed by the interview analysis subsystem (also denoted herein as StrEAMAnalysis subsystem).

The StrEAM® Interview Analysis subsystem (StrEAMAnalysis) provides a set of computer-based tools used to manipulate and analyze data collected with the StrEAM® Interactive Interview subsystem (StrEAMInterview). A high level flow diagram of the steps performed by the StrEAMAnalysis subsystem is shown in FIG. 32.

The end purpose of the StrEAMAnalysis subsystem is to use the data gathered by the StrEAMInterview subsystem to discover and identify the important elements of decision-making regarding the object being researched. This is accomplished by developing and applying a meaningful system of codes to the respondent response data collected during the interview process, and in particular to open-ended questions that subsequently allow the laddering techniques to be used. Thus, of particular interest is the categorization and analysis of data collected from "laddering" interview questions. These "ladders" are processed by the StrEAMAnalysis subsystem to yield the key elements involved in decision-making for the topic being investigated.

In addition, the StrEAMAnalysis subsystem makes it possible to examine those decision-making elements in the context of other information collected in a research study. For instance, decision making factors may vary in kind and importance based on demographic data collected along with the ladders themselves. Thus the StrEAMAnalysis subsystem enables a marketing analyst to consider how decision-making elements are affected by examining different subsets of the collected data.

It is an important aspect of the present invention that the process of analyzing StrEAM collected interview data is iterative and exploratory. A StrEAM analyst (i.e., a user of the StrEAMAnalysis subsystem) develops codes, applies them, refines them, reapplies them, and so forth until satisfactory meaningful patterns in the data emerge. Thus, an important characteristic of the StrEAMAnalysis subsystem is its support for iteration, discovery, and exploration by an analyst.

Process Overview

At a high level, the StrEAMAnalysis processes are summarized in FIG. 32.

Each of the processes of FIG. 32, and the computerized tools that support them, are described in the sections that follow.

It is important to note that the StrEAMAnalysis processes are iterative, and while automated, they must provide maximum flexibility for individual analysts and the analysis teams themselves. This flexibility is provided in part by the modular nature of the computerized tools implementing StrEAMAnalysis subsystem, and in part by the distributed and lightweight data structure supporting them.

Terminology

Before describing the details of the StrEAMAnalysis processes, a coherent set of terminology is defined:

| StrEAMAnalysis Term | Definition |
| --- | --- |
| analysis model | a group of StrEAMInterview data assembled together (ladder and non-ladder items) and coded according to an instance of a StrEAM code definition model. |
| code definition model | a series of codes designating categories in which the prose contained in ladder elements will be grouped. Similar concepts are grouped together in an iterative process in order to expose the meaningful patterns in the ladder data. |
| consideration group | it may be of interest for analysis to be performed on the ladders produced by more than one interview question at the same time as a single pool of ladder elements. To support this, groups of questions can be defined and the group given a name. Each group must contain at least one interview question and interview questions can appear in multiple groups. |
| dataset | the set of ladders for a question (or set of questions) contained in the StrEAM database (or alternatively the whole of an operational subset under examination). |
| dataset definition | examination of factors affecting decision making is done by performing StrEAMAnalysis on various subsets of collected interview data based on non-ladder information associated. A dataset definition is a named group of data criteria that is used to selected ladder data to examine. Datasets may be defined and saved on the fly for recall later. Ladder data may appear in multiple datasets since it will typical during the analysis process to examine overlapping datasets. |
| direct connection | a pair of codes that are associated with directly adjacent elements in a ladder sequence. Note that order of the pairs is not significant. |
| indirect connection | a pair of codes that appear in the same ladder sequence (but are not adjacent). Note that the order of the pairs is not significant. |
| knowledge | a metric of the "amount" of data knowledge represented by specific ladder sequence. This is the number of instances in the dataset of the direct and indirect connections defined by that specific ladder sequence. |

| StrEAMAnalysis Term | Definition |
| --- | --- |
| knowledge base | a metric of the total number of instances of connections (direct & indirect) in a StrEAM dataset. |
| ladder element | a quote/comment/statement as one part of a ladder. Each element can be classified as a member of one of four levels (Attribute, Functional Consequence, Psychosocial Consequence, Value), and each element will be categorized with one code. |
| ladder sequence | a series of 4, 5, or 6 ladder elements. |
| seed ladder | a ladder sequence whose occurrence is central enough in the captured dataset to be used to start the StrEAM diagramming, there would be 6-8 of these extracted for a StrEAM dataset. |
| significance | a metric (as a percentage) of the knowledge metric (for an individual ladder sequence or group of sequences) with respect to the total knowledge base of the dataset. |

Supporting Tools

The StrEAMAnalysis subsystem processes are supported by seven (7) primary software programs. These are summarized in the table below. All of the StrEAMAnalysis programs are implemented as client-based applications in order to maximize the graphical user interface assistance to the analyst. They are each implemented as Microsoft Windows® applications (VB.NET). The client-based nature of these programs along with the XML-based, distributed data model (discussed later) also enables disconnected analysis on the part of the StrEAM analyst.

Note that each tool in the table below is linked to its role in the StrEAMAnalysis subsystem by the "Process" column. That indicates the process number, from FIG. 32 above, where the corresponding program is used.

| | StrEAMAnalysis | |
| --- | --- | --- |
| Process | Module | Program Description |
| 1 | InterviewEditTool | This program is used to review (display and/or print) raw StrEAMInterview results prior to their being included in a StrEAMAnalysis model. It also supports editing of the interview results themselves when necessary. |
| 1 | BuildModelTool | A program that assembles individual StrEAMInterview results into a formal StrEAM Analysis model for further analysis. This provides a control point where interview data is "promoted" for use in downstream analysis. |
| 2 | CodeDefinitionTool | StrEAM code definitions are recorded with this program and saved as a "coding definition model". This is used to maintain (create, edit, delete) all of the codes to be used during analysis. |
| 4 | DatasetDefinitionTool | This program is used to maintain (create, edit, delete) dataset definitions that will be used for analysis. These definitions are stored in a "dataset definition model" for later use during analysis. |
| 3 | LadderCodingTool | This is the primary program used by an analyst to apply codes to "ladders" collected during a StrEAM study. This provides a robust graphic user interface for manipulation of ladder data and assignment of coding information. |
| 3 | ElementCodingTool | This tool provides an alternative means of assigning coding data to StrEAM ladders. In this tool ladder elements are viewed just as phrases, and a user interface is provided for the operator to assign ladder levels and codes to these phrases. This will typically used to cross-check the use of codes in an analysis model. |
| 5 & 6 | LadderAnalysisTool | This program performs the quantitative analysis of the ladder data in a StrEAM study. The analyst specifies the data partitioning to apply and this tool will then provide automated assistance to select those items that are most significant regarding decision making. |

Data Organization

The data in the StrEAMAnalysis system includes both configuration information and actual interview information to be studied. All of this data is stored persistently in the form of XML-formatted text files (eXtended Markup Language). There are a total of five (5) different types of StrEAMAnalysis files. Each of these has its own XML-based dialect. The different types of files are summarized in the table below. Note that the StrEAMAnalysis process (from FIG. 32. above) which updates each file type is indicated in the table as well.

| StrEAMAnalysis Process | XML Language | File Description |
| --- | --- | --- |
| (Already exists) | StrIDefML | This is the StrEAM Interview Definition file. It defines the form and content of a StrEAM Interview. A detailed description of this file is contained in the StrEAMInterview documentation. The StrIDefML file is used by StrEAMAnalysis for configuration purposes. |
| 1 (Also exists but can be edited) | StrIResML | This is the StrEAM Interview Results file. A StrIResML file contains the actual results of a StrEAMInterview. Files of this type serve as the input to the StrEAMAnalysis system. This file structure is described in detail in the StrEAMInterview documentation |
| 2 | StrCodeDefML | Definition of the systems of codes to be used for qualitative StrEAM data (such as ladder elements) is recorded in a StrEAM Code Definition file. These files contain multiple sets of codes to be used for various targets within a StrEAM data collection. |
| 4 | StrDataDefML | Filters specifying subsets of data to be examined are defined (and named) and stored in a StrEAM Data Definition file. These files provide definitions for "consideration groups" and "datasets". These named sets of criteria are used later during data analysis |
| 1 & 3 | StrModelML | This is the StrEAM Analysis Model file. It contains a collection of "promoted" StrEAMInterview results along with coding information. The Analysis Model is essentially a container of some number of interview results to be examined together. |

Any number of these files may exist at any time. There may be multiple versions and versions containing copies of the same information. This supports the level of flexibility required by the exploratory and team-based nature of the StrEAMAnalysis processes. Along with that, the naming of files is purely by convention.

StrEAM Ladder Coding

The process of grouping comments made during laddering is central to the development of meaningful analysis models. This process is both subjective and iterative. It is a "discovery-oriented" process where the analyst may need to study the results of different grouping structures in order to determine their effectiveness.

It is therefore essential that the StrEAM system provide not only convenient graphical tools, but also a data model that supports the iterative, coding process.

Coding Model Generator

A coding model for a StrEAM study consists of a series of categories (codes) for ladder responses and the assignment of actual comments to those categories. These categories and assignments will be the basis for further analysis of the decision chains captured in the interview responses.

Development of a coding model can be done before, during, and after interview data has been collected. If done before data collection, there are—of course—no actual responses to be assigned, but categories can be set up in anticipation of the responses that may result. If done during data collection then the coding model will necessarily reflect only part of the data. Even if the development of a coding model is done after all the ladder data has been collected, it may still be desirable to be able to analyze the interview data in the context of multiple coding models side-by-side.

Figure 36:
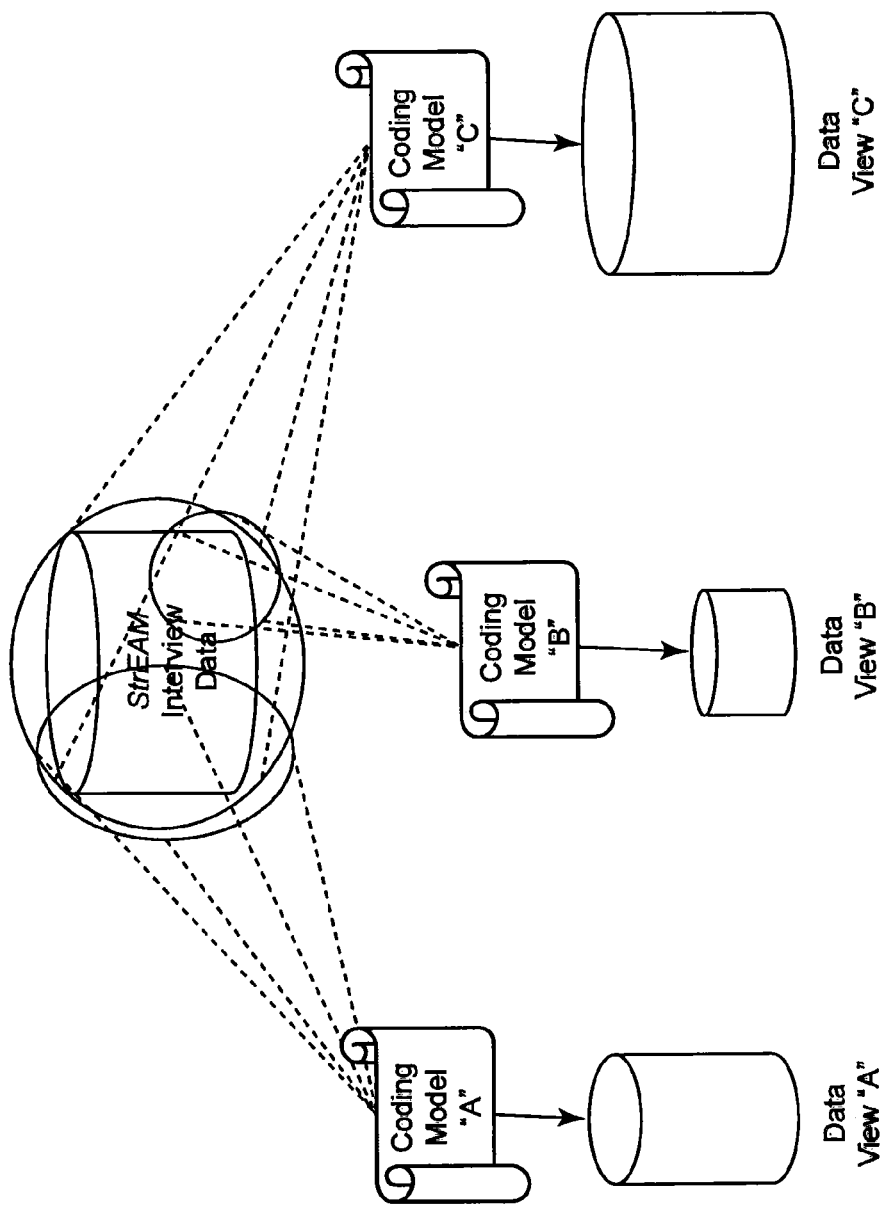
FIG. 36 illustrates the feature, whereby the interview analysis subsystem allows an analyst to concurrently develop, view and/or use a plurality of coding models of the same interview data.

Therefore a coding model does not only represent some final state of interview data, but must be able to serve as a "view" of it. Those views may need to co-exist and may need to be changed/refined, independently, over time. The coding models provide views of the interview data as illustrated in FIG. 36.

It is also important that the data model be able to support off-line (disconnected) analysis. In particular, such off line support includes both the development of coding models and their application in decision mapping analysis. To provide such off line support, a StrEAM Coding Model will be defined in a stand-alone file containing all of the information necessary to represent (and apply) a ladder coding model. This file, when populated with actual interview data, will be generated using some (or all) of the available interview data. That is, the generation process will require a connection to the interview repository (which may be Internet web-hosted). But after the Coding Model file has been generated it may be used without any further connection to the interview repository.

StrEAM Coding Model Language (StrCodML)

A StrEAM Coding Model is data provided in a text file. The file consists of an XML-based grammar: the StrEAM Coding Model Language (StrCodML). The structure of such a file is discussed below.

| | |
|---|---|
| <consideration-group> | there will be a notion of a "consideration group" in a StrEAM coding model. This allows more than one question to be grouped together for coding. It could be that the Interview has multiple questions that will yield ladders that need to be coded (and analyzed) in the context of one another. By definition a consideration group includes for the multiple interview questions, all the ladder responses for those interview questions will be "considered" together. Of course, by having a single Interview question as the consideration group will result in the separate treatment of ladders for that question. |
| <filter-threshold> | for each consideration group in a StrEAM coding model there can be a threshold value, representing the percentage of mentions a code must have to be viewed (and used in analysis). |

```
<coding-model>
    <heading>
        <study-name>      </study-name>
        <model-name>      </model-name>
        <version>     </version>
        <status>      </status>
        <last-modified> </last-modified>
        <author>      </author>
        <description>     </description>
    </heading>
    <consideration-group id="xxxx">
        <question id="xxxx">Text of interview question</question>
        <question id="xxxx">Text of interview question</question>
        <question id="xxxx">Text of interview question</question>
        ...
        <filter-threshold>Percentage of coded appearances
        required to display</filter-threshold>
        <unleveled-quotes>
            <quote interview-id="xxxx" question-id="xxxx"
            member="n" level="xxxx" code="xxx">
                Verbatim ladder response here
            </quote>
            <quote interview-id="xxxx" question-id="xxxx"
            member="n" level="xxxx" code="xxx">
                Verbatim ladder response here
            </quote>
            ...
        </unleveled-quotes>
        <value-level>
            <uncoded-quotes>
                <quote interview-id="xxxx" question-id="xxxx"
                member="n" level="xxxx" code="xxx">
                    Verbatim ladder response here
                </quote>
                <quote interview-id="xxxx" question-id="xxxx"
                member="n" level="xxxx" code="xxx">
                    Verbatim ladder response here
                </quote>
                ...
            </uncoded-quotes>
            <category code="nnnn">
                <title>     </title>
                <description>     </description>
                <quote interview-id="xxxx" question-id="xxxx"
                member="n" level="xxxx" code="xxx">
                    Verbatim ladder response here
                </quote>
                <quote interview-id="xxxx" question-id="xxxx"
                member="n" level="xxxx" code="xxx">
                    Verbatim ladder response here
                </quote>
                ...
            </category code="nnnn">
            <category code="nnnn">
                <title>     </title>
                <description>     </description>
                <quote interview-id="xxxx" question-id="xxxx"
                member="n" level="xxxx" code="xxx">
                    Verbatim ladder response here
                </quote>
                <quote interview-id="xxxx" question-id="xxxx"
                member="n" level="xxxx" code="xxx">
                    Verbatim ladder response here
                </quote>
                ...
            </category code="nnnn">
            ...
        </value-level>
        <psychosocial-level>
            ... same structure as value level
        </psychosocial-level>
        <functional-level>
            ... same structure as value level
        </functional-level>
        <attribute-level>
            ... same structure as value level
        </attribute-level>
    </consideration-group-group id="xxxx">
    <consideration-group id="xxxx">
        <question id="xxxx">Text of interview question</question>
        <question id="xxxx">Text of interview question</question>
        ...
    </consideration-group>
    ...
</coding-model>
```

Several comments about this StrCodML:

1. A Coding Model will be uniquely identified by the combination of <study-name>, <model-name> and <version>. These may be reflected in the actual file name and the directory structure in which the files are stored.
2. Note that the <title> of a category/code is the phrase that will show up most places. The description is meant to be more of a commentary about the category.
3. A <trailer> element may be added to each StrCodML file. The possible content is given below. This can be used as a simple validity check on the file itself:

```
<trailer>
    <value-totals>
        <codes>     </codes>
        <quotes>    </quotes>
    </value-totals>
    <psychosocial-totals>
        <codes>     </codes>
        <quotes>    </quotes>
    </psychosocial-totals>
    <functional-totals>
        <codes>     </codes>
        <quotes>    </quotes>
```

-continued

```
        </functional-totals>
        <attribute-totals>
            <codes>         </codes>
            <quotes>        </quotes>
        </attribute-totals>
        <unassigned-quotes>     </unassigned-quotes>
    </trailer>
```

StrEAM Ladder Coding Objects

A StrEAM Coding Model includes instances of five (5) objects: CodingModel, ConsiderationGroup, LadderCode, LadderQuote, and InterviewQuestion. Each of these objects is described below along with a summary of their attributes and methods. Not listed are any getter/setter methods for the attributes.

StrEAM CodingModel Object

| CodingModel | | An object representing the StrEAM Coding Model in its entirety. This model includes both the definition of a ladder coding structure and the application of that structure to a set of survey data |
|---|---|---|
| Properties: | | |
| StudyName | String | The name of the study for this coding model |
| ModelName | String | An arbitrary name given for this particular coding model. Must be unique for the study. |
| Version | String | |
| Status | String | A status string representing the stage of the analysis process that this coding model is currently in. |
| LastModified | Date | The time and date this coding model file was last modified |
| Author | String | Name of the analyst who prepared this coding model |
| Description | String | A description of this coding model |
| IDefMLFile | String | The interview definition file used to gather this data. This will be used to perform the dataset criteria selection |
| ConsiderationGroups | Array List | A list of all the consideration groups included in this coding model. Most likely this should include all of the consideration groups for the study. |

| Methods: | Arguments: | Returns: |
|---|---|---|
| AddConsiderationGroup | ConsiderationGroup | <none> |
| NumberOfConsiderationGroups | <none> | Integer |
| GetConsiderationGroup | Integer | ConsiderationGroup |

| Constructor Arguments: |
|---|
| <none> |

StrEAM ConsiderationGroup Object

| ConsiderationGroup | An object representing a group of questions, the ladders for which will be considered together as one. |
|---|---|
| Properties: | |
| GroupId | String |
| Description | String |
| FilterThreshold | Integer |
| InterviewQuestions | ArrayList |
| UnleveledQuotes | ArrayList |
| ValueUncodedQuotes | ArrayList |
| ValueCodes | ArrayList |
| PsychoSocialUncodedQuotes | ArrayList |
| PsychoSocialCodes | ArrayList |
| FunctionalUncodedQuotes | ArrayList |
| FunctionalCodes | ArrayList |
| AttributeUncodedQuotes | ArrayList |

-continued

| AttributeCodes | ArrayList | |
|---|---|---|
| Methods: | Arguments: | Returns: |
| AddInterviewQuestion | InterviewQuestion | <none> |
| NumberOfInterviewQuestions | <none> | Integer |
| GetInterviewQuestion | Integer | InterviewQuestion |
| AddUnleveledQuote | LadderQuote | <none> |
| NumberOfUnleveledQuotes | <none> | Integer |
| GetUnleveledQuote | Integer | LadderQuote |
| RemoveUnleveledQuote | Integer | <none> |
| AddValueUncodedQuote | LadderQuote | <none> |
| NumberOfValueUncodedQuotes | <none> | Integer |
| GetValueUncodedQuote | Integer | LadderQuote |
| RemoveValueUncodedQuote | Integer | <none> |
| AddValueCode | LadderCode | <none> |
| RemoveValueCode | Integer | <none> |
| NumberOfValueCodes | <none> | Integer |
| GetValueCode | Integer | LadderCode |
| AddPsychosocialUncodedQuote | LadderQuote | <none> |
| NumberOfPsychosocialUncodedQuotes | <none> | Integer |
| GetPsychosocialUncodedQuote | Integer | LadderQuote |
| RemovePsychosocialUncodedQuote | Integer | <none> |
| AddPsychosocialCode | LadderCode | <none> |
| RemovePsychosocialCode | Integer | <none> |
| NumberOfPsychosocialCodes | <none> | Integer |
| GetPsychosocialCode | Integer | LadderCode |
| AddFunctionalUncodedQuote | LadderQuote | <none> |
| NumberOfFunctionalUncodedQuotes | <none> | Integer |
| GetFunctionalUncodedQuote | Integer | LadderQuote |
| RemoveFunctionalUncodedQuote | Integer | <none> |
| AddFunctionalCode | LadderCode | <none> |
| RemoveFunctionalCode | Integer | <none> |
| NumberOfFunctionalCodes | <none> | Integer |
| GetFunctionalCode | Integer | LadderCode |
| AddAttributeUncodedQuote | LadderQuote | <none> |
| NumberOfAttributeUncodedQuotes | <none> | Integer |
| GetAttributeUncodedQuote | Integer | LadderQuote |
| RemoveAttributeUncodedQuote | Integer | <none> |
| AddAttributeCode | LadderCode | <none> |
| RemoveAttributeCode | Integer | <none> |
| NumberOfAttributeCodes | <none> | Integer |
| GetAttributeCode | Integer | LadderCode |

Constructor Arguments:

| | String | ID of ConsiderationGroup to create |
|---|---|---|

StrEAM LadderCode Object

| LadderCode | An object representing a single StrEAM Code (or category) for ladder responses] | |
|---|---|---|

Properties:

| Code | String | the code (or ID) of this category |
|---|---|---|
| GroupId | String | the current consideration group ID for this code/category |
| Level | String | the current level for this code/category |
| Title | String | the short name/label for this category/code |
| Description | String | a description of the category/code |
| Quotes | ArrayList | an array of LadderQuote objects |

-continued

| Methods: | Arguments: | Returns: |
|---|---|---|
| AddQuote | LadderQuote | <none> |
| RemoveQuote | Integer | <none> |
| NumberOfQuotes | <none> | Integer |
| GetQuote | Integer | LadderQuote |

Constructor Arguments:

<none>

StrEAM LadderQuote Object

| LadderQuote | An object representing a single ladder element (or quote) from a StrEAM interview ladder answer. Each ladder question may result in up to 6 LadderQuotes. | |
|---|---|---|
| Properties: | | |
| InterviewId | String | specific interview session containing this quote |
| Code | String | current code (if any) that this quote is assigned to (or "UNCODED") |
| GroupId | String | current consideration group ID |
| Level | String | current level (if any) that this quote is assigned (or "UNASSIGNED") |
| QuestionId | String | interview question id having this quote in its answer |
| LadderIndex | Integer | ladder index (1-6) of this quote (since there can be 4, 5, or 6) |
| InterviewLevel | String | original ladder level assigned to this quote during the interview |
| InterviewCode | String | original ladder code assigned to this quote (if any) during the interview |
| Text | String | actual quote |

| Methods: | Arguments: | Returns: |
|---|---|---|

<none>

Constructor Arguments:

<none>

StrEAM InterviewQuestion Object

| InterviewQuestion | An object representing a StrEAM interview question. One or more interview questions may define a ConsiderationGroup. | |
|---|---|---|
| Properties: | | |
| Id | String | The name of the study for this coding model |
| Text | String | An arbitrary name given for this particular coding model. Must be unique for the study. |

| Methods: | Arguments: | Returns: |
|---|---|---|

<none>

Constructor Arguments:

<none>

StrEAM Ladder Coding Tools

To build a StrEAM Coding Model, an analyst works with graphical tools that operate on the data model described above. Because of the iterative and discovery-oriented nature of the StrEAM coding process, there are several screens available to aid the process.

Stream Coding Standard Screen

Figure 37:
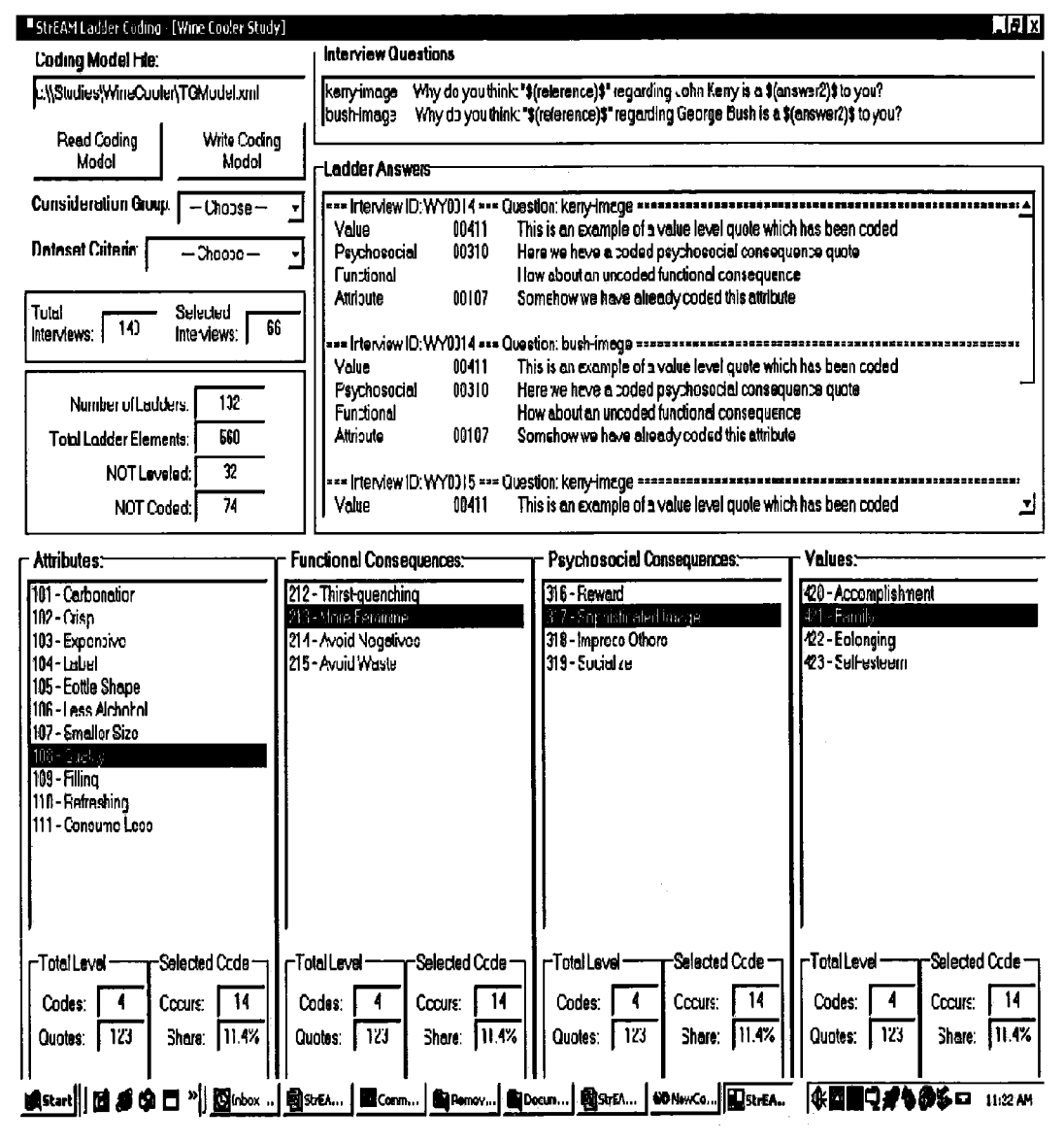

FIG. 37 shows a computer display for viewing interview data when building a coding model. In particular, this figure shows that the operator is able to review the interview ladders one-by-one in order to code individual components (elements).

Stream Coding Leveling Screen

Figure 38:
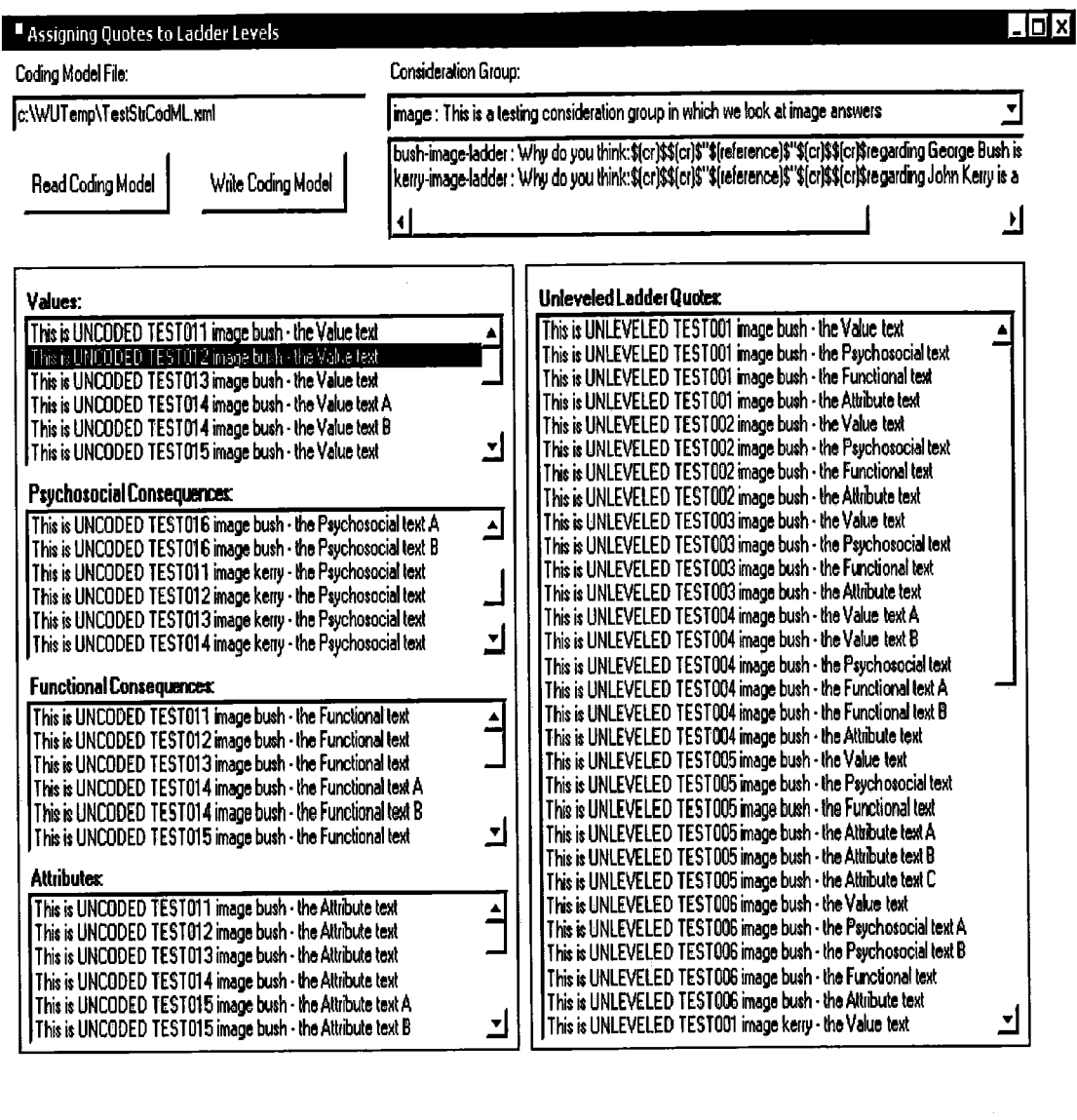
FIG. 38 shows a display screen that provides support specifically for the assignment of ladder elements to ladder levels.

The display screen of FIG. 38 provides support specifically for the assignment of ladder elements to ladder levels.

Stream Coding Screen

Figure 39:
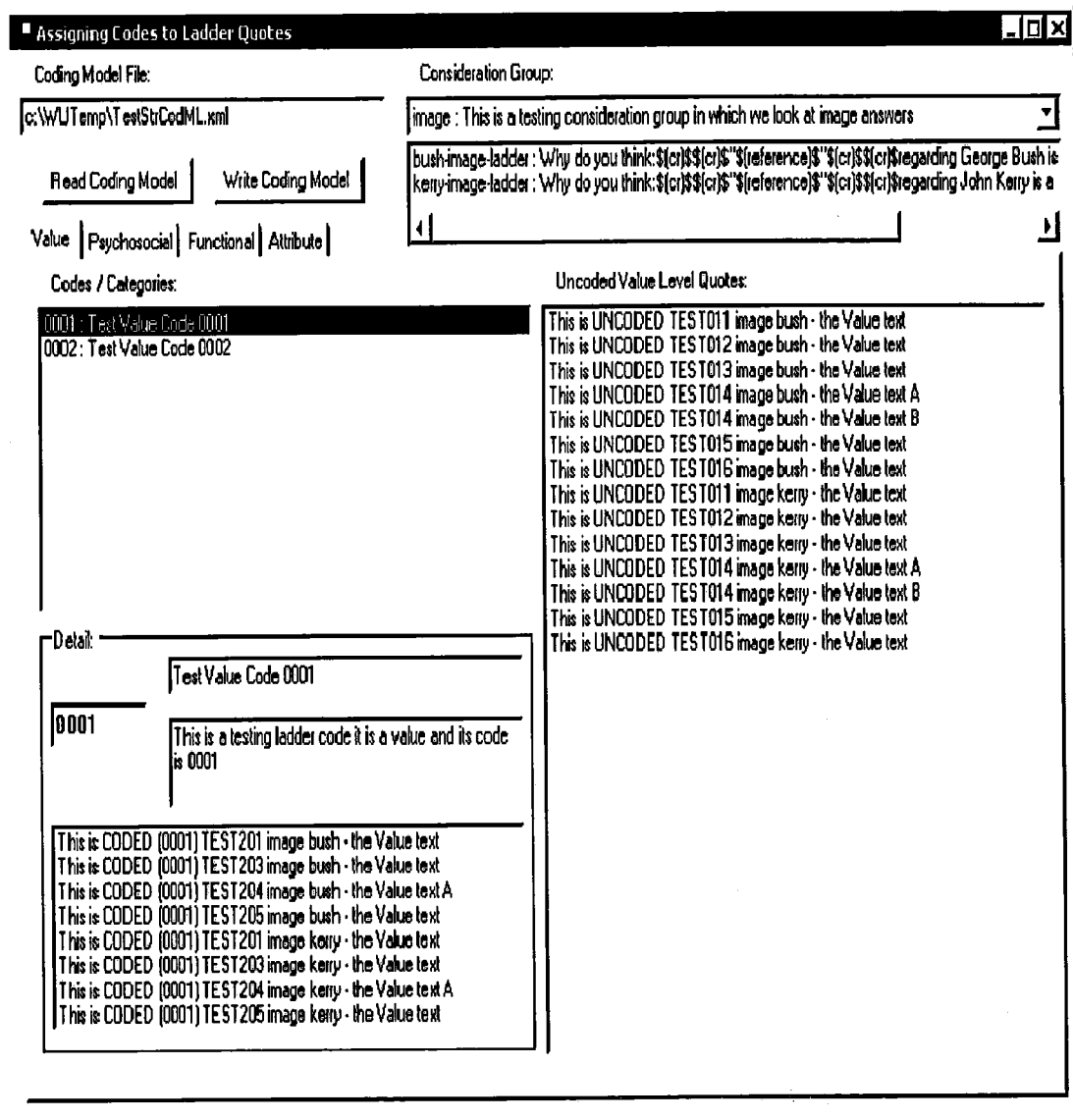
FIG. 39 shows a display screen which provides a focused environment for assigning codes to ladder elements that have already been assigned to a level.
Figure 40:
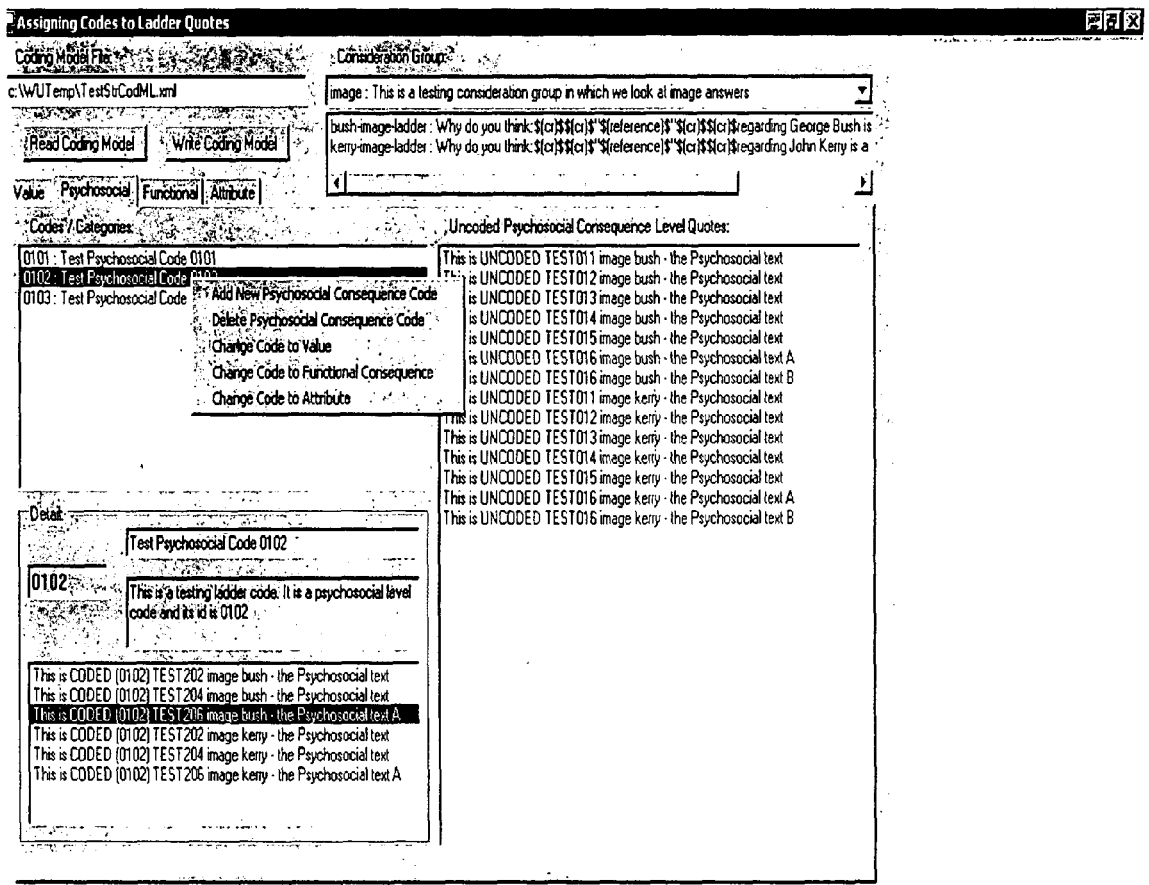
FIG. 40 shows another display screen which provides a focused environment for assigning codes to ladder elements that have already been assigned to a level.

Yet other display screen variations are shown in FIGS. 39 and 40 which provide a focused environment for just assigning codes to ladder elements that have already been assigned to a level.

StrEAM Ladder Chaining

The analysis aspects of the StrEAM Interview system include several methods for processing the data collected in the course of a StrEAM Interview study, and software tools that support those processes. StrEAM Analysis operates on data that has been coded according to previous discussions (StrEAM Interview Coding).

Overview

The primary objective of the StrEAM Analysis subsystem is to aid the analyst in uncovering and summarizing the dominant decision factors and relationships between them as captured in the data collected. A key (and representative) aspect of this process is the development of hierarchical value maps. These diagrams capture the key decision chains involved. The analyst will then juxtapose the decision hierarchies with the other study information to develop the insight about the problem being explored.

As has been described earlier, the StrEAM Interview Coding process results in a StrEAM Coding Model. Such models provide a view of the survey data where the responses to ladder questions have been categorized within a classification structure. Based on such a coding model, the results can now be analyzed in a systematic way.

Analysis Processes

There are several steps in the StrEAM Analysis process, all of which are supported by automated tools. At a high level, the StrEAM Analysis workflow is represented FIG. 41.

Figure 41:
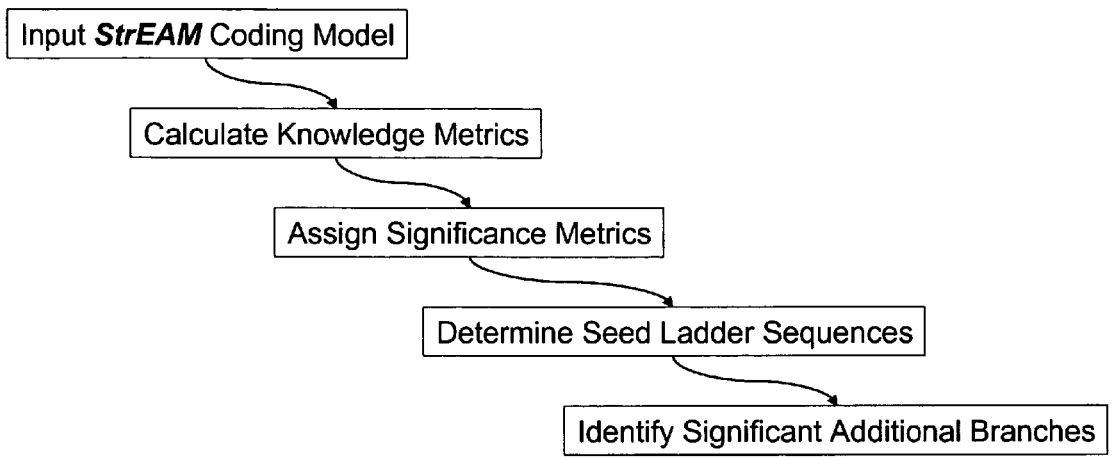
FIG. 41 shows a more detailed flow diagram of the steps performed when analyzing interview data obtained using the interview subsystem of the present invention.

The first couple of steps of FIG. 41 develop the metrics that will be used to measure how significant a ladder sequence, or partial sequence, is within the overall body of data being examined. Then the dominant decision path elements are identified in the data.

The analysis tools can operate solely on the populated StrEAM Coding model since it contains sufficient information for both metric development and identification of significant decision chain elements. However, much of the insight developed from a StrEAM study will be discovered by examination of the analysis information in conjunction with the other non-ladder information gathered in the study. This will be accomplished both iteratively by applying the analysis tools to different subsets of the study data, and by reviewing associated study data in the context of the results of analysis.

Analysis Dataset Selection

Figure 42:
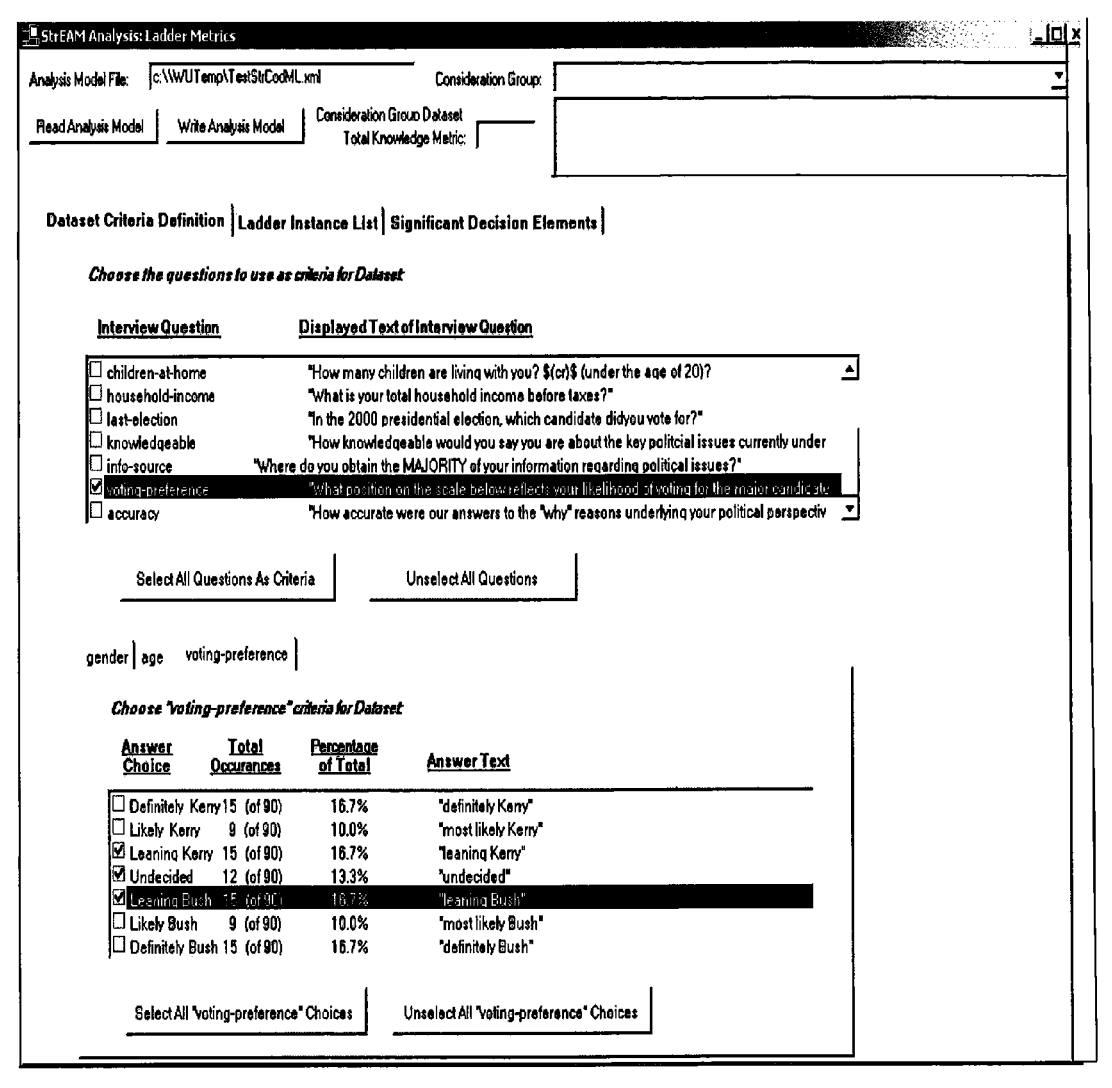

FIG. 42 shows a display screen for use by an analyst when selecting a data set.

Knowledge and Significance Metrics

Knowledge and significance metrics are computed by the StrEAMMetrics tool. This program takes a StrEAM Coding model (StrCodML format) file as input. The tool will parse this file and then present the analyst with the choice of interview questions to examine. Once a question is chosen, the tool will calculate the total "knowledge" contained in the dataset. It will also calculate the "significance" (with respect to that knowledge) of each ladder given as a response for the interview question of interest.

Knowledge

The knowledge metric is a count of each "bit" of information that a ladder sequence contains. A bit is a pair of two codes in a sequence, whether adjacent (direct connections) or not adjacent (indirect connections). For instance with three codes (A, B, C) in a sequence the "facts" we "know" are: AB, BC, and AC. In general, this is a number sequence where $f(n)=n-1+f(n-1)$, where $f(0)=0$ and n is the number of codes in the sequence. So $f(4)=3+f(3)=3+2+f(2)=3+2+1+f(0)=6$.

In the case of StrEAM ladders, there can be sequences of 4, 5, or 6 codes. So ladder sequences can represent 6, 10, or 15 "bits" of knowledge respectively. It should be noted that the example used hereinbelow uses incomplete ladders (1, 2, and 3 code sequences). These—of course—represent 0, 1, and 3 bits of knowledge respectively. Such incomplete sequences will not be present in data gathered by the StrEAM Interview tools, and their use in the included example is inconsequential.

The total "knowledge" contained in a dataset is the sum of all of the knowledge counts of all ladders. Note that this does not depend on the actual codes in the sequence themselves, but rather just the number of codes in each sequence.

So if we consider the following set of five ladder sequences (each including four elements):

| | Sequence of Codes | | | |
|---|---|---|---|---|
| Ladder 1 | A | B | C | D |
| Ladder 2 | A | B | F | G |
| Ladder 3 | W | X | Y | Z |
| Ladder 4 | A | B | C | D |
| Ladder 5 | A | Y | Z | D |

The total "knowledge" contained in this data set is 30 (i.e., 6 bits per ladder*5 ladders).

Significance

The significance metric is a way of capturing the importance or prevalence of the knowledge contained in a unique ladder sequence. This is done by counting all occurrences of the specific bits of knowledge whose pairs are contained in a sequence within the whole dataset. That is, each instance of a code pair (i.e., knowledge bit) counts. So using the simplistic example above, if we looked for the ladder sequence A, B, C, D, it would total 14: AB occurs 3 times, AC 2 times, AD 3 times, BC 2 times, BD 2 times, and CD 2 times. The significance of a sequence (i.e., ladder) is the total number of knowledge bits representing the sequence divided by the total number of knowledge bits available in the whole dataset. Accordingly, significance of the sequence A, B, C, D in the above example is computed as $14/30=47\%$. FIG. 43 shows a computer display for use in determining significance values.

Dominant Decision Chain Elements

An analyst using the StrEAMChaining tool performs the identification of the important decision chain elements in a dataset. The process of choosing the elements that matter the most is partially automated and partially manual. The StrEAMChaining tool operates on the same data as the SRDAMetrics tool and makes use of the metrics measured by SRDAMetrics.

Seed Ladder Sequences

The process of finding dominant decision chain elements begins with the identification of "seed" ladders. These are ladder sequences that are of major significance in the dataset. They will be used to "seed" the construction of complete decision chain maps.

The seed ladders are identified first by looking through the entire dataset under consideration and identifying the number of matching elements between each pair of actual ladder sequences. This can be visualized as a 2 dimensional array where the rows and columns are the ladder sequences, and the cells contain the number of matches for that pair. Since the order of the ladder does not matter, only a subset of the matrix is meaningful. Using the trivial example from above would yield a matrix as follows (note, only the upper diagonal is filled in):

| Ladder | 1 | 2 | 3 | 4 | 5 |
|--------|---|---|---|---|---|
| 1 | x | 2 | 0 | 4 | 2 |
| 2 | x | x | 0 | 2 | 1 |
| 3 | x | x | x | 0 | 0 |
| 4 | x | x | x | x | 2 |
| 5 | x | x | x | x | x |

The StrEAMChaining tool will build this inventory of matches between ladders in a dataset once the analyst points the tool at the dataset The tool will then select those ladders where there are matches, e.g., 3 or greater for further review (a number greater than 3 is also within the scope of the invention). In the trivial example given, only one cell (Ladder1/Ladder4) is greater than 3. In a real dataset (such as the example given later) there will be many more matches.

Now that StrEAMChaining has extracted those ladders that have at least the minimum number of matches, the next step is to determine the unique sequences (or partial sequences) from these ladders that occur most often. The StrEAMChaining tool will select the "Seed Ladders", wherein these seed ladders will be the 6 most common sequences where there is not more than one overlapping element between any two of the sequences chosen.

Significant Additional Branches

Figure 44:
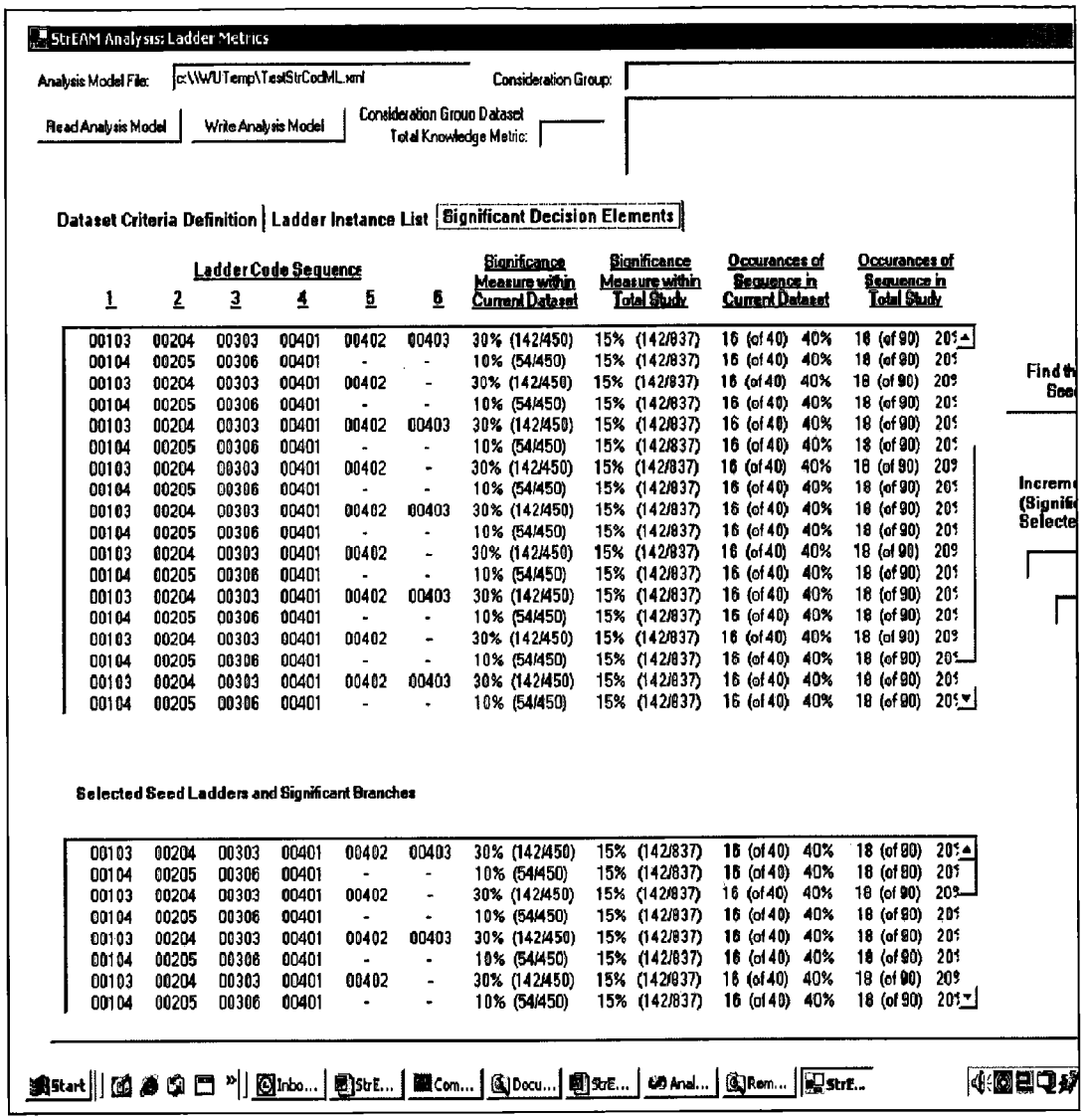
FIG. 44 shows a computer screen that is used by an analyst for identifying significant additional branches.

FIG. 44 shows a computer screen that is used by an analyst for identifying significant additional branches.

APPENDIX A

Complete StrEAMChaining Example

To illustrate the StrEAMChaining process, we will use a hypothetical survey about Wine Coolers that was presented the article in "Laddering Theory, Method, Analysis, and Interpretation" (by Reynolds & Gutman). The dataset from this survey contains 67 ladders (for a single question)[1]. The ladder elements[2] are all coded according to one of the following 23 codes/categories for this study:

[1] The raw data for all 67 ladders is given in the appendix that follows
[2] As mentioned earlier, the data in this example actually includes ladders with fewer than 4 elements. This will not be the case with ladders gathered by the StrEAM Interview system.

The coding model for this study ended up with the following codes/categories:

| Attributes | Psychosocial Consequences | Values |
|---|---|---|
| 1 Carbonation | 16 Reward | 20 Accomplishment |
| 2 Crisp | 17 Sophisticated Image | 21 Family |
| 3 Expensive | 18 Impress Others | 22 Belonging |
| 4 Label | 19 Socialize | 23 Self-esteem |
| 5 Bottle shape | Functional Consequences | |
| 6 Less Alcohol | 12 Thirst-quenching | |
| 7 Smaller Size | 13 More Feminine | |
| 8 Quality | 14 Avoid Negatives | |
| 9 Filling | 15 Avoid Waste | |
| 10 Refreshing | | |
| 11 Consume Less | | |

Using these codes, the ladder data from the study are as follows:

| Respondent | Ladder Sequence | | | | | |
|---|---|---|---|---|---|---|
| | Element | Element | Element | Element | Element | Element |
| A | 1 | 10 | 12 | 16 | 20 | 0 |
| B | 1 | 10 | 16 | 0 | 0 | 0 |
| C | 1 | 10 | 12 | 16 | 16 | 23 |
| D | 3 | 6 | 20 | 0 | 0 | 0 |
| E | 4 | 17 | 20 | 0 | 0 | 0 |
| F | 2 | 10 | 12 | 16 | 18 | 22 |
| G | 1 | 12 | 16 | 18 | 23 | 0 |
| H | 3 | 8 | 20 | 0 | 0 | 0 |
| I | 1 | 12 | 16 | 18 | 23 | 0 |
| J | 1 | 10 | 16 | 0 | 0 | 0 |
| K | 3 | 8 | 20 | 0 | 0 | 0 |

-continued

| | | | | | | |
|---|---|---|---|---|---|---|
| L | 2 | 10 | 12 | 16 | 18 | 22 |
| M | 1 | 12 | 16 | 20 | 0 | 0 |
| N | 1 | 12 | 16 | 20 | 0 | 0 |
| O | 1 | 10 | 12 | 16 | 20 | 0 |
| P | 3 | 16 | 20 | 0 | 0 | 0 |
| Q | 1 | 10 | 12 | 16 | 20 | 0 |
| R | 2 | 10 | 12 | 16 | 18 | 23 |
| S | 1 | 10 | 12 | 16 | 18 | 22 |
| T | 1 | 10 | 16 | 0 | 0 | 0 |
| U | 2 | 10 | 12 | 16 | 18 | 22 |
| V | 3 | 20 | 0 | 0 | 0 | 0 |
| W | 1 | 10 | 12 | 16 | 20 | 0 |
| X | 1 | 10 | 16 | 0 | 0 | 0 |
| Y | 3 | 6 | 16 | 0 | 0 | 0 |
| Z | 3 | 6 | 16 | 18 | 23 | 0 |
| AA | 3 | 8 | 18 | 20 | 0 | 0 |
| AB | 3 | 18 | 23 | 0 | 0 | 0 |
| AC | 3 | 16 | 23 | 0 | 0 | 0 |
| AD | 3 | 8 | 18 | 22 | 0 | 0 |
| AE | 3 | 8 | 17 | 18 | 23 | 0 |
| AF | 3 | 17 | 18 | 23 | 0 | 0 |
| AG | 4 | 13 | 17 | 18 | 23 | 0 |
| AH | 4 | 13 | 17 | 18 | 22 | 0 |
| AI | 5 | 13 | 17 | 23 | 0 | 0 |
| AJ | 5 | 17 | 23 | 0 | 0 | 0 |
| AK | 4 | 17 | 23 | 0 | 0 | 0 |
| AL | 5 | 13 | 22 | 0 | 0 | 0 |
| AM | 6 | 14 | 18 | 22 | 0 | 0 |
| AN | 6 | 14 | 21 | 0 | 0 | 0 |
| AP | 6 | 14 | 18 | 0 | 0 | 0 |
| AQ | 6 | 14 | 21 | 0 | 0 | 0 |
| AR | 6 | 14 | 21 | 0 | 0 | 0 |
| AS | 9 | 11 | 14 | 19 | 22 | 0 |
| AT | 9 | 11 | 14 | 19 | 21 | 0 |
| AU | 9 | 11 | 14 | 21 | 0 | 0 |
| AV | 9 | 1 | 14 | 19 | 22 | 0 |
| AX | 7 | 15 | 21 | 0 | 0 | 0 |
| AY | 7 | 15 | 21 | 0 | 0 | 0 |
| AZ | 7 | 15 | 0 | 0 | 0 | 0 |
| BA | 3 | 8 | 16 | 18 | 22 | 0 |
| BB | 3 | 8 | 18 | 22 | 0 | 0 |
| BC | 2 | 8 | 17 | 22 | 0 | 0 |
| BD | 3 | 8 | 16 | 18 | 22 | 0 |
| BE | 3 | 8 | 18 | 22 | 0 | 0 |
| BF | 2 | 8 | 17 | 22 | 0 | 0 |
| BG | 2 | 8 | 17 | 19 | 22 | 0 |
| BH | 1 | 7 | 15 | 0 | 0 | 0 |
| BI | 6 | 10 | 16 | 0 | 0 | 0 |
| BJ | 6 | 12 | 0 | 0 | 0 | 0 |
| BK | 6 | 19 | 21 | 0 | 0 | 0 |
| BL | 7 | 11 | 14 | 19 | 22 | 0 |
| BM | 4 | 8 | 13 | 17 | 23 | 0 |
| BN | 4 | 8 | 13 | 17 | 22 | 0 |
| BO | 5 | 8 | 13 | 17 | 23 | 0 |
| BP | 5 | 10 | 13 | 17 | 22 | 0 |
| BQ | 9 | 19 | 21 | 0 | 0 | 0 |

What is claimed is:

1. A method for determining perceptions related to an object, comprising:

obtaining and storing interview data in a non-transient electronic data storage, the interview data substantially defining how an interview is conducted;

providing at least a portion of the interview data to an interviewer for conducting an interview with one or more respondents;

communicating with the respondents, via a communications network, for conducting an interview with each of the respondents and for obtaining respondent data related to each respondent's perception of the object, wherein each respondent is presented with one or more equity questions, and one or more laddering questions;

wherein the equity questions includes one of:
(a-1) a positive equity question for receiving a respondent identified positive characteristic attributable to the object, wherein the positive characteristic is identified by the respondent as a positive reason for not utilizing the object less;
(a-2) a negative equity question for receiving a respondent identified negative characteristic attributable to the object, wherein the negative characteristic is identified by the respondent as a negative reason for not utilizing the object more;

wherein the one or more laddering questions includes at least some of: a question related to an attribute of the object, a question related to a functional consequence of the object, a question related to psychosocial consequence of the object, and a question related to a personal goal related to the object;

storing in a non-transient electronic data storage the respondent data obtained, said respondent data including responsive data responsive to said equity and laddering questions;

retrieving from the non-transient data storage, and coding said respondent data into a plurality of categories using computational machinery for the coding, wherein there is: (i) at least one category indicative of an attribute of the object, (ii) at least one category indicative of a functional consequence related to the object, (iii) at least one category indicative of a psychosocial consequence related to the object, and (iv) at least one category indicative of a value attributable to at least some of the respondents, the value being a personal goal of the at least some of the respondents;

determining and storing in a non-transient data storage, a plurality of associations between said categories using computational machinery, the associations determined based on said responsive data for linking together two or more of the categories, or representations thereof, wherein for each one of the associations: each of the categories for the association is representative of a different corresponding respondent reason as to why respondents relate to the object as they do, wherein each of the respondent reasons is for a same respondent preference or nonpreference in relating to the object, and each of the respondent reasons is obtained using the respondent data, wherein each of the corresponding respondent reasons for the association corresponds to one of:
  (b-1) an attribute of the object contributing to respondents relating to the object in the same respondent preference or nonpreference, and the category therefor being in the category classification (i) above;
  (b-2) a functional consequence contributing to respondents relating of the object in the same respondent preference or nonpreference, and the category therefor being in the category classification (ii) above;
  (b-3) a psychosocial consequence contributing to respondents relating of the object in the same respondent preference or nonpreference, and the category therefor being in the category classification (iii) above; and
  (b-4) a respondent personal goal contributing to respondents relating of the object in the same respondent preference or nonpreference, and the category therefor being in the category classification (vi) above;

using said associations for determining a corresponding perception of each of first and second population groups represented by respective first and second sets of said respondents using computational machinery, wherein the first and second sets differ in their preference related to the object;

wherein the step of using includes a step of determining a respondent decision structure by selecting, according to a measurement of importance, one or more of the associations, or a representation thereof, the decision structure linking together the corresponding respondent reasons for the selected associations to form one or more chains of respondent reasoning, wherein each chain: (c-1) identifies a plurality of reasons why at least some of the respondents relate to the object as they do, (c-2) the reasons identified by the chain are for a same one of the attributes of the object;

second determining at least one of: (d-1) a first one or more of the respondent reasons from the decision structure, wherein the first respondent reasons are indicative of the first group perceiving the object more favorably than the second group, and (d-2) a second one or more of the respondent reasons of the decision structure, wherein the second respondent reasons are indicative of the second group perceiving the object more favorably than the first group;

wherein the step of second determining is dependent upon respondent mentions in the respondent data for the equity questions, wherein the mentions are indicative of the respondent reasons of the decision structure; and determining one or more perception differences between the first and second population groups by using different reasons between the first respondent reasons and the second respondent reasons.

2. The method of claim 1, wherein the second determining step determines both the first respondent reasons and the second respondent reasons.

3. The method of claim 1, wherein the second determining step uses the respondent data for both the positive equity question and the negative equity question.

4. The method of claim 1, wherein a ratio of a first number of the mentions to a second number of the mentions is used in the second determining step for determining the at least one of (d-1) and (d-2).

5. The method of claim 1, wherein a total number of the mentions is indicative of a particular one of the respondent reasons of the decision structure.

6. The method of claim 1, further comprising performing the following steps by computational machinery:
  first determining, for the first group of the respondents, a first ranking of the categories, wherein a ranking of each category, E, of at least some of the categories, by the first ranking, is such that the ranking of the category, E, is dependent upon: (i) a number of first responses from the respondent data for the first group, and (ii) a value dependent upon a number of second responses from the respondent data for the first group,
  second determining, for the second group of the respondents, a second ranking of the categories wherein a ranking of each category, F, of the at least some of the categories, by the second ranking, is such that the ranking of the category, F, is dependent upon: (iii) a number of first responses from the respondent data for the second group, and (iv) a value dependent upon a number of the second responses from the respondent data for the second group,
  third determining from the first and second rankings one or more of the at least some categories that distinguish the first group from the second group.

7. The method of claim 1, wherein the object includes a brand, a company, an organization, a product or a service.

8. The method of claim 1, wherein the decision structure includes: (i) a first category, or representations thereof, indicative of respondent supplied attributes of the object, (ii) a second category, or representations thereof, indicative of respondent supplied functional consequences related to the object, (iii) a third category, or representations thereof, indicative of respondent supplied psychosocial consequences related to the object, and (iv) a fourth category, or representations thereof, indicative of respondent supplied personal values related to the object;
  wherein there is a plurality of the associations in the decision structure for linking together the first, second, third, and fourth categories, or representations thereof, in the decision structure such that the first, second, third, and fourth categories, or representations thereof, and the plurality of associations provide a representation of associations in the mind of each of at least some of the respondents as to why each of the at least some respondents utilize the object to the extent that they do.

9. The method of claim 8, wherein there are first, second, and third association of the plurality of associations such that the first association associates the first and second categories, or representations thereof, the second association associates the second and third categories, or representations thereof, and the third association associates the third and fourth categories, or representations thereof.

10. The method of claim 6, wherein the ranking of at least one of the categories, or representations thereof, E is dependent upon the number of the first responses from the first group relative to the value dependent upon the number of the second responses from the first group.

11. The method of claim 6, wherein the value dependent upon the number of the second responses from the first group is representative of a total number of the first and second responses from the first group.

12. The method of claim 6, further determining the first group, wherein the first group of respondents are identified as being more loyal in utilizing the object than the second group of respondents.

13. The method of claim 6, wherein at least one of the positive equity questions requests one of the respondents to identify at least one characteristic related to the object, wherein for a particular rating of the object by the one respondent, the at least one characteristic prevents the one respondent from rating the object lower.

14. The method of claim 6, wherein the at least one of the negative equity questions requests one of the respondents to identify at least one characteristic related to the object, wherein for a particular rating of the object by the one respondent, the at least one characteristic prevents the one respondent from rating the object higher.

15. The method of claim 6, wherein the step of first determining includes for at least one of the categories, or representations thereof, a step of determining a ratio of: (i) a number of the categories, or representations thereof, from the respondents, for the at least one of the categories, or representations thereof, in the first responses to (ii) a number of the categories, or representations thereof, from the first and second responses for the at least one category, or representations thereof.

16. The method of claim 6, further including identifying the respondents of the first and second group prior to performing the steps of first determining the first ranking, second determining the second ranking, and third determining steps.

17. The method of claim 1, wherein said responsive data includes third responses from the respondents to at least one collection of the laddering questions.

18. The method of claim 17, wherein the decision structure includes a plurality of sequences of the categories, or representations thereof, wherein for each sequence of the sequences, the categories, or representations thereof, have an order obtained using an ordering of at least a portion said responsive data.

19. The method of claim 17, wherein the third responses includes responses to a first collection of the laddering questions, and to a second collection of the laddering questions.

20. The method of claim 1, wherein the plurality of categories includes: (i) a first category indicative of respondent supplied attributes of the object, (ii) a second category indicative of respondent supplied functional consequences related to the object, (iii) a third category indicative of respondent supplied psychosocial consequences related to the object, and (iv) a fourth category indicative of respondent supplied values related to the object.

21. The method of claim 20, wherein the decision structure includes a plurality of ordered sequences of the categories, or representations thereof, wherein for each sequence of the sequences, the categories, or representations thereof, have an order obtained using an ordering of the first, second, third and fourth categories.

* * * * *